United States Patent
Awa et al.

(10) Patent No.: US 9,523,521 B2
(45) Date of Patent: Dec. 20, 2016

(54) REFRIGERATION CYCLE APPARATUS

(71) Applicant: DENSO CORPORATION, Kariya, Aichi-pref. (JP)

(72) Inventors: Ryoko Awa, Obu (JP); Haruyuki Nishijima, Obu (JP); Yoshiaki Takano, Kosai (JP); Etsuhisa Yamada, Kariya (JP); Satoshi Itoh, Kariya (JP); Kenta Kayano, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 51 days.

(21) Appl. No.: 14/443,125

(22) PCT Filed: Nov. 1, 2013

(86) PCT No.: PCT/JP2013/006485
§ 371 (c)(1),
(2) Date: May 15, 2015

(87) PCT Pub. No.: WO2014/076904
PCT Pub. Date: May 22, 2014

(65) Prior Publication Data
US 2015/0300706 A1  Oct. 22, 2015

(30) Foreign Application Priority Data

| | | |
|---|---|---|
| Nov. 16, 2012 | (JP) | 2012-252475 |
| Mar. 18, 2013 | (JP) | 2013-055161 |
| Jun. 18, 2013 | (JP) | 2013-127581 |

(51) Int. Cl.
*F25B 29/00*   (2006.01)
*F25B 1/00*    (2006.01)
(Continued)

(52) U.S. Cl.
CPC ......... *F25B 29/003* (2013.01); *B60H 1/00921* (2013.01); *F25B 41/00* (2013.01);
(Continued)

(58) Field of Classification Search
CPC . F25B 29/003; F25B 41/00; F25B 2341/0011; B60H 1/00921; B60H 2001/3298; F04F 5/46
(Continued)

(56) References Cited

U.S. PATENT DOCUMENTS 5,704,219 A * 1/1998 Suzuki ............... B60H 1/00907
                                                  237/2 B
5,934,094 A    8/1999 Itoh et al.
(Continued)

FOREIGN PATENT DOCUMENTS

JP   H04316962 A   11/1992
JP   H10205898 A   8/1998
(Continued)

OTHER PUBLICATIONS

International Search Report and Written Opinion (in Japanese with English Translation) for PCT/JP2013/006485, mailed Feb. 4, 2014; ISA/JP.
(Continued)

*Primary Examiner* — Mohammad M Ali
(74) *Attorney, Agent, or Firm* — Harness, Dickey & Pierce, P.L.C.

(57) ABSTRACT

In a dehumidification-air heating mode, a refrigerant circuit is configured such that a refrigerant outlet side of an exterior heat exchanger communicates with a heating side refrigerant suction port of a heating side ejector as a refrigerant decompression means, and that a refrigerant inlet side of an interior evaporator communicates with an outlet side of a heating side diffuser of the heating side ejector. A refrigerant evapo-
(Continued)

AIR COOLING MODE / WEAK DEHUMIDIFICATION-AIR HEATING MODE ration temperature in the exterior heat exchanger is set lower than that of the interior evaporator by a pressurizing effect of the heating side ejector. Thus, the amount of heat absorption by the refrigerant at the exterior heat exchanger is increased to improve the heating capacity of the air in an interior condenser.

16 Claims, 23 Drawing Sheets

(51) Int. Cl.
    *F25B 43/00*       (2006.01)
    *F25B 5/00*        (2006.01)
    *F25B 6/02*        (2006.01)
    *F25B 41/00*       (2006.01)
    *B60H 1/00*       (2006.01)
    *B60H 1/32*       (2006.01)

(52) U.S. Cl.
    CPC .............. *B60H 2001/3298* (2013.01); *F25B 2341/0011* (2013.01); *F25B 2341/0015* (2013.01)

(58) Field of Classification Search
    USPC .................................................. 62/324.6, 500
    See application file for complete search history.

(56) References Cited

U.S. PATENT DOCUMENTS

| | | | |
|---|---|---|---|
| 6,237,351 B1 * | 5/2001 | Itoh ................... | B60H 1/00921 62/113 |
| 6,293,123 B1 * | 9/2001 | Iritani ................. | B60H 1/3205 62/197 |
| 6,347,528 B1 * | 2/2002 | Iritani ................ | B60H 1/00357 62/323.1 |
| 2003/0200764 A1 | 10/2003 | Takeuchi et al. | |
| 2004/0060316 A1 | 4/2004 | Ito et al. | |

FOREIGN PATENT DOCUMENTS

| | | |
|---|---|---|
| JP | H11157327 A | 6/1999 |
| JP | 2001322421 A | 11/2001 |
| JP | 3334446 B2 | 10/2002 |
| JP | 2003320837 A | 11/2003 |
| JP | 3486851 B2 | 1/2004 |
| JP | 2004026004 A | 1/2004 |
| JP | 3645324 B2 | 5/2005 |
| JP | 4311115 B2 | 8/2009 |
| JP | 2014077552 A | 5/2014 |
| WO | WO-2014076903 A1 | 5/2014 |

OTHER PUBLICATIONS

U.S. Appl. No. 14/443,123, May 15, 2015, Ryoko Awa et al.

* cited by examiner

AIR COOLING MODE / WEAK DEHUMIDIFICATION-AIR HEATING MODE

DEHUMIDIFICATION-AIR HEATING MODE

AIR HEATING MODE

AIR COOLING MODE

WEAK DEHUMIDIFICATION-AIR HEATING MODE

DEHUMIDIFICATION-AIR HEATING MODE

AIR HEATING MODE

STRONG AIR HEATING MODE

STRONG AIR HEATING MODE

AIR COOLING MODE / WEAK DEHUMIDIFICATION-AIR HEATING MODE

DEHUMIDIFICATION-AIR HEATING MODE

AIR HEATING MODE

DEHUMIDIFICATION-AIR HEATING MODE

AIR HEATING MODE

AIR COOLING MODE/ WEAK DEHUMIDIFICATION-AIR HEATING MODE

AIR COOLING MODE

WEAK DEHUMIDIFICATION-AIR HEATING MODE

STRONG AIR HEATING MODE

STRONG AIR HEATING MODE

SERIAL DEHUMIDIFICATION-AIR HEATING MODE

SERIAL DEHUMIDIFICATION-AIR HEATING MODE

SERIAL DEHUMIDIFICATION-AIR HEATING MODE

SERIAL DEHUMIDIFICATION-AIR HEATING MODE

SERIAL DEHUMIDIFICATION-AIR HEATING MODE

SERIAL DEHUMIDIFICATION-AIR HEATING MODE

REFRIGERATION CYCLE APPARATUS

CROSS REFERENCE TO RELATED APPLICATIONS

This application is a U.S. National Phase Application under 35 U.S.C. 371 of International Application No. PCT/JP2013/006485 filed on Nov. 1, 2013 and published in Japanese as WO 2014/076904 A1 on May 22, 2014. This application is based on and claims the benefit of priority from Japanese Patent Applications No. 2012-252475 filed on Nov. 16, 2012, No. 2013-055161 filed on Mar. 18, 2013, and No. 2013-127581 filed on Jun. 18, 2013. The entire disclosures of all of the above applications are incorporated herein by reference.

FIELD OF THE INVENTION

The present disclosure relates to a refrigeration cycle apparatus that is applied to an air conditioner so as to adjust the temperature of air to be blown into a space to be air-conditioned.

BACKGROUND ART

In the related art, Patent Document 1 discloses an evaporation compression refrigeration cycle apparatus that is applied to an air conditioner to adjust the temperature of air to be blown into a space to be air-conditioned. The refrigeration cycle apparatus disclosed in Patent Document 1 includes a refrigerant circuit switch for switching a refrigerant circuit for circulation of the refrigerant. The refrigeration cycle apparatus can be configured to perform switching among various refrigeration circuits according to an operation mode.

For example, in an air cooling mode of cooling the space to be air-conditioned by cooling air, switching is performed to a refrigerant circuit for dissipating heat absorbed by the refrigerant from the air at an interior evaporator, into outside air at an exterior heat exchanger. In an air heating mode of heating the space to be air-conditioned by heating air, switching is performed to a refrigerant circuit for dissipating the heat absorbed by the refrigerant from the outside air at the exterior heat exchanger, into the air at an interior condenser.

In a dehumidification-air heating mode of dehumidifying air by cooling the air and reheating the dehumidified air to perform dehumidification-air heating of the space to be air-conditioned, switching is performed to a refrigerant circuit including the interior evaporator and the exterior heat exchanger connected in parallel to each other. The refrigerant circuit dissipates the heat absorbed by the refrigerant from the air at the interior evaporator as well as the heat absorbed by the refrigerant from the outside air at the exterior heat exchanger, into the air at the interior condenser.

RELATED ART DOCUMENT

Patent Document

[Patent Document 1] Japanese Patent Publication No. 3486851

SUMMARY OF INVENTION

The studies by the inventors of the present application have shown that in the refrigeration cycle apparatus disclosed in Patent Document 1, in some cases, the air cannot be sufficiently reheated to the temperature required for air-heating even when switched to a refrigerant circuit for the dehumidification-air heating mode at a low outside air temperature. The reason for this is that a refrigerant evaporation temperature in the interior evaporator might be equal to a refrigerant evaporation temperature in the exterior heat exchanger in the refrigerant circuit that includes the interior evaporator and the exterior heat exchanger connected in parallel in the dehumidification-air heating mode, like the refrigeration cycle apparatus of Patent Document 1.

That is, in such a refrigerant circuit structure, when the refrigerant evaporation temperature in the interior evaporator is adjusted to a temperature that can suppress the frost formation (frost) of the interior evaporator, the refrigerant evaporation temperature in the exterior heat exchanger is also adjusted to the substantially same temperature as that in the interior evaporator, which might reduce a difference between the outside air temperature and the refrigerant evaporation temperature in the exterior heat exchanger at the low outside air temperature. As a result, the refrigerant cannot absorb the sufficient heat from the outside air at the exterior heat exchanger, and thus cannot adequately reheat the air at the interior condenser.

In view of the foregoing matters, it is an object of the present disclosure to provide a refrigeration cycle apparatus to be applied to an air conditioner that can improve a heating capacity of air in a dehumidification-air heating mode which involves cooling and dehumidifying air to be blown into a space to be air-conditioned, and reheating the dehumidified air.

To achieve at least the above object, a refrigeration cycle apparatus to be applied to an air conditioner includes: a compressor compressing and discharging a low-pressure refrigerant; a heating heat exchanger that heats air to be blown into a space to be air-conditioned, using a high-pressure refrigerant discharged from the compressor as a heat source; a branch portion that branches a flow of the refrigerant flowing out of the heating heat exchanger; a heating side ejector that draws a refrigerant from a heating side refrigerant suction port by a suction effect of an injection refrigerant injected from a heating side nozzle portion that decompresses one of the refrigerants branched by the branch portion, the heating side ejector including a heating side pressure-increasing portion that raises a pressure of a mixed refrigerant including the injection refrigerant and a suction refrigerant drawn from the heating side refrigerant suction port; an exterior heat exchanger that exchanges heat between a refrigerant on a downstream side of the heating side pressure-increasing portion and outside air to evaporate the refrigerant, and allows the refrigerant to flow out toward a side of the heating side refrigerant suction port; a cooling side decompressor decompressing the refrigerant; and a cooling heat exchanger that evaporates the refrigerant decompressed by the cooling side decompressor to cool the air before passing through the heating heat exchanger.

In a dehumidification-air heating mode in which the heating heat exchanger reheats the air cooled by the cooling heat exchanger, the other refrigerant branched by the branch portion flows into the cooling side decompressor, and the refrigerant on a downstream side of the heating side ejector and the refrigerant on a downstream side of the cooling side decompressor are drawn into the compressor.

Thus, the refrigerant outlet side of the exterior heat exchanger can communicate with the heating side refrigerant suction port of the heating side ejector in the dehumidification-air heating mode. Further, a refrigerant circuit can be formed in which the refrigerant inlet side or refrigerant outlet side of the cooling heat exchanger communicates with the outlet side of the heating side pressure-increasing portion of the heating side ejector.

Therefore, in the dehumidification-air heating mode, the refrigerant evaporation pressure in the exterior heat exchanger can be set close to the lowest pressure of the refrigerant that is obtained immediately after being decompressed by the heating-side nozzle portion of the heating side ejector. Further, the refrigerant evaporation pressure in the cooling heat exchanger can be set close to the refrigerant pressure pressurized by the heating side pressure-increasing portion of the heating side ejector.

That is, the refrigerant evaporation pressure in the exterior heat exchanger can be set lower than that in the cooling heat exchanger. Even though the refrigerant evaporation temperature in the cooling heat exchanger is adjusted to the temperature that can suppress the frost formation at the cooling heat exchanger, the refrigerant evaporation temperature in the exterior heat exchanger can be set lower than the outside air temperature.

As a result, the refrigerant can absorb sufficient heat from the outside air in the exterior heat exchanger, so that the heat can be adequately dissipated into the air by the heating heat exchanger. That is, the heating capacity of the air in the dehumidification-air heating mode can be improved.

Alternatively, a refrigeration cycle apparatus of the present disclosure may include: a compressor that compresses a low-pressure refrigerant drawn from a suction port and discharges a high-pressure refrigerant from a discharge port, the compressor including an intermediate pressure port that allows an intermediate-pressure refrigerant in a refrigerant cycle to be introduced and to be merged with the refrigerant being compressed; a heating heat exchanger that heats air to be blown into a space to be air-conditioned, using the high-pressure refrigerant discharged from the discharge port of the compressor as a heat source; a branch portion that branches a flow of the refrigerant flowing out of the heating heat exchanger; a heating side ejector that draws a refrigerant from a heating side refrigerant suction port by a suction effect of an injection refrigerant injected from a heating side nozzle portion that decompresses one of the refrigerants branched by the branch portion, the heating side ejector including a heating side pressure-increasing portion that raises a pressure of a mixed refrigerant including the injection refrigerant and a suction refrigerant drawn from the heating side refrigerant suction port; an exterior heat exchanger that exchanges heat between the refrigerant on a downstream side of the heating side pressure-increasing portion and outside air to evaporate the refrigerant, and allows the refrigerant to flow out toward a side of the heating side refrigerant suction port; a cooling side decompressor decompressing the refrigerant; and a cooling heat exchanger that evaporates the refrigerant decompressed by the cooling side decompressor to cool the air before the air passes through the heating heat exchanger.

In a dehumidification-air heating mode in which the heating heat exchanger reheats the air cooled by the cooling heat exchanger, the other refrigerant branched by the branch portion flows into the cooling side decompressor while at least a part of the refrigerant flowing out of the exterior heat exchanger is drawn into the suction port, and further the refrigerant on a downstream side of the heating side ejector and the refrigerant on a downstream side of the cooling side decompressor flow into the intermediate-pressure port.

With this arrangement, in the dehumidification-air heating mode, the refrigerant circuit can be configured such that the refrigerant outlet side of the exterior heat exchanger communicates with the heating side refrigerant suction port of the heating side ejector, and that the refrigerant inlet side or refrigerant outlet side of the cooling heat exchanger communicates with the outlet side of the heating side pressure-increasing portion of the heating side ejector. Thus, the heating capacity of the air in the dehumidification-air heating mode can be improved, similarly to the above-mentioned refrigeration cycle apparatus.

Further, the refrigeration cycle apparatus of the present disclosure constitutes the so-called economizer refrigeration cycle that causes the compressor to merge the refrigerant being pressurized with an intermediate-pressure refrigerant in the cycle, and thus can improve a mechanical efficiency (compression efficiency) of the compressor, thereby improving the cycle coefficient of performance (COP) of the refrigeration cycle apparatus.

In the refrigeration cycle apparatus of the present disclosure, the cooling side decompressor may be a cooling side ejector that includes a cooling side nozzle portion decompressing the other of the refrigerants branched by the branch portion, a cooling side refrigerant suction port that draws a refrigerant by a suction effect of an injection refrigerant injected from the cooling side nozzle portion, and a cooling side pressure-increasing portion raising a pressure of a mixed refrigerant of the injection refrigerant injected from the cooling side nozzle portion and the suction refrigerant drawn from the cooling side refrigerant suction port. In the dehumidification-air heating mode, the refrigerant flowing out of the cooling side pressure-increasing portion may flow into the cooling heat exchanger, and the refrigerant flowing out of the cooling heat exchanger may flow into the cooling side refrigerant suction port.

Thus, the power consumption of the compressor can be suppressed by the pressurizing effect of the cooling side ejector, thereby further improving the COP.

DESCRIPTION OF EMBODIMENTS (First Embodiment)

A first embodiment of the present disclosure will be described below with reference to FIGS. 1 to 11. A refrigeration cycle apparatus 10 of the present disclosure is applied to a vehicle air conditioner 1 to be mounted on an electric vehicle, which is designed to obtain a driving force for vehicle traveling from an electric motor for traveling. The refrigeration cycle apparatus 10 serves to heat or cool air to be blown into a vehicle interior as a space to be air-conditioned in the vehicle air conditioner 1. Here, air is a fluid to be heat-exchanged.

Figure 1:
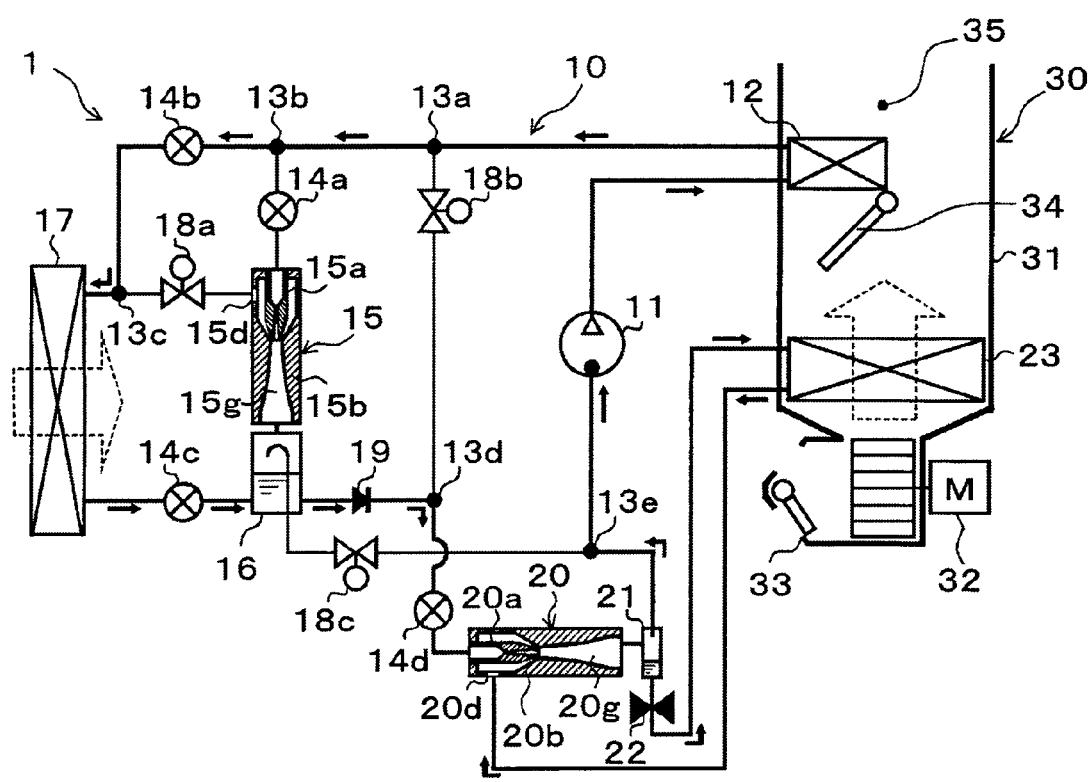
FIG. 1 is an entire configuration diagram showing a refrigerant circuit in an air cooling mode and a weak dehumidification-air heating mode of a refrigeration cycle apparatus according to a first embodiment.
Figure 2:
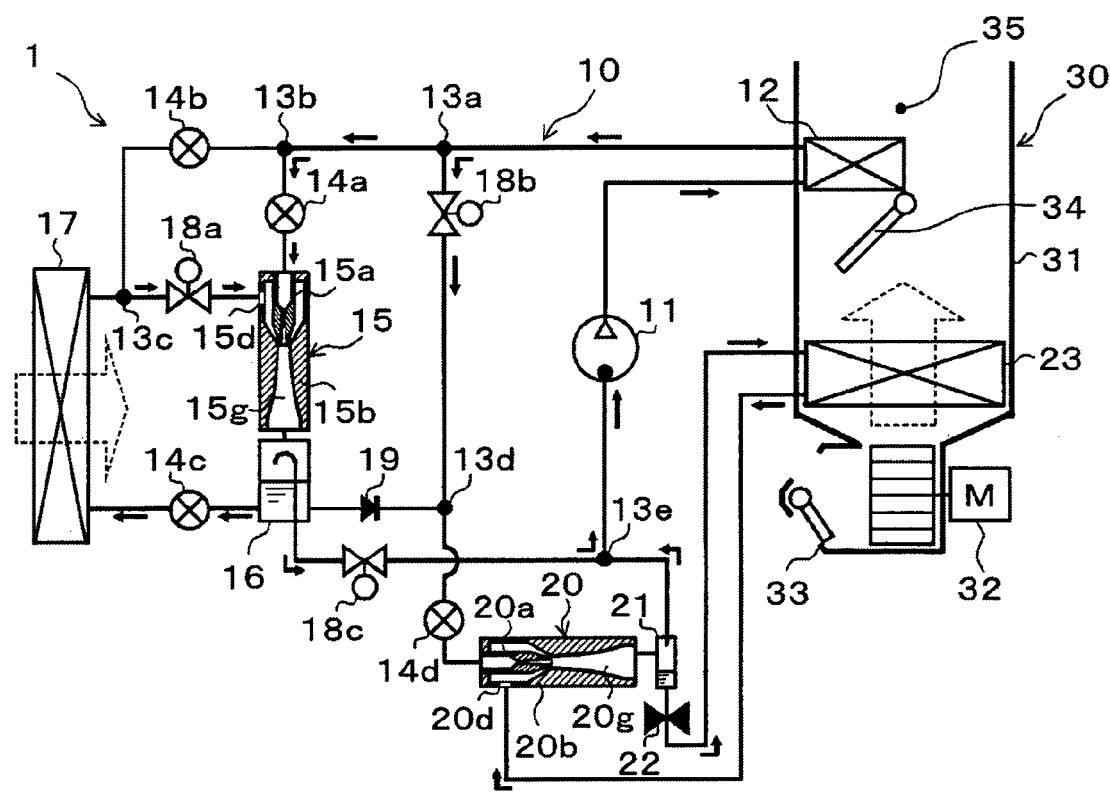
FIG. 2 is an entire configuration diagram showing a refrigerant circuit in a dehumidification-air heating mode of the refrigeration cycle apparatus in the first embodiment.
Figure 3:
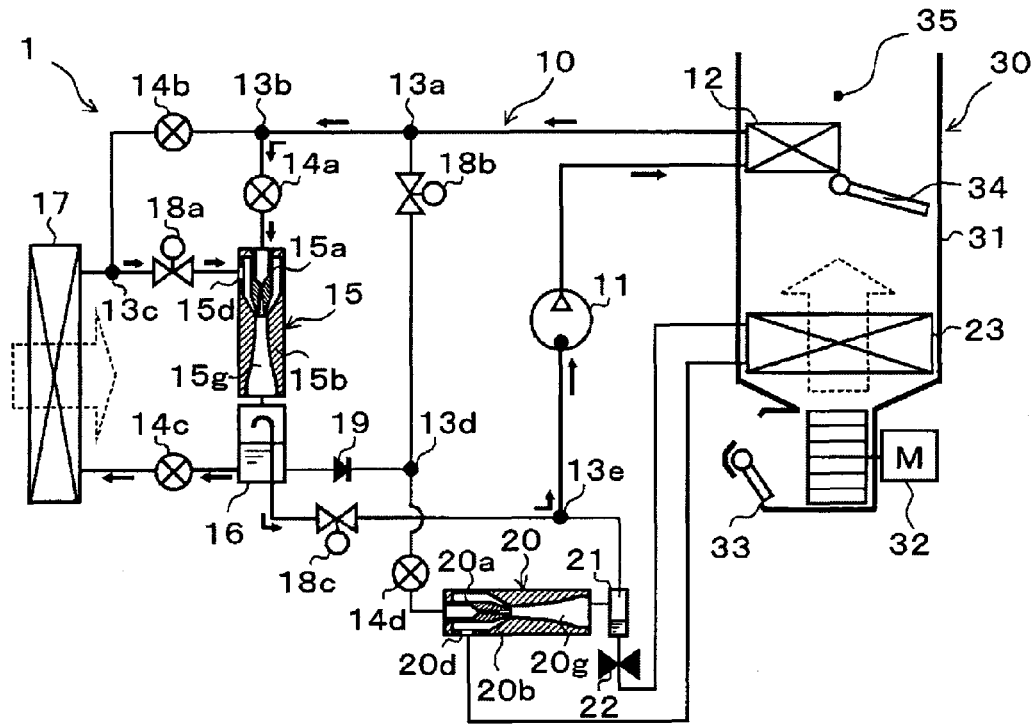
FIG. 3 is an entire configuration diagram showing a refrigerant circuit in an air heating mode of the refrigeration cycle apparatus in the first embodiment.

The refrigeration cycle apparatus 10 can be configured to perform switching among a refrigerant circuit in an air cooling mode of cooling the vehicle interior by cooling the air (see FIG. 1); a refrigerant circuit in a weak dehumidification-air heating mode of dehumidifying and heating the vehicle interior by reheating the air cooled and dehumidified (see FIG. 1); a refrigerant circuit in a dehumidification-air heating mode of dehumidifying and heating the vehicle interior by reheating the air with a higher heating capacity than that in the weak dehumidification-air heating mode (see FIG. 2); and a refrigerant circuit in an air heating mode of heating the vehicle interior by heating the air (see FIG. 3). FIGS. 1 to 3 show the flows of the refrigerant in the respective operation modes by solid arrows.

The refrigeration cycle apparatus 10 employs a hydrofluorocarbon (HFC) refrigerant (e.g., R134a) as the refrigerant, and forms a vapor compression subcritical refrigeration cycle whose high-pressure side refrigerant pressure does not exceed the critical pressure of the refrigerant. Alternatively, a hydrofluoroolefin (HFO) refrigerant (e.g., R1234yf) or the like may be used as the refrigerant. Refrigerating machine oil for lubricating a compressor 11 is mixed into the refrigerant, and a part of the refrigerating machine oil circulates through the cycle together with the refrigerant.

The compressor 11 among components of the refrigeration cycle apparatus 10 is positioned in a bonnet of a vehicle, and is to draw, compress, and discharge the refrigerant in the refrigeration cycle apparatus 10. The compressor is an electric compressor that rotatably drives a fixed displacement compression mechanism with a fixed discharge capacity by use of an electric motor. The electric motor of the compressor 11 has its operation (the number of revolutions) controlled by a control signal output from an air conditioning controller to be described later.

The discharge port side of the compressor 11 is coupled to a refrigerant inlet side of an interior condenser 12. The interior condenser 12 is disposed in a casing 31 forming an air passage for air to be blown into the vehicle interior in an interior air conditioning unit 30 to be described later. The interior condenser 12 is a heating heat exchanger that heats the air by exchanging heat between a high-pressure refrigerant discharged from the compressor 11 and the air having passed through an interior evaporator 23 to be described later. The details of the interior air conditioning unit 30 will be described later.

A refrigerant outlet side of the interior condenser 12 is connected to a first three-way joint 13a. In the first three-way joint 13a, one of three inflow/outflow ports is used as a refrigerant inflow port, and the two remaining inflow/outflow ports are used as a refrigerant outflow port. Thus, the first three-way joint 13a serves as a branch portion for branching the flow of refrigerant flowing out of the interior condenser 12.

One of the refrigerant outflow ports of the first three-way joint 13a is connected to a second three-way joint 13b having the same structure as that of the first three-way joint 13a. One of the refrigerant outflow ports of the second three-way joint 13b is connected to an inlet side of a first flow rate adjustment valve 14a, and the other of the refrigerant outflow ports is connected to an inlet side of a second flow rate adjustment valve 14b.

Each of the first and second flow rate adjustment valves 14a and 14b is an electric variable throttle mechanism that includes a valve body for changing an opening degree of a refrigerant passage, and an electric actuator including a stepping motor for changing the opening degree of the valve body. The first and second flow rate adjustment valves have functions of adjusting the flow rate of the refrigerant, and of serving as an expansion valve for decompressing and expanding the refrigerant.

Further, the first and second flow rate adjustment valves 14a and 14b have a fully opening function of simply serving as a refrigerant passage by fully opening the valve opening degree almost without exhibiting the flow rate adjustment effect and the refrigerant decompression effect, as well as a completely closing function of closing the refrigerant flow path by completely closing the valve opening degree.

By these fully opening function and completely closing function, the first and second flow rate adjustment valves 14a and 14b can switch the refrigerant flowing out of the interior condenser 12 between a refrigerant circuit for allowing the refrigerant to flow into the first flow rate adjustment valve 14a side, and a refrigerant circuit for allowing the refrigerant to flow into the second flow rate adjustment valve 14b side.

Therefore, the first and second flow rate adjustment valves 14a and 14b configure a refrigerant circuit switch for switching the refrigerant circuit among the air cooling mode, the weak dehumidification-air heating mode, the dehumidification-air heating mode, and the air-heating mode. Each of the first and second flow rate adjustment valves 14a and 14b has its operation controlled by a control signal output from the air conditioning controller.

An outlet side of the first flow rate adjustment valve 14a is connected to an inlet side of a heating side nozzle portion 15a of a heating side ejector 15. The heating side ejector 15 serves as a decompressor for decompressing the refrigerant flowing out of the interior condenser 12 in the dehumidification-air heating mode and the air heating mode, while serving as a refrigerant circulation unit (refrigerant transport unit) that draws (transports) the refrigerant by a suction effect of the injection refrigerant injected at a high velocity to allow the refrigerant to circulate through the cycle.

The detailed structure of the heating side ejector 15 will be described below using FIG. 4. The heating side ejector 15 includes the heating side nozzle portion 15a and a heating side body 15b. The heating side nozzle portion 15a is formed of metal (e.g., stainless alloy) in a substantially cylindrical shape that is gradually tapered toward the refrigerant flow direction. The heating side nozzle portion 15a serves to isentropically decompress and expand the refrigerant through a refrigerant passage (throttle passage) formed therein.

The refrigerant passage formed in the heating side nozzle portion 15a has a throat portion (portion with the minimum passage area) whose refrigerant passage area is minimized. The refrigerant passage further has a divergent portion whose refrigerant passage area is gradually increased toward a refrigerant injection port 15c for injecting the refrigerant from the throat portion. That is, the heating side nozzle portion 15a is configured as the so-called Laval nozzle.

The heating side nozzle portion 15a is used to set the flow velocity of the injection refrigerant injected from the refrigerant injection port 15c to a two-phase sound velocity αh or more (supersonic velocity state) when performing an operation with a high heating capacity at least in the air heating mode to be described later.

The two-phase sound velocity αh is a sound velocity of the fluid in the gas-liquid mixed state of a gas-phase fluid and a liquid-phase fluid, and defined by the following formula F1:

$$\alpha h = [P/\{\alpha \times (1-\alpha) \times \rho 1\}]^{0.5} \quad (F1)$$

where α in the formula F1 is a void fraction, which indicates a fraction of the volume of voids (air bubble) per unit volume.

In more detail, the void fraction α is defined by the following formula F2.

$$\alpha = x/\{x + (\rho g/\rho l) \times (1-x)\} \quad (F2)$$

where in the formulas 1 and 2, x is the dryness, ρg is the density of the gas-phase refrigerant, ρl is the density of the liquid-phase refrigerant, and P is the pressure of the two-phase refrigerant (two-phase fluid).

Then, the heating side body 15b is formed of metal (e.g., aluminum) in a substantially cylindrical shape. The body 15b serves as a fixing member that supports and fixes the heating side nozzle portion 15a therein, while forming an outer envelope of the heating side ejector 15. More specifically, the heating side nozzle portion 15a is fixed by press fitting to the heating side body 15b so as to be accommodated within the body 15b on one end side in the longitudinal direction of the body 15b.

A heating side refrigerant suction port 15d is formed to penetrate the part of the outer peripheral side surface of the heating side body 15b corresponding to the outer periphery side of the heating side nozzle portion 15a so as to communicate with the refrigerant injection port 15c of the heating side nozzle portion 15a. The heating side refrigerant suction port 15d is a through hole that draws the refrigerant flowing out of one of the refrigerant inlet and outlet of an exterior heat exchanger 17, into the heating side ejector 15 by a suction effect of the injection refrigerant injected from the refrigerant injection port 15c of the heating side nozzle portion 15a in the dehumidification-air heating mode and the air heating mode.

A mixing portion 15e, a suction passage 15f, and a heating side diffuser 15g serving as a heating side pressure-increasing portion are formed inside the heating side body 15b. The mixing portion 15e mixes the injection refrigerant injected from the refrigerant injection port 15c of the heating side nozzle portion 15a, with the suction refrigerant drawn from the heating side refrigerant suction port 15d. The suction passage 15f guides the suction refrigerant drawn from the heating side refrigerant suction port 15d to the mixing portion 15e. A heating side diffuser 15g serves to increase the pressure of the mixed refrigerant mixed by the mixing portion 15e.

The suction passage 15f is formed by a space between the outer peripheral side of the tapered tip periphery of the heating side nozzle portion 15a, and the inner peripheral side of the heating side body 15b. The refrigerant passage area of the suction passage 15f is gradually decreased toward the refrigerant flow direction. Thus, the flow velocity of the suction refrigerant circulating through the suction passage 15f is gradually increased, which decreases the energy loss (mixing loss) when mixing the suction refrigerant with the injection refrigerant by the mixing portion 15e.

The mixing portion 15e is formed by a space ranging from the refrigerant injection port 15c of the heating side nozzle portion 15a to an inlet 15h of the heating side diffuser 15g on the inner peripheral side of the heating side body 15b. Further, the mixing portion 15e is formed in a truncated conical shape that gradually reduces its refrigerant passage area toward the refrigerant flow direction, whereby the refrigerant passage area of the inlet 15h of the heating side diffuser 15g is smaller than that of the refrigerant injection port 15c.

Thus, the mixing portion 15e gradually decreases the flow velocity of the mixed refrigerant to a level lower than the two-phase sound velocity $α_h$ until the mixed refrigerant reaches the inlet 15h of the heating side diffuser 15g. In other words, the refrigerant flowing into the heating side diffuser 15g becomes a subsonic state.

The heating side diffuser 15g continuously leads to an outlet of the mixing portion 15e, and is formed such that the refrigerant passage area is gradually increased. Thus, the diffuser exhibits a function of converting the velocity energy of the mixed refrigerant flowing out of the mixing portion 15e to the pressure energy, that is, exhibits a function of increasing the pressure of the mixed refrigerant by decelerating the flow velocity of the mixed refrigerant.

Figure 4:
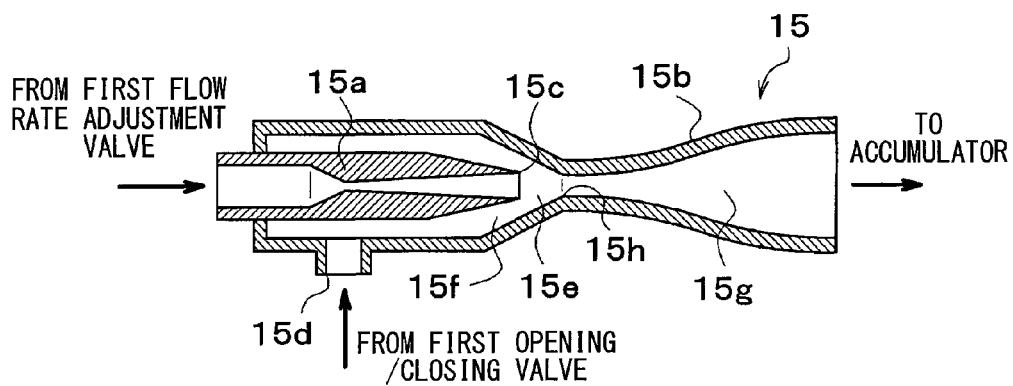
FIG. 4 is a cross-sectional view in an axial direction of a heating side ejector in the first embodiment.

Specifically, the sectional shape of the wall surface of the heating side diffuser 15g is formed by a combination of a plurality of curved lines as shown in FIG. 4. The expanding degree of the refrigerant passage area of the heating side diffuser 15g is gradually increased and then decreased again toward the refrigerant flow direction, which can isentropically increase the pressure of the refrigerant.

The refrigerant outlet side of the heating side diffuser 15g of the heating side ejector 15 is connected to the refrigerant inflow port of an accumulator 16. The accumulator 16 is a gas-liquid separator that separates the refrigerant flowing thereinto into gas and liquid refrigerant phases. Further, the accumulator 16 serves as a liquid storage portion for storing therein the excessive liquid-phase refrigerant in the cycle. Note that the accumulator 16 is disposed inside a bonnet of the vehicle, that is, in an external space exposed to the outside air.

The accumulator 16 is provided with two liquid-phase refrigerant inflow and outflow ports disposed so as to be capable of flowing out the separated liquid-phase refrigerant to the outside, and one gas-phase refrigerant outflow port for flowing out the separated gas-phase refrigerant.

On the other hand, one liquid-phase refrigerant inflow and outflow ports of the accumulator 16 is connected to the other of the refrigerant inflow and outflow ports of the exterior heat exchanger 17 via a third flow rate adjustment valve 14c. The third flow rate adjustment valve 14c has the same structure as that of each of the first and second flow rate adjustment valves 14a and 14b. The third flow rate adjustment valve 14c does not serve as the refrigerant circuit switch, and thus may not have the completely closing function.

The exterior heat exchanger 17 is disposed in the bonnet of the vehicle, and serves to exchange heat between the refrigerant flowing therethrough and outside air blown from a blower fan (not shown). Specifically, the exterior heat exchanger 17 serves as a radiator for dissipating heat from a high-pressure refrigerant in the air cooling mode and the weak dehumidification-air heating mode, and as an evaporator for evaporating a low-pressure refrigerant in the dehumidification-air heating mode and the air heating mode.

The blower fan is an electric blower whose operating ratio, that is, whose number of revolutions (volume of air) is controlled by a control voltage output from the air conditioning controller. Further, as mentioned above, one of the refrigerant inflow and outflow ports of the exterior heat exchanger 17 is connected to the heating side refrigerant suction port 15d of the heating side ejector 15 via a first opening/closing valve 18a.

The first opening/closing valve 18a is an electromagnetic valve for opening and closing a refrigerant passage leading from one of the refrigerant inflow and outflow ports of the exterior heat exchanger 17 to the heating side refrigerant suction port 15d of the heating side ejector 15. The first opening/closing valve 18a configures the refrigerant circuit switch, together with the first and second flow rate adjustment valves 14a and 14b. The first opening/closing valve 18a has its operation controlled by a control voltage output from the air conditioning controller.

A third three-way joint 13c is disposed in a refrigerant passage that connects one of the refrigerant inflow and outflow ports of the exterior heat exchanger 17 with the first opening/closing valve 18a. The third three-way joint 13c is connected to the outlet side of the second flow rate adjustment valve 14b. In other words, the outlet side of the second flow rate adjustment valve 14b is connected to the one of the refrigerant inflow and outflow ports of the exterior heat exchanger 17 via the third three-way joint 13c.

The other one of the liquid-phase refrigerant inflow and outflow ports of the accumulator 16 is connected to the inlet side of a fourth flow rate adjustment valve 14d via a check valve 19. The check valve 19 allows the refrigerant only to flow from the other one of the liquid-phase refrigerant inflow and outflow ports of the accumulator 16 to the fourth flow rate adjustment valve 14d side. Note that the fourth flow rate adjustment valve 14d is a cooling side decompressor, and has the same basic structure as that of the third flow rate adjustment valve 14c.

A refrigerant passage for connecting the check valve 19 with the fourth flow rate adjustment valve 14d is provided with a fourth three-way joint 13d. The fourth three-way joint 13d is connected to the other refrigerant outflow port of the first three-way joint 13a described above. Further, a refrigerant passage leading from the other refrigerant outflow port of the first three-way joint 13a to the fourth three-way joint 13d is provided with a second opening/closing valve 18b for opening and closing the refrigerant passage.

The gas-phase refrigerant outflow port of the accumulator 16 is connected to a suction port of the compressor 11 via a third opening/closing valve 18c and a fifth three-way joint 13e. The second and third opening/closing valves 18b and 18c have the same basic structure as that of the first opening/closing valve 18a. The third to fifth three-way joints 13c to 13e have the same basic structure as that of the first three-way joint 13a. Further, the second and third opening/closing valves 18b and 18c constitutes the refrigerant circuit switch together with the first opening/closing valve 18a described above and the like.

An outlet side of the fourth flow rate adjustment valve 14d is connected to an inlet side of a cooling side nozzle portion 20a of a cooling side ejector 20. The cooling side ejector 20 is a cooling side decompressor for decompressing the other refrigerant branched by the first three-way joint 13a at least in the dehumidification-air heating mode. The cooling side ejector 20 has the same basic structure as that of the heating side ejector 15.

Therefore, like the heating side ejector 15, the cooling side ejector 20 includes the cooling side nozzle portion 20a for decompressing the refrigerant, and a cooling side body 20b provided with a cooling side refrigerant suction port 20d for drawing the refrigerant flowing out of an interior evaporator 23 and a cooling side diffuser (cooling side pressure-increasing portion) 20g for increasing the pressure of the mixed refrigerant.

The cooling side nozzle portion 20a and the cooling side body 20b of the cooling side ejector 20 are set so as to exhibit the high coefficient of performance (COP) in the entire refrigeration cycle apparatus 10 by flowing the saturated liquid-phase refrigerant thereinto, for example, in the air cooling mode.

Therefore, the refrigerant passage area of an inlet of the cooling side diffuser 20g does not need to be set smaller than that of a refrigerant injection port of the cooling side nozzle portion 20a, unlike the heating side ejector 15. The refrigerant outlet side of the cooling side diffuser 20g of the cooling side ejector 20 is connected to the refrigerant inflow port of a cooling side gas-liquid separator 21.

The cooling side gas-liquid separator 21 separates the refrigerant flowing out of the cooling side diffuser 20g into the gas and liquid phase refrigerants, and allows the liquid-phase refrigerant and gas-phase refrigerant to flow out to the outside without retaining therein the separated liquid-phase refrigerant. That is, the cooling side gas-liquid separator 21 hardly has the function of serving as a liquid storage portion.

Such a cooling side gas-liquid separator 21 is of, for example, a centrifugal separation type that separates the refrigerant into the gas and liquid phases by the action of centrifugal force. The cooling side gas-liquid separator 21 for use may be a small-sized one whose internal capacity is too small to substantially retain the excessive refrigerant therein. At a liquid-phase refrigerant outflow port of the cooling side gas-liquid separator 21, a fixed throttle 22 made of an orifice or a capillary tube is disposed.

The outlet side of the fixed throttle 22 is connected to a refrigerant inlet side of the interior evaporator 23. The interior evaporator 23 is disposed on the upstream side of the air flow with respect to the above-mentioned interior condenser 12 within the casing 31 of the interior air conditioning unit 30. The interior evaporator 23 is a cooling heat exchanger that exchanges heat between the low-pressure liquid-phase refrigerant flowing out of the cooling side gas-liquid separator 21 and the air to evaporate the refrigerant itself, thereby cooling the air.

The refrigerant outlet side of the interior evaporator 23 is connected to the cooling side refrigerant suction port 20d of the cooling side ejector 20. The gas-phase refrigerant outflow port of the cooling side gas-liquid separator 21 is connected to a suction port of the compressor 11 via the fifth three-way joint 13e described above.

Now, the interior air conditioning unit 30 will be described below. The interior air conditioning unit 30 serves to blow out the air whose temperature is adjusted by the refrigeration cycle apparatus 10 into the vehicle compartment. The interior air conditioning unit 30 is disposed inside (inside the vehicle compartment) of a dashboard (instrument panel) at the foremost part of the vehicle compartment. The interior air conditioning unit 30 accommodates a blower 32, the interior evaporator 23, the interior condenser 12, an air mix door 34, and the like in the casing 31 forming its outer envelope.

The casing 31 forms an air passage for air to be blown into the vehicle interior. The casing 31 has some elasticity, and is formed of resin (for example, polypropylene) having excellent strength. On the most upstream side of the air flow in the casing 31, an inside/outside air switch 33 is provided to serve as inside/outside air switch for switching between inside air (vehicle interior air) and outside air (vehicle exterior air) and introducing the air into the casing 31.

The inside/outside air switch 33 continuously adjusts opening areas of an inside air inlet for introducing the inside air into the casing 31 and an outside air inlet for introducing the outside air into the casing 31 by use of an inside/outside air switching door, thereby continuously changing a ratio of the volume of the inside air to the outside air. The inside/outside air switching door is driven by an electric actuator for the inside/outside air switching door. The electric actuator has its operation controlled by a control signal output from the air conditioning controller.

On the downstream side of air flow of the inside/outside air switch 33, the blowing unit (blower) 32 is disposed as a blowing device for blowing air drawn thereinto via the inside/outside air switch 33, toward the vehicle interior. The blower 32 is an electric blower that drives a centrifugal multi-blade fan (sirocco fan) by an electric motor. The blower 32 has the number of revolutions (i.e., air blowing volume) controlled by a control voltage output from the air conditioning controller.

The interior evaporator 23 and the interior condenser 12 are disposed on the downstream side of the air flow of the blower 32 in that order with respect to the air flow. In short, the interior evaporator 23 is disposed on the upstream side of the air flow with respect to the interior condenser 12. The air mix door 34 is disposed on the downstream side of the air flow in the interior evaporator 23 and on the upstream side of the air flow in the interior condenser 12. The air mix door 34 adjusts the rate of the volume of the air passing through the interior condenser 12 among the air having passed through the interior evaporator 23.

A mixing space 35 is provided on the downstream side of the air flow of the interior condenser 12 so as to mix the air heated by exchanging heat with the refrigerant in the interior condenser 12, with the air not heated while bypassing the interior condenser 12. Further, openings for blowing out the air (conditioned air) mixed in the mixing space 35, into the vehicle interior as a space to be air-conditioned are disposed on the most downstream side of the air flow of the casing 31.

Specifically, the openings include a face opening for blowing the conditioned air toward the upper body of a passenger in the vehicle compartment, a foot opening for blowing the conditioned air toward the feet of the passenger, and a defroster opening for blowing the conditioned air toward the inner side of a windshield glass of the vehicle (which openings are not shown). A face air outlet, a foot air outlet, and a defroster air outlet (not shown) provided in the vehicle interior are connected to the downstream sides of the air flows from these face opening, foot opening, and defroster opening, respectively, via ducts forming the respective air passages.

Thus, the air mix door 34 adjusts the rate of the volume of air passing through the interior condenser 12 to thereby adjust the temperature of conditioned air mixed in the mixing space 35, thus controlling the temperature of the conditioned air blown from each opening. That is, the air mix door 34 serves as a temperature adjustment unit for adjusting the temperature of the conditioned air to be blown into the vehicle interior.

Note that the air mix door 34 is driven by an electric actuator for driving the air mix door. The electric actuator for driving the air mix door has its operation controlled by the control signal output from the air conditioning controller.

A face door for adjusting an opening area of the face air opening is positioned on the upstream side of the air flow of the face air opening; a foot door for adjusting an opening area of the foot air opening is positioned on the upstream side of the air flow of the foot air opening; and a defroster door for adjusting an opening area of the defroster air opening is positioned on the upstream side of the air flow of the defroster air opening (these doors being not shown).

The face door, foot door, and defroster door serve as air outlet mode switch for switching among air outlet modes. These doors are coupled to and rotated with the electric actuator for driving an air outlet mode door via a link mechanism or the like. The electric actuator for driving an air outlet mode door has its operation controlled by a control signal output from the air conditioning controller.

Air outlet modes switched by an air outlet mode switch include a face mode, a bi-level mode, a foot mode, a foot-defroster mode, etc. Specifically, in the face mode, the face air outlet is fully opened to blow the air from the face air outlet toward the upper body of a passenger in the vehicle compartment. In the bi-level mode, both the face air outlet and the foot air outlet are opened to blow air toward the upper body and feet of the passenger in the vehicle compartment. In the foot mode, the foot air outlet is fully opened with a defroster air outlet opened only by a small opening degree to blow the air mainly from the foot air outlet. In the foot-defroster mode, the foot air outlet and the defroster air outlet are opened by the same degree to blow the air from both the foot air outlet and the defroster air outlet.

Further, an air outlet mode selector switch provided in an operation panel is manually operated by the passenger, so that the defroster air outlet is fully opened to enable setting of a defroster mode of blowing air from the defroster air outlet toward the inner face of the windshield glass of the vehicle.

Next, an electric controller will be described below. The air conditioning controller includes a well-known microcomputer, including a CPU, a ROM, a RAM, and the like, and its peripheral circuit. The air conditioning controller performs various computations and processing based on control programs stored in the ROM, and controls the operations of various devices 11, 14a to 14d, 18a to 18c, and 32, etc., to be controlled that are connected to an output side of the controller.

The input side of the air conditioning controller is connected to a group of sensors for air conditioning control, which includes an inside air sensor, an outside air sensor, a solar radiation sensor, a discharge temperature sensor, a discharge pressure sensor, an evaporator temperature sensor, an air temperature sensor, an exterior heat exchanger temperature sensor, and the like. Detection signals from the sensor group are input to the input side of the air conditioning controller. The inside air sensor is an inside air temperature detector that detects a vehicle interior temperature (inside air temperature) Tr. The outside air sensor is an outside air temperature detector that detects a vehicle exterior temperature (outside air temperature) Tam. The solar radiation sensor is a solar radiation amount detector that detects the amount of solar radiation As onto the vehicle interior. The discharge temperature sensor detects a discharge refrigerant temperature Td of the refrigerant discharged from the compressor 11. The discharge pressure sensor detects a discharge refrigerant pressure (high-pressure side refrigerant pressure) Pd of the refrigerant discharged from the compressor 11. The evaporator temperature sensor detects a refrigerant evaporation temperature (evaporator temperature) Tefin in the interior evaporator 23. The air temperature sensor detects an air temperature TAV to be blown from the mixing space into the vehicle interior. The exterior heat exchanger temperature sensor detects an exterior unit temperature Ts of the exterior heat exchanger 17.

The evaporator temperature sensor is adapted to detect the temperature of a heat exchanging fin of the interior evaporator 23, but may adopt a temperature detector for detecting the temperature of other parts of the interior evaporator 23.

The exterior heat exchanger temperature sensor is adapted to detect the temperature of a refrigerant outflow port of the exterior heat exchanger 17, but may adopt a temperature detector for detecting the temperature of other parts of the interior evaporator 23.

In this embodiment, the air temperature sensor for detecting the air temperature TAV is provided. As the air temperature TAV, a value calculated based on the evaporator temperature Tefin, the high-pressure side refrigerant temperature Td, and the like may be used.

The operation panel (not shown) is disposed near an instrument board at the front of the vehicle compartment, and coupled to the input side of the air conditioning controller. Operation signals are input from various types of operation switches provided on the operation panel.

Various types of operation switches provided on the operation panel include an automatic switch, an air cooler switch (A/C switch), an air volume setting switch, a temperature setting switch, a blow-out mode selector switch, and the like. The automatic switch sets or resets an automatic control operation of the vehicle air conditioner 1. The A/C switch performs cooling of the vehicle interior. The air volume setting switch manually sets the volume of air from the blower 32. The temperature setting switch is a target temperature setting portion that sets a target temperature Tset of the vehicle interior. The blow-out mode selector switch manually sets a blow-out mode.

The air conditioning controller is integrally structured with a control unit for controlling various devices to be controlled connected to an output side of the controller. The control unit for controlling the operation of each of the devices to be controlled may include a structure (hardware and software) that is adapted to control the operation of each of the devices to be controlled.

For example, in the air conditioning controller, the structure (hardware and software) for controlling the operation (refrigerant discharge capacity) of the compressor 11 serves as a compressor control unit, and the structure (hardware and software) for controlling the operation of each of the opening/closing valves 18a to 18c which configure the refrigerant circuit switch serves as a refrigerant circuit control unit. The compressor control unit, the refrigerant circuit control unit, and the like may be configured as another separate air conditioning controller with respect to the air conditioning controller.

Next, the operation of the air conditioning controller according to the present disclosure will be described. As described above, the vehicle air conditioner 1 can switch its operation among the air cooling mode, the air heating mode, the weak dehumidification-air heating mode, and the dehumidification-air heating mode. Switching among these operation modes is performed by executing an air conditioning control program. The air conditioning control program is executed when the automatic switch on the operation panel is turned on (ON).

More specifically, the main routine of the air conditioning control program involves reading the detection signals from the above-mentioned sensor group for the air conditioning control, and the operation signals from the various air conditioning operation switches. A target air temperature TAO which is a target temperature of air to be blown into the vehicle interior is calculated based on the following formula F3, based on the values of the detection signals and the operation signals read.

$$TAO=Kset \times Tset-Kr \times Tr-Kam \times Tam-Ks \times As+C \quad (F3)$$

where Tset is a vehicle interior preset temperature set by the temperature setting switch, Tr is a vehicle interior temperature (inside air temperature) detected by the inside air sensor, Tam is an outside air temperature detected by the outside air sensor, and As is an amount of solar radiation detected by the solar radiation sensor. The Kset, Kr, Kam, and Ks are control gains, and C is a constant for correction.

When an air cooler switch on the operation panel is turned on, and the target air temperature TAO is lower than a predetermined air-cooling reference temperature α, the operation in the air cooling mode is performed. The operation in the weak dehumidification-air heating mode is performed when the target air temperature TAO is equal to or higher than the air-cooling reference temperature α with the air cooler switch turned on, and the outside air temperature Tam is higher than a predetermined dehumidification-air heating reference temperature β.

On the other hand, the operation in the dehumidification-air heating mode is performed when the target air temperature TAO is equal to or higher than the air-cooling reference temperature α with the air cooler switch turned on, and the outside air temperature Tam is equal to or lower than the dehumidification-air heating reference temperature β. When the air cooler switch is not turned on, the operation in the air heating mode is performed.

Thus, the air cooling mode is performed when the outside air temperature is relatively high, mainly, in summer or the like. The weak dehumidification-air heating mode is performed mainly in spring or autumn. The dehumidification heating mode is adapted to be performed mainly in early spring or winter, specifically, when the total heat amount required for sufficiently heating the air is larger than the sum of the compression working amount of the compressor 11 and the heat absorption amount by the interior evaporator 23, or when the frost formation (frost) of the interior evaporator 23 needs to be more highly suppressed than in the weak dehumidification-air heating mode.

Further, the air heating mode is performed when the absolute humidity of outside air is decreased at a low outside air temperature in winter (for example, when the outside air temperature is −10° C. or less), and the outside air is introduced from an inside/outside air switch 33, thereby diminishing the need for dehumidification of the air. Now, a description will be given of the operation of each of the operation modes.

(a) Air Cooling Mode

In the air cooling mode, the air conditioning controller completely closes the first flow rate adjustment valve 14a, fully opens the second flow rate adjustment valve 14b, fully opens the third flow rate adjustment valve 14c, and fully opens the fourth flow rate adjustment valve 14d. Further, the air conditioning controller closes the first opening/closing valve 18a, closes the second opening/closing valve 18b, and closes the third opening/closing valve 18c.

Thus, in the air cooling mode, the refrigeration cycle using the ejector (ejector refrigeration cycle) is configured in the following manner. As indicated by solid arrows in FIG. 1, the refrigerant circulates through the compressor 11, the interior condenser 12, (the second flow rate adjustment valve 14b), the exterior heat exchanger 17, (the third flow rate adjustment valve 14c), the accumulator 16, (the check valve 19, the fourth flow rate adjustment valve 14d), the cooling side ejector 20, the cooling side gas-liquid separator 21, and the compressor 11 in this order. At the same time, the refrigerant circulates through the cooling side gas-liquid separator 21, the fixed throttle 22, the interior evaporator 23, and the cooling side refrigerant suction port 20d of the cooling side ejector 20 in this order.

With the refrigerant circuit structure, the air conditioning controller determines the operation states of the respective various devices to be controlled (control signals output to the respective devices to be controlled) based on the target air temperature TAO, the detection signals from the sensor group, and the like.

For example, the refrigerant discharge capacity of the compressor 11, that is, the control signal to be output to an electric motor of the compressor 11 is determined in the following way. First, a target evaporator outlet air temperature TEO of the interior evaporator 23 is determined based on the target air temperature TAO with reference to the control map pre-stored in the air conditioning controller. The target evaporator outlet air temperature TEO is determined to be equal to or higher than a reference frost-formation preventing temperature (e.g., 1° C.), which is determined to be capable of suppressing the frost formation in the interior evaporator 23.

Then, a control signal to be output to the electric motor of the compressor 11 is determined based on a deviation between the target evaporator outlet air temperature TEO and the evaporator temperature Tefin detected by the evaporator temperature sensor such that the evaporator temperature Tefin approaches the target evaporator outlet air temperature TEO by the feedback control.

The control signal output to the electric actuator for driving the air mix door 34 is determined such that the air mix door 34 closes an air passage on the side of the interior condenser 12, and that the whole air having passed through the interior evaporator 23 flows, while bypassing the interior condenser 12. In the air cooling mode, the opening degree of the air mix door 34 may be controlled such that the air temperature TAV approaches the target air temperature TAO.

The control signal or the like determined as mentioned above are output to the respective various devices to be controlled. Then, a control routine is repeated until the operation of the vehicle air conditioner is requested to stop. The control routine involves reading the above-mentioned detection signal and operation signal, calculating the target air temperature TAO, determining the operation state of each of various devices to be controlled, and outputting a control voltage and the control signal, every predetermined control cycle. Such repetition of the control routine is also performed in other operation modes in the same way.

Figure 5:
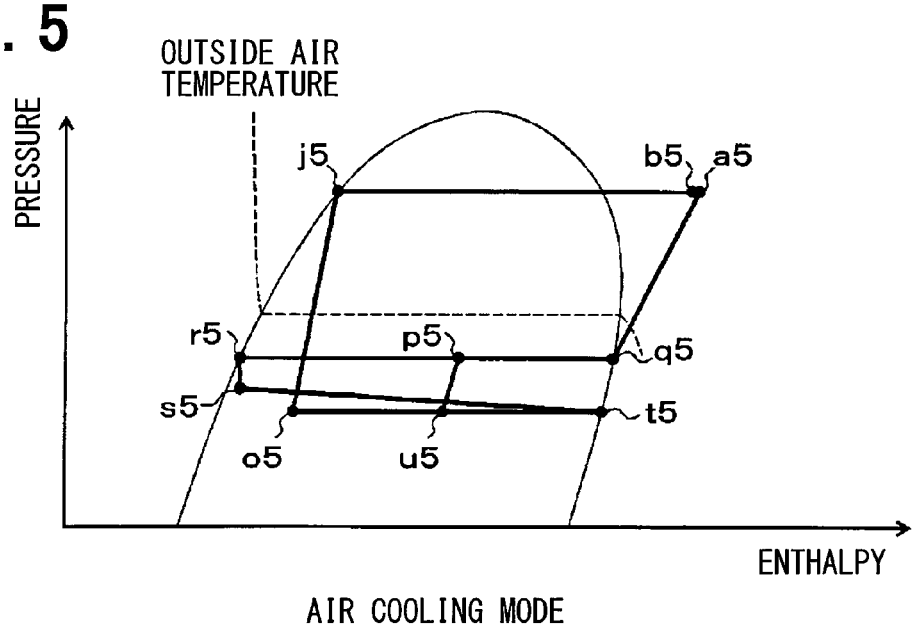
FIG. 5 is a Mollier chart showing the state of refrigerant in the air cooling mode of the refrigeration cycle apparatus in the first embodiment.

Thus, the refrigeration cycle apparatus 10 in the air cooling mode changes the state of the refrigerant as illustrated in a Mollier chart of FIG. 5. Specifically, the high-pressure refrigerant discharged from the compressor 11 (indicated by a point a5 in FIG. 5) flows into the interior condenser 12. At this time, the air mix door 34 closes an air passage on the side of the interior condenser 12, so that the refrigerant flowing into the interior condenser 12 flows out of the interior condenser 12 almost without exchanging heat with the air.

The first and second opening/closing valves 18a and 18b are closed, the first flow rate adjustment valve 14a is completely closed, and the second flow rate adjustment valve 14b is fully opened. Thus, the refrigerant flowing out of the interior condenser 12 (as indicated by a point b5 in FIG. 5) flows into one of the refrigerant inflow and outflow ports of the exterior heat exchanger 17 via the first three-way joint 13a, the second three-way joint 13b, the second flow rate adjustment valve 14b, and the third three-way joint 13c. The refrigerant flowing into the exterior heat exchanger 17 dissipates heat into the outside air blown from the blower fan in the exterior heat exchanger 17 (as indicated from the point b5 to a point j5 in FIG. 5).

The refrigerant flowing out of the other one of the refrigerant inflow and outflow ports of the exterior heat exchanger 17 flows into the accumulator 16 via the third flow rate adjustment valve 14c fully opened, and then is separated into gas and liquid phase refrigerants. Since the third opening/closing valve 18c is closed and the fourth flow rate adjustment valve 14d is fully opened, the liquid-phase refrigerant separated by the accumulator 16 flows into the cooling side nozzle portion 20a of the cooling side ejector 20 via the check valve 19, the fourth three-way joint 13d, and the fourth flow rate adjustment valve 14d.

The refrigerant flowing into the cooling side nozzle portion 20a is isentropically decompressed and injected (as indicated from a point j5 to a point o5 in FIG. 5). By a suction effect of the injection refrigerant, the refrigerant flowing out of the interior evaporator 23 is drawn from the cooling side refrigerant suction port 20d of the cooling side ejector 20. The injection refrigerant injected from the cooling side nozzle portion 20a and the suction refrigerant drawn from the cooling side refrigerant suction port 20d flow into the cooling side diffuser 20g (as indicated from the point o5 to a point u5, and from a point t5 to the point u5 in FIG. 5, respectively).

The cooling side diffuser 20g converts the velocity energy of the refrigerant into the pressure energy thereof by increasing the refrigerant passage area. Thus, the pressure of the mixed refrigerant including the injection refrigerant and the suction refrigerant is increased (as indicated from the point u5 to a point p5 in FIG. 5). The refrigerant flowing out of the cooling side diffuser 20g flows into the cooling side gas-liquid separator 21 to be separated into gas and liquid phase refrigerants (as indicated from the point p5 to a point q5, and from the point p5 to a point r5 in FIG. 5, respectively).

The liquid-phase refrigerant separated by the cooling side gas-liquid separator 21 is isentropically decompressed by the fixed throttle 22 (as indicated from the point r5 to a point s5 in FIG. 5). The refrigerant decompressed by the fixed throttle 22 flows into the interior evaporator 23, and exchanges heat with air blown from the blower 32 to evaporate itself (as indicated from the point s5 to a point t5 in FIG. 5). In this way, the air is cooled, thereby achieving the air cooling of the vehicle interior.

The refrigerant flowing out of the interior evaporator 23 is drawn from the cooling side refrigerant suction port 20d of the cooling side ejector 20. The gas-phase refrigerant separated by the cooling side gas-liquid separator 21 (as indicated at a point q5 in FIG. 5) is drawn into the compressor 11 via the fifth three-way joint 13e, and then compressed again (as indicated from the point q5 to a point a5 in FIG. 5).

Thus, in the air cooling mode, the air cooled by the interior evaporator 23 is blown into the vehicle interior, thereby enabling the air cooling of the vehicle interior. In the air cooling mode, the fourth flow rate adjustment valve 14d is fully opened. However, the valve opening degree of the fourth flow rate adjustment valve 14d may be adjusted according to a flow rate of the refrigerant circulating through the cycle.

(b) Weak Dehumidification-Air Heating Mode

In the weak dehumidification-air heating mode, the air conditioning controller completely closes the first flow rate adjustment valve 14a, puts the second flow rate adjustment valve 14b into a throttled state exhibiting a decompression effect, fully opens the third flow rate adjustment valve 14c, and fully opens the fourth flow rate adjustment valve 14d. Further, the air conditioning controller closes the first opening/closing valve 18a, closes the second opening/closing valve 18b, and closes the third opening/closing valve 18c.

Thus, in the weak dehumidification-air heating mode, as indicated by the solid arrows of FIG. 1, the ejector refrigeration cycle is configured to allow the refrigerant to circulate therethrough in the same manner as the air cooling mode. With the refrigerant circuit structure, the air conditioning controller determines the operation states of the respective various devices to be controlled based on the target air temperature TAO, the detection signals from the sensor group, and the like.

For example, the refrigerant discharge capacity of the compressor 11 is determined in the same way as the air cooling mode. A control signal to be output to the electric actuator for driving the air mix door 34 is determined such that the air temperature TAV approaches the target air temperature TAO. The valve opening degree of the second flow rate adjustment valve 14b is determined to be a predetermined valve opening degree.

Figure 6:
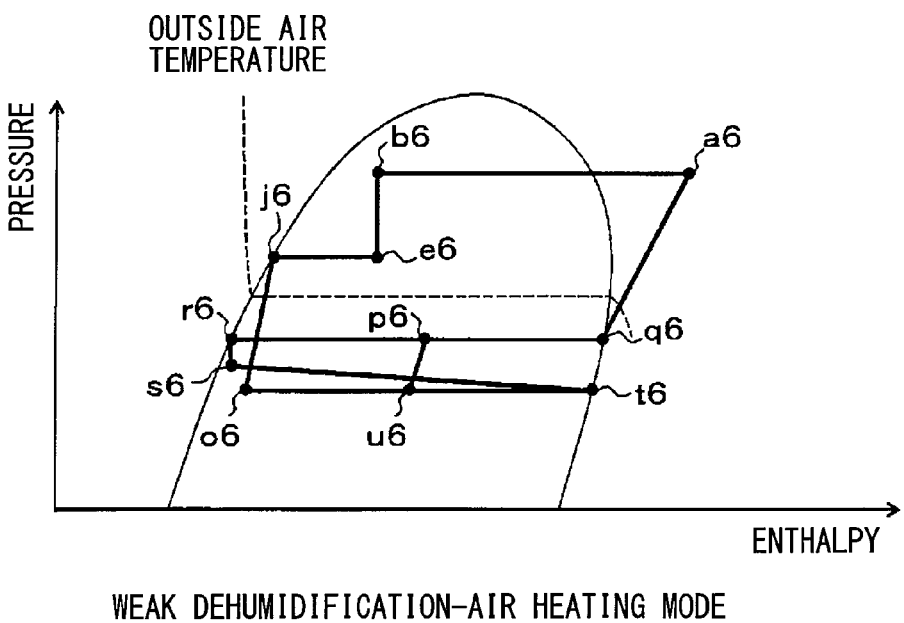
FIG. 6 is a Mollier chart showing the state of refrigerant in the weak dehumidification-air heating mode of the refrigeration cycle apparatus in the first embodiment.

Thus, in the refrigeration cycle apparatus 10 in the weak dehumidification-air heating mode, the state of the refrigerant is changed as illustrated in a Mollier chart of FIG. 6. Each reference character indicative of the state of refrigerant in the Mollier chart of FIG. 6 includes the same letter of alphabet as that in an equivalent position on the cycle structure in the Mollier chart of FIG. 5, followed by a number that is different from that in FIG. 5. The same goes for the Mollier charts below.

In the weak dehumidification-air heating mode, since the air mix door 34 opens the air passage on the side of the interior condenser 12, the high-pressure refrigerant discharged from the compressor 11 (as indicated by a point a6 in FIG. 6) flows into the interior condenser 12 to exchange heat with a part of air cooled and dehumidified by the interior evaporator 23, thereby dissipating heat therefrom (as indicated from the point a6 to a point b6 in FIG. 6). In this way, a part of the air is heated.

The second opening/closing valve 18b is closed, the first flow rate adjustment valve 14a is completely closed, and the second flow rate adjustment valve 14b is brought into a throttled state. Thus, the refrigerant flowing out of the interior condenser 12 flows into the second flow rate adjustment valve 14b to be isentropically decompressed (as indicated from a point b6 to a point e6 in FIG. 6). Since the first opening/closing valve 18a is closed, the refrigerant flowing out of the second flow rate adjustment valve 14b flows into one of the refrigerant inflow and outflow ports of the exterior heat exchanger 17 via the third three-way joint 13c.

The refrigerant flowing into the exterior heat exchanger 17 dissipates heat into the outside air blown from the blower fan in the exterior heat exchanger 17 (as indicated from the point e6 to a point j6 in FIG. 5). The refrigerant flowing out of the other one of the refrigerant inflow and outflow ports of the exterior heat exchanger 17 flows into the accumulator 16 via the third flow rate adjustment valve 14c fully opened, and then is separated into gas and liquid phase refrigerants. The operations following this step will be the same as those in the air cooling mode.

Thus, in the weak dehumidification-air heating mode, the air cooled and dehumidified by the interior evaporator 23 is heated again in the interior condenser 12 and blown into the vehicle interior to achieve the dehumidification-air heating of the vehicle interior.

Note that in the weak dehumidification-air heating mode, the second flow rate adjustment valve 14b is brought into the throttled state, which reduces the temperature of the refrigerant flowing into the exterior heat exchanger 17 as compared to in the air cooling mode. Thus, a difference between the refrigerant temperature in the exterior heat exchanger 17 and the outside air temperature can be decreased to reduce the amount of dissipation of heat in the exterior heat exchanger 17 as compared to in the air cooling mode.

As a result, the refrigerant pressure in the interior condenser 12 can be increased to thereby improve the heating capacity of air in the interior condenser 12 without increasing the flow rate of the circulation refrigerant circulating through the cycle, as compared to the case where the operation of the air mix door 34 is controlled such that the air temperature TAV simply approaches the target air temperature TAO in the air cooling mode.

(b) Dehumidification-Air Heating Mode

In the dehumidification-air heating mode, the air conditioning controller puts the first flow rate adjustment valve 14a into the throttled state, completely closes the second flow rate adjustment valve 14b, puts the third flow rate adjustment valve 14c into the throttled state, and fully opens the fourth flow rate adjustment valve 14d. Further, the air conditioning controller opens the first opening/closing valve 18a, opens the second opening/closing valve 18b, and opens the third opening/closing valve 18c.

Thus, in the dehumidification-air heating mode, the ejector refrigeration cycle is configured as indicated by solid arrows in FIG. 2. Specifically, the refrigerant circulates through the compressor 11, the interior condenser 12, the first flow rate adjustment valve 14a, the heating side ejector 15, the accumulator 16, (the third opening/closing valve 18c), and the compressor 11 in this order, while the refrigerant circulates through the accumulator 16, the third flow rate adjustment valve 14c, the exterior heat exchanger 17, (the first opening/closing valve 18a), and the heating side refrigerant suction port 15d of the heating side ejector 15 in this order.

Simultaneously, the ejector refrigeration cycle is configured in the following way. Specifically, the refrigerant circulates through the compressor 11, the interior condenser 12, (the second opening/closing valve 18b, the fourth flow rate adjustment valve 14d), the cooling side ejector 20, the cooling side gas-liquid separator 21, and the compressor 11 in that order, and also circulates through the cooling side gas-liquid separator 21, the fixed throttle 22, the interior evaporator 23, and the cooling side refrigerant suction port 20d of the cooling side ejector 20 in this order.

That is, in the dehumidification-air heating mode, the flow of the refrigerant flowing out of the interior condenser 12 is branched by the first three-way joint 13a, and one of the branched refrigerants flows into the heating side nozzle portion 15a of the heating side ejector 15. The other refrigerant flows into the cooling side nozzle portion 20a of the cooling side ejector 20, so that the refrigerant circuit is configured in this way.

In this refrigerant circuit, the heating side ejector 15 and the cooling side ejector 20 are connected in parallel with respect to the refrigerant flow in the whole cycle, so that the exterior heat exchanger 17 connected to the heating side ejector 15 and the interior evaporator 23 connected to the cooling side ejector 20 are connected in parallel with respect to the refrigerant flow in the whole cycle.

The air conditioning controller with the refrigerant circuit structure determines the operating states of the respective various devices to be controlled based on the target air temperature TAO, the detection signals from the sensor group, and the like, in the same way as in the weak dehumidification-air heating mode.

The valve opening degree of the first flow rate adjustment valve 14a is determined such that the refrigerant evaporation temperature of the interior evaporator 23 is equal to or higher than the reference frost-formation preventing temperature (for example 1° C.) that can prevent the frost in the interior evaporator 23. The valve opening degree of the third flow rate adjustment valve 14c is determined such that the refrigerant evaporation temperature in the exterior heat exchanger 17 is an outside air temperature Tam or less (further, in the first embodiment, 0° C. or less).

A general ejector draws the refrigerant from a refrigerant suction port by a suction effect of an injection refrigerant, thereby recovering the loss of the kinetic energy when the refrigerant is decompressed by a nozzle. The diffuser converts the recovered kinetic energy into a pressure energy. Thus, the flow rate of refrigerant flowing into the nozzle is increased to thereby increase the amount of recovered energy, which can increase the pressurized amount in the diffuser.

The valve opening degree of the first flow rate adjustment valve 14a is changed to thereby change a ratio of the flow rate of the refrigerant flowing from the first three-way joint 13a into the heating side nozzle portion 15a of the heating side ejector 15 to that of the refrigerant flowing from the first three-way joint 13a into the cooling side nozzle portion 20a of the cooling side ejector 20, thus adjusting the refrigerant evaporation temperature in the interior evaporator 23.

Specifically, for example, when the evaporator temperature Tefin is equal to or lower than the reference frost-formation preventing temperature, the valve opening degree of the first flow rate adjustment valve 14a is increased, thereby increasing the flow rate of the refrigerant flowing into the heating side nozzle portion 15a. Thus, the amount of pressurized in the heating side diffuser 15g is increased to raise the refrigerant evaporation pressure (refrigerant evaporation temperature) of the interior evaporator 23.

Figure 7:
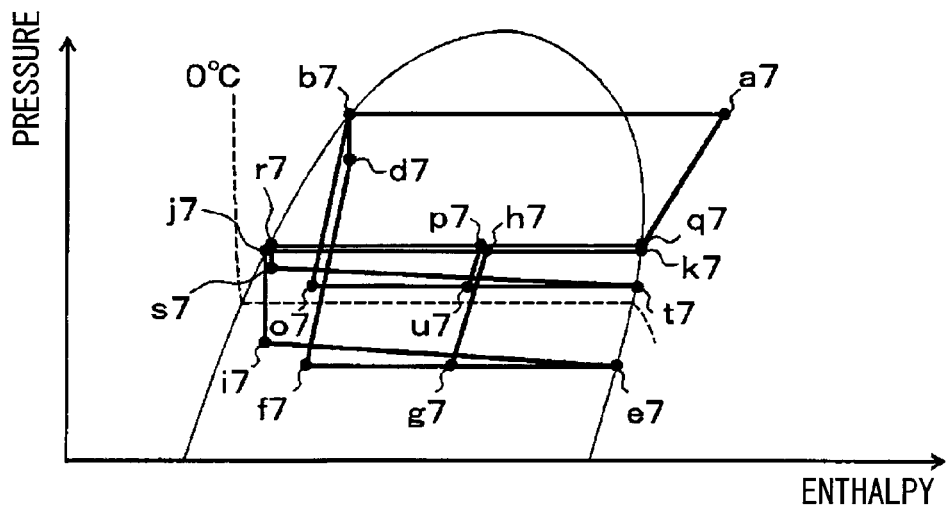
FIG. 7 is a Mollier chart showing the state of refrigerant in the dehumidification-air heating mode of the refrigeration cycle apparatus in the first embodiment.

Therefore, in the refrigeration cycle apparatus 10 in the dehumidification-air heating mode, as shown in the Mollier chart of FIG. 7, the high-pressure refrigerant (as indicated by a point a7 in FIG. 7) discharged from the compressor 11 flows into the interior condenser 12, and then exchanges heat with air cooled and dehumidified by the interior evaporator 23, thereby dissipating heat therefrom (as indicated from the point a7 to a point b7 in FIG. 7). In this way, the air is heated. The flow of the refrigerant flowing out of the interior condenser 12 is branched by the first three-way joint 13a because the second opening/closing valve 18b is opened.

One of the refrigerants branched by the first three-way joint 13a flows into the first flow rate adjustment valve 14a via the second three-way joint 13b to be isentropically expanded (as indicated from the point b7 to a point d7 in FIG. 7). The refrigerant decompressed by the first flow rate adjustment valve 14a flows into the heating side nozzle portion 15a of the heating side ejector 15. The refrigerant flowing into the heating side nozzle portion 15a is isentropically decompressed and injected (as indicated from a point d7 to a point f7 in FIG. 7).

By the suction effect of the injection refrigerant, the refrigerant flowing out of the exterior heat exchanger 17 is drawn into the heating side refrigerant suction port 15d of the heating side ejector 15 via the third three-way joint 13c and the first opening/closing valve 18a. The injection refrigerant injected from the heating side nozzle portion 15a and the suction refrigerant drawn from the heating side refrigerant suction port 15d flow into the heating side diffuser 15g (as indicated from the point f7 to a point g7, and from the point e7 to the point g7 in FIG. 7, respectively).

The heating side diffuser 15g converts the velocity energy of the refrigerant into the pressure energy thereof by increasing the refrigerant passage area. Thus, the pressure of the mixed refrigerant including the injection refrigerant and the suction refrigerant rises (as indicated from the point g7 to a point h7 in FIG. 7). The refrigerant flowing out of the heating side diffuser 15g flows into the accumulator 16 to be separated into gas and liquid phases (as indicated from the point h7 to a point k7, and from the point h7 to a point j7 in FIG. 7, respectively).

The liquid-phase refrigerant separated by the accumulator 16 is isentropically decompressed by the third flow rate adjustment valve 14c in the throttled state (as indicated from the point j7 to a point i7 in FIG. 7). At this time, the third flow rate adjustment valve 14c decompresses the refrigerant until the refrigerant evaporation temperature in the exterior heat exchanger 17 is equal to or less than the outside air temperature Tam (further, 0° C. or less in the first embodiment).

The refrigerant decompressed by the third flow rate adjustment valve 14c flows into the other one of the refrigerant inflow and outflow ports of the exterior heat exchanger 17, and absorbs heat from the outside air blown from the blower fan to evaporate itself (as indicated from the point i7 to a point e7 in FIG. 7). That is, the flow direction of the refrigerant in the exterior heat exchanger 17 in the dehumidification-air heating mode is reversed to the flow direction of the refrigerant in the air cooling mode and the weak dehumidification-air heating mode.

Since the second flow rate adjustment valve 14b is completely closed, the refrigerant flowing out of one of the refrigerant inflow and outflow ports of the exterior heat exchanger 17 is drawn from the heating side refrigerant suction port 15d of the heating side ejector 15 via the third three-way joint 13c and the first opening/closing valve 18a. The gas-phase refrigerant separated by the accumulator 16 (as indicated by a point k7 in FIG. 7) is drawn into the compressor 11 via the third opening/closing valve 18c.

The other refrigerant branched by the first three-way joint 13a flows into the cooling side nozzle portion 20a of the cooling side ejector 20 via the second opening/closing valve 18b, the fourth three-way joint 13d, and the fourth flow rate adjustment valve 14d. The refrigerant flowing into the cooling side nozzle portion 20a of the cooling side ejector 20 is isentropically decompressed and injected (as indicated from a point b7 to a point o7 in FIG. 7). The operations following this step will be the same as those in the air cooling mode and in the weak dehumidification-air heating mode.

In the dehumidification-air heating mode, since the third opening/closing valve 18c is opened, the gas-phase refrigerant flowing out of the cooling side gas-liquid separator 21 (as indicated by a point q7 in FIG. 7) and the gas-phase refrigerant flowing out of the accumulator 16 (as indicated by a point k7 in FIG. 7) are merged at the fifth three-way joint 13e to be drawn into the compressor 11.

Thus, in the dehumidification-air heating mode, like the weak dehumidification-air heating mode, the air cooled and dehumidified by the interior evaporator 23 can be reheated by the interior condenser 12 and blown into the vehicle interior to thereby perform the dehumidification and air-heating of the vehicle interior.

Note that in the dehumidification-air heating mode, the exterior heat exchanger 17 and the interior evaporator 23 are connected in parallel with respect to the refrigerant flow as the whole cycle, and the exterior heat exchanger 17 serves as the evaporator. Thus, the air can be heated by using heat absorbed from the outside air as the heat source, so that the amount of heat dissipation in the interior condenser 12 is increased to enable improvement of the heating capacity of air in the interior condenser 12, as compared to the weak dehumidification-air heating mode.

(d) Air Heating Mode

In the air heating mode, the air conditioning controller puts the first flow rate adjustment valve 14a into the throttled state, completely closes the second flow rate adjustment valve 14b, puts the third flow rate adjustment valve 14c into the throttled state, and completely closes the fourth flow rate adjustment valve 14d, while opening the first opening/closing valve 18a, closing the second opening/closing valve 18b, and opening the third opening/closing valve 18c.

Thus, in the air heating mode, the ejector refrigeration cycle is configured as indicated by solid arrows in FIG. 3. Specifically, the refrigerant circulates through the compressor 11, the interior condenser 12, the first flow rate adjustment valve 14a, the heating side ejector 15, the accumulator 16, (the third opening/closing valve 18c), and the compressor 11 in this order, while the refrigerant circulates through the accumulator 16, the third flow rate adjustment valve 14c, the exterior heat exchanger 17, (the first opening/closing valve 18a), and the heating side refrigerant suction port 15d of the heating side ejector 15 in this order.

The air heating mode includes a normal operation in which the air is heated while exhibiting the high COP in the cycle, and a high heating-capacity operation in which the air is heated while exhibiting the high heating capacity Qc in the cycle.

First, the normal operation will be described below. During the normal operation in the air heating mode, the air conditioning controller with the refrigerant circuit structure shown in FIG. 3 determines the operation states of the respective various devices to be controlled based on the target air temperature TAO, the detection signals from the sensor group, and the like. For example, the refrigerant discharge capacity of the compressor 11 is determined in the following way. First, a target condenser temperature TCO of the interior condenser 12 is determined based on the target air temperature TAO with reference to the control map pre-stored in the air conditioning controller.

Then, the control signal to be output to the electric motor of the compressor 11 is determined such that the discharge refrigerant temperature Td approaches the target condenser temperature TCO using the feedback control method based on a deviation between the target condenser temperature TCO and the discharge refrigerant temperature Td detected by the discharge temperature sensor.

The control signal to be output to the electric actuator for driving the air mix door 34 is determined such that the whole air having passed through the interior evaporator 23 flows through the air passage on the side of the interior condenser 12.

The control signal to be output to the first flow rate adjustment valve 14a is determined such that the supercool degree of the refrigerant flowing into the first flow rate adjustment valve 14a approaches a target supercool degree that is previously determined so as to substantially maximize a COP. The valve opening degree of the third flow rate adjustment valve 14c is determined such that the refrigerant evaporation temperature in the exterior heat exchanger 17 is the outside air temperature Tam or less.

Figure 8:
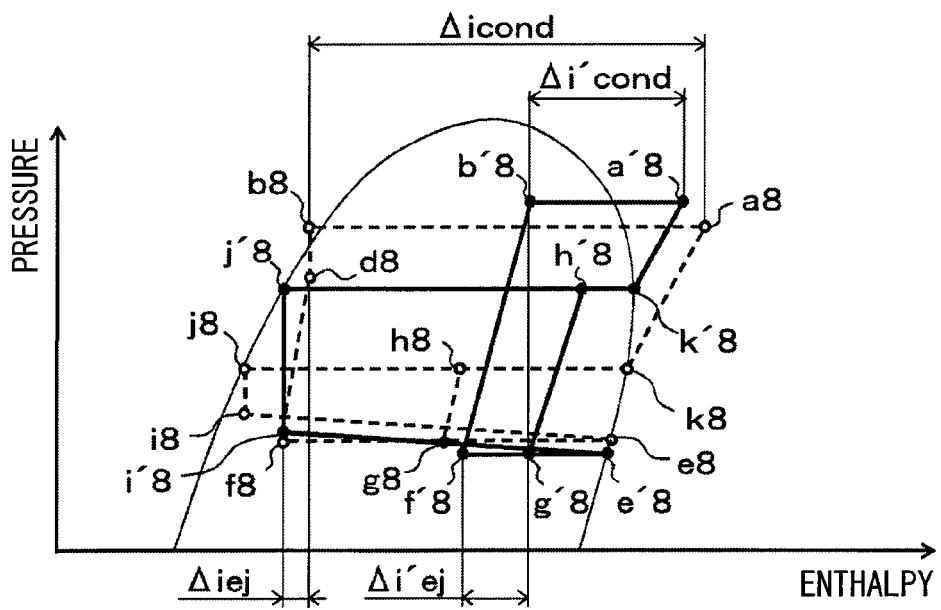
FIG. 8 is a Mollier chart showing the state of refrigerant in the air heating mode of the refrigeration cycle apparatus in the first embodiment.

Therefore, in the refrigeration cycle apparatus 10 during the normal operation in the air heating mode, as indicated by dashed lines in the Mollier chart of FIG. 8, the high-pressure refrigerant (as indicated by a point a8 in FIG. 8) discharged from the compressor 11 flows into the interior condenser 12, and exchanges heat with the air to dissipate heat (as indicated from the point a8 to a point b8 in FIG. 8). In this way, the air is heated. Since the second flow rate adjustment valve 14b is completely closed and the second opening/closing valve 18b is closed, the refrigerant flowing out of the interior condenser 12 flows into the first flow rate adjustment valve 14a.

The refrigerant flowing into the first flow rate adjustment valve 14a is isentropically decompressed and expanded (as indicated from the point b8 to a point d8 in FIG. 8). At this time, the valve opening degree of the first flow rate adjustment valve 14a is adjusted such that a supercool degree of the refrigerant flowing into the first flow rate adjustment valve 14a approaches a target supercool degree. The refrigerant decompressed by the first flow rate adjustment valve 14a flows into the heating side nozzle portion 15a of the heating side ejector 15, and is isentropically decompressed and injected (as indicated from the point d8 to a point f8 in FIG. 8).

The operations following this step will be the same as those on the side of the heating side ejector 15 in the dehumidification-air heating mode. That is, the liquid-phase refrigerant separated by the accumulator 16 is decompressed by the third flow rate adjustment valve 14c. The refrigerant decompressed by the third flow rate adjustment valve 14c absorbs heat from outside air in the exterior heat exchanger 17 to evaporate itself. The refrigerant flowing out of one of the refrigerant inflow and outflow ports of the exterior heat exchanger 17 is drawn from the heating side refrigerant suction port 15d of the heating side ejector 15 (as indicated from the point h8 to a point j8, a point i8, a point e8, and a point g8 in this order of FIG. 8).

The gas-phase refrigerant separated by the accumulator 16 is drawn into the compressor 11 via the third opening/closing valve 18c and the fifth three-way joint 13e, and then compressed again (as indicated from the point k8 to a point a8 in FIG. 8). In the air heating mode, the fourth flow rate adjustment valve 14d is completely closed, and the second opening/closing valve 18b is closed. Thus, the refrigerant does not flow into the side of the cooling side ejector 20, and the gas-phase refrigerant flowing out of the cooling side gas-liquid separator 21 is not drawn into the compressor 11.

Thus, during the normal operation in the air heating mode, the air heated by the interior condenser 12 is blown into the vehicle interior, thereby enabling the air heating of the vehicle interior. Further, in the normal operation, the air conditioning controller adjusts the valve opening degree of the first flow rate adjustment valve 14a, thereby enabling improvement of the COP.

Next, the high heating-capacity operation will be described. The high heating-capacity operation is performed, for example, at a low outside air temperature or the like, that is, when a difference in temperature obtained by subtracting the inside air temperature Tr from the vehicle interior preset temperature Tset is equal to or larger than a reference temperature difference (for example, the temperature difference is 20° C. or more) or the like. In this case, the high heating-capacity operation is performed in such a manner that the refrigeration cycle apparatus 10 exhibits the high heating-capacity (heating capacity) Qc whereby the inside air temperature Tr quickly approaches the vehicle interior preset temperature Tset.

The heating capacity Qc is defined by the following formula F4.

$$Qc = \Delta icond \times Gr \quad (F4)$$

where the term $\Delta icond$ is an enthalpy difference determined by subtracting an enthalpy of the refrigerant on the outlet side of the interior condenser 12 from an enthalpy of the refrigerant on the inlet side of the interior condenser 12, and Or is a flow rate of the refrigerant flowing into the interior condenser 12.

Figure 9:
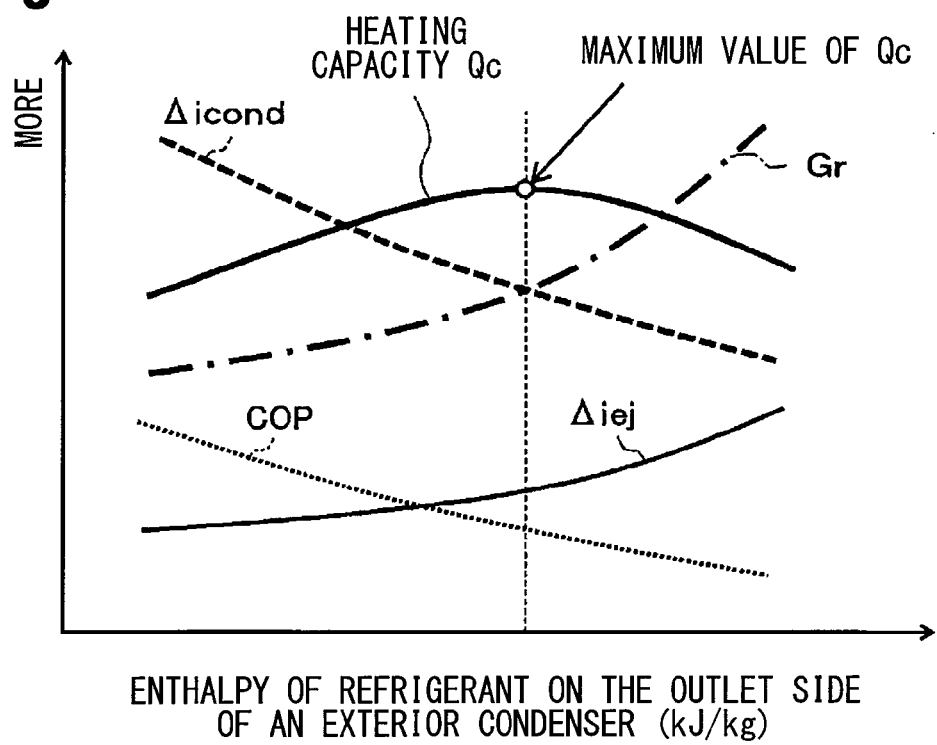
FIG. 9 is a graph showing a change in heating capacity Qc with respect to a change in enthalpy of the refrigerant on the outlet side of an interior condenser.

As indicated by thick dashed lines of FIG. 9, the enthalpy difference $\Delta icond$ of the above-mentioned formula F4 can be increased, together with a decrease in enthalpy of the refrigerant on the outlet side of the interior condenser 12. In the refrigerant circuit structure of the air heating mode, the inlet side of the heating side nozzle portion 15a of the heating side ejector 15 is connected to the outlet side of the interior condenser 12, so that the dryness x of the refrigerant flowing into the heating side nozzle portion 15a is reduced when the enthalpy of the refrigerant on the outlet side of the interior condenser 12 is reduced.

In this kind of ejector, an adiabatic heat drop (for example, $\Delta iej$ of FIG. 8) of the refrigerant decompressed by the nozzle portion is increased as the compressibility of the refrigerant flowing into the nozzle portion becomes higher, which can increase the amount of recovered energy. Conversely, when the compressibility of the refrigerant flowing into the nozzle portion is reduced by decreasing the dryness x of the refrigerant flowing into the nozzle portion, the amount of recovered energy might be reduced, leading to reduction in amount of pressurizing in the diffuser.

When the amount of pressurized in the diffuser is reduced to decrease the density of refrigerant drawn into the compressor 11, the flow rate Or of refrigerant flowing into the interior condenser 12 might be reduced. That is, as indicated by a thick alternate long and short dash line of FIG. 9, the flow rate Or of the refrigerant flowing into the interior condenser 12 might be reduced together with decreasing enthalpy of the refrigerant on the outlet side of the interior condenser 12.

This means that as shown in FIG. 9, the heating capacity Qc obtained by multiplying the enthalpy difference $\Delta icond$ by the flow rate Or of the refrigerant flowing into the interior condenser 12 has the maximum value (peak value) according to a change in enthalpy of the refrigerant on the outlet side of the interior condenser 12 (that is, a change in dryness x of the refrigerant flowing into the heating side nozzle portion 15a). During the high heating-capacity operation, the air conditioning controller adjusts the valve opening degree of the first flow rate adjustment valve 14a such that the heating capacity Qc approaches the maximum value.

More specifically, the air conditioning controller adjusts the valve opening of the first flow rate adjustment valve 14a based on the refrigerant discharge capacity of the compressor 11 (for example, a control signal output to the electric motor of the compressor 11) with reference to a control map previously stored in the air conditioning controller such that the dryness x of the refrigerant flowing into the heating side nozzle portion 15a is not less than 0.5 nor more than 0.8. That is, during the high heating-capacity operation, the first flow rate adjustment valve 14a serves as a dryness adjustment portion.

Thus, during the high heating-capacity operation, the state of the refrigerant changes as illustrated by thick solid lines in a Mollier chart of FIG. 8. That is, during the normal operation, although the enthalpy difference $\Delta icond$ is reduced to an enthalpy difference $\Delta i'cond$, an adiabatic heat drop $\Delta iej$ is increased to $\Delta i'ej$, so that the pressure of the refrigerant drawn into the compressor 11 can be raised from a state indicated by a point k8 to another state indicated by a point k'8 in FIG. 8. As a result, the flow rate Or of the refrigerant is increased as compared to the normal operation, so that the heating capacity Qc can approach the maximum value.

Thus, during the high heating-capacity operation in the air heating mode, the air heated by the interior condenser 12 is blown into the vehicle interior, thereby enabling the air heating of the vehicle interior. Further, in the high heating-capacity operation, the air conditioning controller can exhibit the high heating capacity Qc by adjusting the valve opening degree of the first flow rate adjustment valve 14a.

In the high heating-capacity operation, the refrigerant discharge capacity of the compressor 11 is increased, and the valve opening degree of the first flow rate adjustment valve 14a is also increased in many cases, as compared to the normal operation. The Mollier chart indicated by thick solid lines in FIG. 8 shows the state of the refrigerant when the valve opening degree of the first flow rate adjustment valve 14a is fully opened during the high heating-capacity operation.

As described above, the vehicle air conditioner 1 of the first embodiment can switch its operation among the air cooling mode, the air heating mode, the weak dehumidification-air heating mode, and the dehumidification-air heating mode, thereby achieving the appropriate air conditioning of the vehicle interior. Further, the refrigeration cycle apparatus 10 can obtain the following excellent effects.

(A) In the refrigeration cycle apparatus including the accumulator 16 serving as the liquid storage portion and disposed in the external space, a large difference between the outside air temperature and the temperature of refrigerant stored in the accumulator 16 might lead to transfer of heat between the refrigerant in the accumulator and the outside air.

For example, when the temperature of the refrigerant in the accumulator 16 is lower than the outside air temperature in the air cooling mode, which is to be performed at a relatively high outside air temperature, the refrigerant in the accumulator 16 might absorb heat from the outside air. Such heat absorption in the refrigerant from the outside air reduces the amount of heat absorption from the air, which might cause the reduction in cooling capacity of the refrigeration cycle apparatus 10.

Thus, the refrigeration cycle apparatus, which includes the accumulator 16 serving as the liquid storage portion and disposed in the external space, needs to suppress the reduction in performance due to the unnecessary transfer of heat between the refrigerant in the accumulator 16 and the outside air.

On the other hand, in the first embodiment, in the air cooling mode and weak dehumidification-air heating mode, the refrigerant flowing out of the exterior heat exchanger 17 flows into the accumulator 16, so that the temperature of the refrigerant in the accumulator 16 can be set equal to the outside air temperature, thereby effectively suppress the unnecessary heat transfer between the refrigerant in the accumulator 16 and the outside air.

In the dehumidification-air heating mode, or the air-heating mode which is to be performed when the outside air temperature is relatively low, the refrigerant decompressed by the heating side ejector 15 flows into the accumulator 16. Thus, a difference in temperature between the refrigerant in the accumulator 16 and the outside air can be reduced to thereby prevent the unnecessary transfer of heat between the refrigerant in the accumulator 16 and the outside air.

Accordingly, the refrigeration cycle apparatus 10 can suppress the increase in difference between the temperature of the refrigerant in the accumulator 16 disposed in the external space and the outside air temperature. Therefore, the first embodiment can suppress the degradation of the performance of the refrigeration cycle apparatus 10 due to the unnecessary transfer of heat between the outside air and the refrigerant in the accumulator 16.

(B) The general refrigerant circuit in the dehumidification-air heating mode employs a structure in which the exterior heat exchanger 17 and the interior evaporator 23 serve as an evaporator for evaporating the refrigerant, and are connected to each other in parallel with the refrigerant flow. In this case, if the refrigerant evaporation temperatures of both the heat exchangers are identical to each other, the exterior heat exchanger 17 cannot sufficiently absorb heat, making the heating capacity of air insufficient in some cases.

For example, the exterior heat exchanger 17 and the interior evaporator 23 are connected in parallel with respect to the refrigerant flow. When the refrigerant evaporation temperature in the interior evaporator 23 is adjusted to the temperature that can suppress the frost formation in the interior evaporator 23, the refrigerant evaporation temperature in the exterior heat exchanger 17 might also be adjusted to the substantially same temperature. Thus, a difference between the outside air temperature and the refrigerant evaporation temperature in the exterior heat exchanger 17 is reduced when the outside air temperature is low, so that the refrigerant cannot absorb the sufficient heat from the outside air in the exterior heat exchanger 17.

Thus, in the refrigeration cycle apparatus having the refrigerant circuit structure with the exterior heat exchanger 17 as the evaporator and the interior evaporator 23 connected in parallel, the amount of heat absorption in the exterior heat exchanger 17 needs to be increased to sufficiently improve the heating capacity of the air in the dehumidification-air heating mode.

On the other hand, the dehumidification-air heating mode of the first embodiment takes the refrigerant circuit structure in which the refrigerant outlet side of the exterior heat exchanger 17 communicates with the heating side refrigerant suction port 15d of the heating side ejector 15, while the refrigerant inlet side or refrigerant outlet side of the interior evaporator 23 communicates with the outlet side of the heating side diffuser 15*g* of the heating side ejector 15.

Therefore, in the dehumidification-air heating mode, the refrigerant evaporation pressure in the exterior heat exchanger 17 can approach the lowest refrigerant pressure obtained immediately after the decompression by the heating side nozzle portion 15*a*, and the refrigerant evaporation pressure in the interior evaporator 23 can approach the refrigerant pressure raised by the heating side diffuser 15*g*.

That is, the refrigerant evaporation pressure in the exterior heat exchanger 17 can be set lower than that in the interior evaporator 23. Even though the refrigerant evaporation temperature in the interior evaporator 23 is adjusted to the temperature that can suppress the frost formation in the interior evaporator 23, the refrigerant evaporation temperature in the exterior heat exchanger 17 can be set lower than the outside air temperature.

As a result, in the dehumidification-air heating mode, the refrigerant can absorb sufficient heat from the outside air in the exterior heat exchanger 17, so that the heat can be adequately dissipated into the air by the interior condenser 12. That is, the heating capacity of the air in the dehumidification-air heating mode can be sufficiently improved.

(C) The general refrigerant circuit in the air heating mode employs a structure in which the heat absorbed by the refrigerant from the outside air at the exterior heat exchanger 17 is dissipated into the air at the interior condenser 12. In this case, the refrigerant evaporation temperature at the exterior heat exchanger 17 has to be lower than the outside air temperature such that the refrigerant surely absorbs heat from the outside air at the exterior heat exchanger 17. Thus, when the outside air temperature or the like is low, the refrigerant evaporation temperature (refrigerant evaporation pressure) in the exterior heat exchanger 17 has to be significantly reduced in some cases.

The refrigerant to be applied to a general refrigeration cycle apparatus has its density decreased with decreasing pressure. Once the refrigerant evaporation pressure of the exterior heat exchanger 17 is significantly decreased while the outside air temperature or the like is low, the density of the refrigerant drawn into the compressor 11 is reduced, so that the flow rate of the refrigerant discharged from the compressor 11 might be decreased.

As a result, the total amount of heat dissipated into air by the refrigerant in the interior condenser 12 is lacking as compared to the amount of heat required for air heating of the vehicle interior, which cannot sufficiently heat the air. Thus, in the air heating mode, the refrigeration cycle apparatus that heats the air using heat absorbed by the refrigerant from the outside air in the exterior heat exchanger 17 as a heat source needs to sufficiently improve the heating capacity of the air in the air heating mode.

On the other hand, the air heating mode of the first embodiment performs not only the normal operation for causing the cycle to exhibit the high COP, but also the high heating-capacity operation. The high heating-capacity operation involves maximizing the heating capacity Qc by adjusting the enthalpy of the refrigerant on the outlet side of the interior condenser 12 (or the dryness x of the refrigerant flowing into the heating side nozzle portion 15*a* of the heating side ejector 15) at the low outside air temperature or the like. Thus, the heating capacity of the air in the air heating mode can be sufficiently improved.

In the high heating-capacity operation of the first embodiment, the dryness x of the refrigerant flowing into the heating side nozzle portion 15*a* is controlled to be not less than 0.5 nor more than 0.8. On the other hand, during operation of the general ejector refrigeration cycle (for example, during the normal operation in the air heating mode), the refrigerant flowing into the heating side nozzle portion 15*a* often becomes a liquid-phase refrigerant with a supercool degree, or a gas-liquid two-phase refrigerant with an excessively low dryness x.

Thus, during the normal operation, the dryness x of the refrigerant that is obtained immediately before being injected from the nozzle portion is smaller than 0.5. The injection refrigerant injected from the nozzle portion is mixed with the suction refrigerant in a substantially gas-phase state, thereby drastically increasing its dryness x, while reducing its flow velocity. Thus, as indicated by a thick dashed line in FIG. 10, the two-phase sound velocity $\alpha h$ of a mixed refrigerant including the injection refrigerant and the suction refrigerant is also drastically increased (see Formulas F1 and F2).

During the normal operation, since the flow velocity of the refrigerant obtained immediately after being injected from the nozzle portion is lower than the two-phase sound velocity $\alpha h$, a shock wave might occur in the vicinity of the refrigerant injection port of the nozzle portion when the flow velocity of the two-phase fluid is transferred from the two-phase sound velocity $\alpha h$ or higher (supersonic velocity state) to a value lower than the two-phase sound velocity $\alpha h$ (subsonic velocity state).

Figure 11:
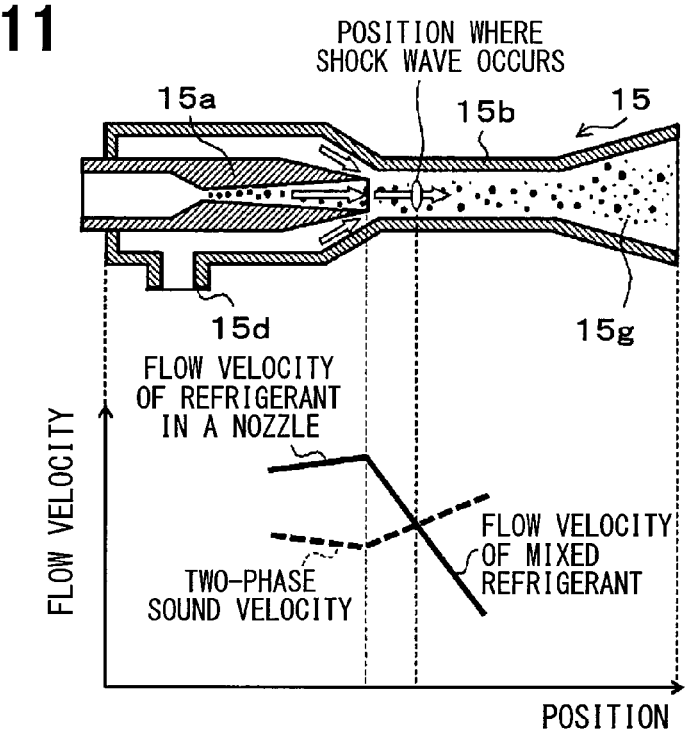
FIG. 11 is an explanatory diagram for explaining a position where a shock wave occurs inside the ejector in a high heating-capacity operation.

However, in the high heating-capacity operation of the first embodiment, the dryness x of the refrigerant that is obtained immediately before being injected from the nozzle portion is controlled to be 0.5 or more, so that a degree of increase in dryness x of the injection refrigerant becomes small as compared to the operation of the general ejector refrigeration cycle. Thus, as shown in FIG. 11, the degree of increase in two-phase sound velocity $\alpha h$ of the mixture of the injection refrigerant and the suction refrigerant is also decreased.

As a result, a position (a position where the shock wave occurs) where the flow velocity of the mixed refrigerant is lower than the two-phase sound velocity $\alpha h$ tends to depart from the refrigerant injection port of the nozzle portion as compared to the operation of the general ejector refrigeration cycle.

When the position of occurrence of the shock wave departs from the refrigerant injection port of the nozzle portion to be shifted to the vicinity of the inlet of the diffuser or to the inside of the diffuser (pressure-increasing portion), the action of the shock wave might destabilize the flow velocity of the refrigerant flowing inside the heating side diffuser 15*g*, thus making the pressurizing performance of the heating side diffuser 15*g* unstable.

On the other hand, the heating side ejector 15 gradually decreases the flow velocity of the mixed refrigerant at the mixing portion 15*e* to a level lower than the two-phase sound velocity $\alpha h$ until the mixed refrigerant reaches the inlet 15*h* of the heating side diffuser 15*g*.

Thus, the shock wave due to the change of the flow velocity of the two-phase refrigerant from the supersonic state to the subsonic state can be generated within the mixing portion 15*e* without being caused within the heating side diffuser 15*g*, to prevent the pressurizing capacity of the heating side diffuser 15*g* from becoming unstable.

When the flow velocity of the two-phase refrigerant becomes the two-phase sound velocity $\alpha h$, a slip ratio (that is, a ratio of the flow velocity of the gas-phase refrigerant to that of the liquid-phase refrigerant) is 1. Thus, the heating side ejector 15 makes the flow velocity of the liquid-phase refrigerant identical to the flow velocity of the gas-phase refrigerant in the mixed refrigerant within the mixing portion 15e, so that the mixed refrigerant can be brought into a state in which the liquid-phase refrigerant and the gas-phase refrigerant are homogeneously mixed.

Thus, the mixed refrigerant can be prevented from flowing into the heating side diffuser 15g with some velocity distribution. The heating side diffuser 15g can effectively convert the velocity energy of the mixed refrigerant to the pressure energy thereof immediately after the mixed refrigerant flows into the heating side diffuser 15g. As a result, the pressurizing performance of the heating side diffuser 15g can be improved.

Figure 10:
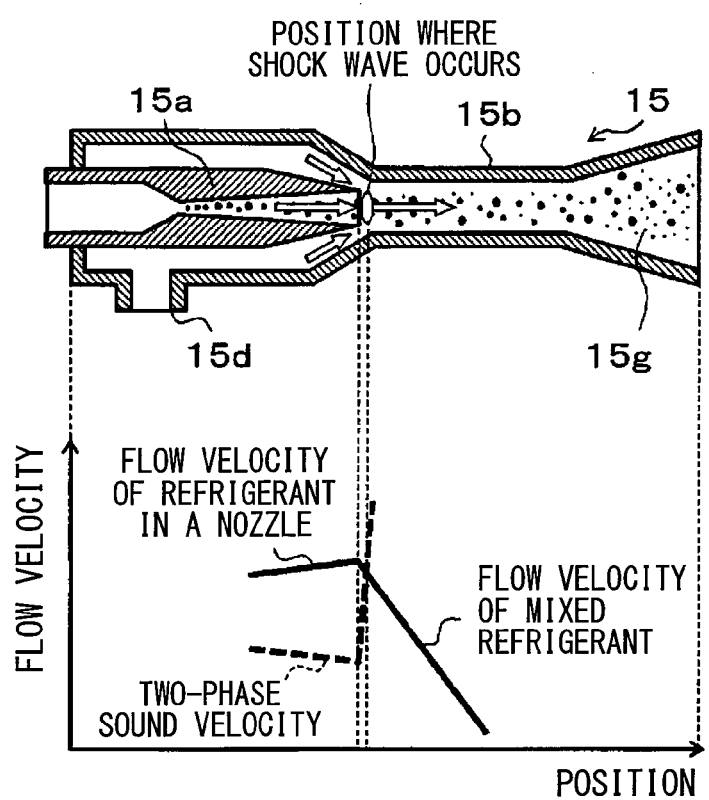
FIG. 10 is an explanatory diagram for explaining a position where a shock wave occurs inside the ejector in a normal operation.

The upper part of each of FIGS. 10 and 11 exemplarily shows the structure of a general ejector. For clarifying the figures, the parts having the same or equivalent functions as those of the components of the heating side ejector 15 are designated by the same reference numerals as those in the heating side ejector 15.

In the dehumidification-air heating mode and the air heating mode, the power consumption of the compressor 11 can be reduced by the pressurizing effect of the heating side ejector 15. Further, in the air cooling mode, the weak dehumidification-air heating mode, and the dehumidification-air heating mode, the cooling side ejector 20 is employed as the cooling side decompressor, so that the power consumption of the compressor 11 can be reduced by the pressurizing effect of the cooling side ejector.

That is, the refrigeration cycle apparatus can improve the COP of the refrigeration cycle apparatus 10 in any operation mode by the pressurizing effect of the heating side ejector 15 and the cooling side ejector 20.

(Second Embodiment)

Figure 12:
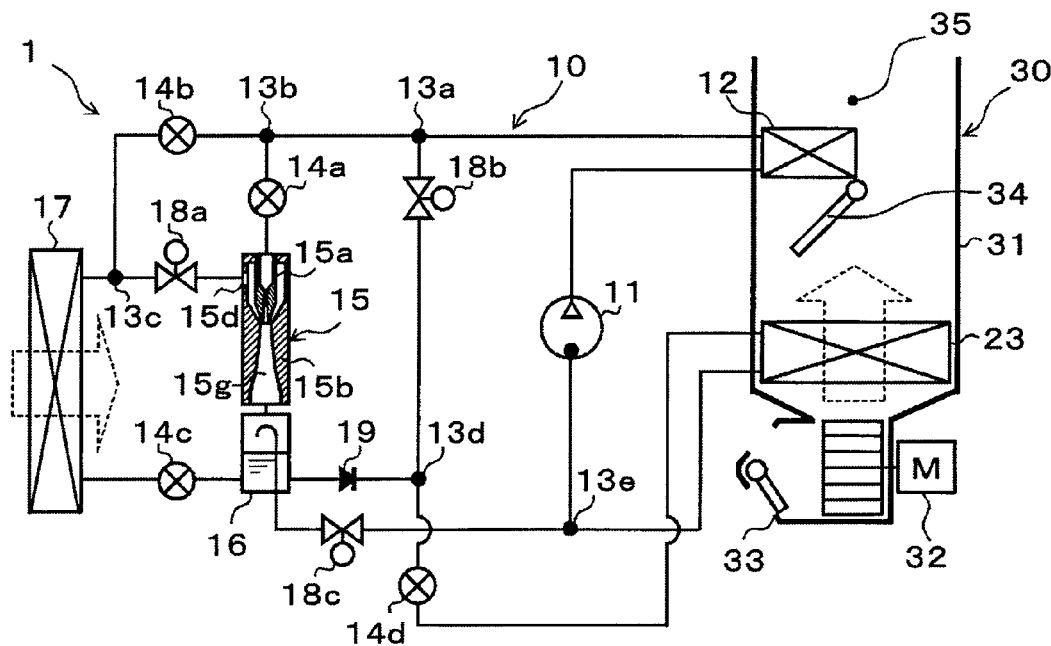
FIG. 12 is an entire configuration diagram of a refrigeration cycle apparatus according to a second embodiment.

As shown in the entire configuration diagram of FIG. 12, in a second embodiment, the cooling side ejector 20, the cooling side gas-liquid separator 21, and the fixed throttle 22 of the refrigeration cycle apparatus 10 are removed from the structure of the first embodiment, while the outlet side of the fourth flow rate adjustment valve 14d is connected to the refrigerant inlet side of the interior evaporator 23, and the refrigerant outlet side of the interior evaporator 23 is connected to the fifth three-way joint 13e by way of example.

That is, in the refrigeration cycle apparatus 10, the fourth flow rate adjustment valve 14d configures the cooling side decompressor. The structures of other components of the refrigeration cycle apparatus 10 except for the above points are the same as those of the first embodiment. Referring to FIG. 12, the same or equivalent parts as those described in the first embodiment are designated by the same reference numerals. The same goes for the following figures.

Next, the operation of the refrigeration cycle apparatus in the second embodiment will be described below. In the second embodiment, like the first embodiment, switching is performed among the respective operation modes.

(a) Air Cooling Mode

In the air cooling mode, the air conditioning controller completely closes the first flow rate adjustment valve 14a, fully opens the second flow rate adjustment valve 14b, fully opens the third flow rate adjustment valve 14c, and puts the fourth flow rate adjustment valve 14d into a throttled state, while closing the first opening/closing valve 18a, closing the second opening/closing valve 18b, and closing the third opening/closing valve 18c.

Thus, in the air cooling mode, the normal refrigeration cycle is configured such that the refrigerant circulates through the compressor 11, the interior condenser 12, (the second flow rate adjustment valve 14b), the exterior heat exchanger 17, (the third flow rate adjustment valve 14c), the accumulator 16, (the check valve 19), the fourth flow rate adjustment valve 14d, the interior evaporator 23, and the compressor 11 in this order.

The valve opening degree of the fourth flow rate adjustment valve 14d is determined in the air cooling mode such that the superheat degree of the refrigerant flowing out of the interior evaporator 23 is within a predetermined range. Other operations except for those described above are the same as those in the air cooling mode of the first embodiment. Thus, in the air cooling mode, the air cooled by the interior evaporator 23 is blown into the vehicle interior, thereby enabling the air cooling of the vehicle interior.

(b) Weak Dehumidification-Air Heating Mode

In the weak dehumidification-air heating mode, the air conditioning controller completely closes the first flow rate adjustment valve 14a, puts the second flow rate adjustment valve 14b into the throttled state, fully opens the third flow rate adjustment valve 14c, and puts the fourth flow rate adjustment valve 14d into the throttled state. Further, the air conditioning controller closes the first opening/closing valve 18a, closes the second opening/closing valve 18b, and closes the third opening/closing valve 18c. Thus, in the weak dehumidification-air heating mode, the normal refrigeration cycle is configured to allow the refrigerant to circulate therethrough in the same order as in the air cooling mode.

The valve opening degree of the fourth flow rate adjustment valve 14d in the weak dehumidification-air heating mode is determined in the same way as in the air cooling mode. Other operations except for those described above are the same as those in the weak dehumidification-air heating mode of the first embodiment. Thus, in the weak dehumidification-air heating mode, the air cooled by the interior evaporator 23 can be reheated in the interior condenser 12 and blown into the vehicle interior to achieve the dehumidification-air heating of the vehicle interior.

(c) Dehumidification-Air Heating Mode

In the dehumidification-air heating mode, the air conditioning controller puts the first flow rate adjustment valve 14a into the throttled state, completely closes the second flow rate adjustment valve 14b, puts the third flow rate adjustment valve 14c into the throttled state, and puts the fourth flow rate adjustment valve 14d into the throttled state. Further, the air conditioning controller opens the first opening/closing valve 18a, opens the second opening/closing valve 18b, and opens the third opening/closing valve 18c.

Thus, in the dehumidification-air heating mode, the ejector refrigeration cycle is configured such that the refrigerant circulates through the compressor 11, the interior condenser 12, the first flow rate adjustment valve 14a, the heating side ejector 15, the accumulator 16, (the third opening/closing valve 18c), and the compressor 11 in this order, while the refrigerant circulates through the accumulator 16, the third flow rate adjustment valve 14c, the exterior heat exchanger 17, (the first opening/closing valve 18a), and the heating side refrigerant suction port 15d of the heating side ejector 15 in this order.

Simultaneously, the normal refrigeration cycle is configured such that the refrigerant circulates through the compressor 11, the interior condenser 12, (the second opening/closing valve 18b), the fourth flow rate adjustment valve 14d, the interior evaporator 23, and the compressor 11 in this order.

The valve opening degree of the fourth flow rate adjustment valve 14d in the dehumidification-air heating mode is determined in the same way as in the air cooling mode. Other operations except for those described above are the same as those in the dehumidification-air heating mode of the first embodiment. Thus, in the dehumidification-air heating mode, the air cooled by the interior evaporator 23 can be reheated in the interior condenser 12 and blown into the vehicle interior to achieve the dehumidification-air heating of the vehicle interior.

(d) Air Heating Mode

In the air heating mode, the air conditioning controller puts the first flow rate adjustment valve 14a into the throttled state, completely closes the second flow rate adjustment valve 14b, puts the third flow rate adjustment valve 14c into the throttled state, and completely closes the fourth flow rate adjustment valve 14d. Further, the air conditioning controller opens the first opening/closing valve 18a, closes the second opening/closing valve 18b, and opens the third opening/closing valve 18c. Thus, in the air heating mode, the same ejector refrigeration cycle as that of the first embodiment is configured, so that the air heating of the vehicle interior can be performed in the same way as the first embodiment.

As mentioned above, the vehicle air conditioner 1 can achieve the appropriate air conditioning of the vehicle interior in the same way as the first embodiment. Further, the refrigeration cycle apparatus 10 cannot obtain the effect of improving the COP by the pressurizing effect of the ejector in the air cooling mode as well as the weak dehumidification-air heating mode, but can obtain the same effects as those in the first embodiment, while simplifying the structure of the cooling-side decompressor.

(Third Embodiment)

Figure 13:
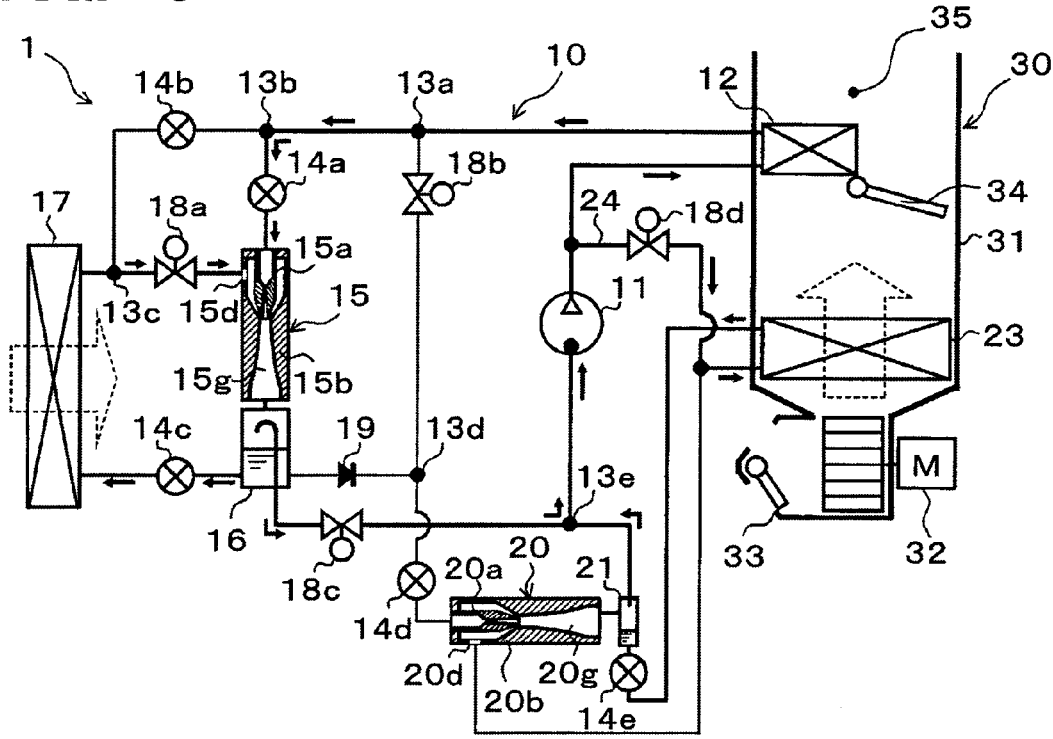
FIG. 13 is an entire configuration diagram of a refrigeration cycle apparatus according to a third embodiment.

In a third embodiment, as shown in the entire configuration diagram of FIG. 13, an auxiliary heating bypass passage 24 that guides the refrigerant discharged from the compressor 11 to the refrigerant inlet side of the interior evaporator 23, and a fourth opening/closing valve 18d for opening/closing the auxiliary heating bypass passage 24 are added to the refrigeration cycle apparatus 10 of the first embodiment. Further, instead of the fixed throttle 22, a fifth flow rate adjustment valve 14e is used.

The refrigeration cycle apparatus 10 of the third embodiment allows the fourth opening/closing valve 18d to open the auxiliary heating bypass passage 24, thereby performing switching to a refrigerant circuit in a strong air heating mode of performing air heating of the vehicle interior by heating air with a higher heating capacity than that in the air heating mode, in addition to other refrigerant circuits in the respective operation modes described in the first embodiment. Thus, the fourth opening/closing valve 18d constitutes the refrigerant circuit switch together with the first opening/closing valve 18a and the like.

FIG. 13 shows the flow of the refrigerant in the strong air heating mode by solid arrows. The fourth opening/closing valve 18d has the substantially same basic structure as that of each of the first to third opening/closing valves 18a to 17c. The fifth flow rate adjustment valve 14e has the substantially same basic structure as that of each of the third and fourth flow rate adjustment valves 14c and 14d. The structures of other components of the refrigeration cycle apparatus 10 except for the above points are the same as those of the first embodiment.

Next, the operation of the refrigeration cycle apparatus in the third embodiment will be described below. In the third embodiment, switching is performed to the respective operation modes in the same way as the first embodiment. Further, when a strong air heating switch provided on the operation panel is turned on (ON) with operation conditions for the air heating mode satisfied, switching is performed to the strong air heating mode.

In the air cooling mode, the weak dehumidification-air heating mode, the dehumidification-air heating mode, and the air heating mode, the air conditioning controller closes the fourth opening/closing valve 18d, while setting the valve opening degree of the fifth flow rate adjustment valve 14e to a predetermined valve opening degree that can exhibit the substantially same decompression effect as that of the fixed throttle 22 of the first embodiment. The operations of various other devices to be controlled are the same as those in the first embodiment.

Thus, in the air cooling mode, the weak dehumidification-air heating mode, the dehumidification-air heating mode, and the air heating mode, the completely same cycle as that in the first embodiment is configured to operate in the same way as in the third embodiment. As a result, the same effects as those of the first embodiment can be obtained.

In the strong air heating mode, the air conditioning controller fully opens or puts the first flow rate adjustment valve 14a into the throttled state, completely closes the second flow rate adjustment valve 14b, puts the third flow rate adjustment valve 14c into the throttled state, completely closes the fourth flow rate adjustment valve 14d, and fully opens the fifth flow rate adjustment valve 14e. Further, the air conditioning controller opens the first opening/closing valve 18a, closes the second opening/closing valve 18b, opens the third opening/closing valve 18c, and opens the fourth opening/closing valve 18d.

Thus, in the strong air heating mode, the ejector refrigeration cycle is configured as indicated by solid arrows in FIG. 13. Specifically, the refrigerant circulates through the compressor 11, the interior condenser 12, the first flow rate adjustment valve 14a, the heating side ejector 15, the accumulator 16, (the third opening/closing valve 18c), and the compressor 11 in this order, while the refrigerant circulates through the accumulator 16, the third flow rate adjustment valve 14c, the exterior heat exchanger 17, (the first opening/closing valve 18a), and the heating side refrigerant suction port 15d of the heating side ejector 15 in this order. Simultaneously, a hot gas cycle is configured such that the refrigerant circulates through the compressor 11, the interior evaporator 23, (the fifth flow rate adjustment valve 14e), the cooling side gas-liquid separator 21, and the compressor 11 in this order.

Figure 14:
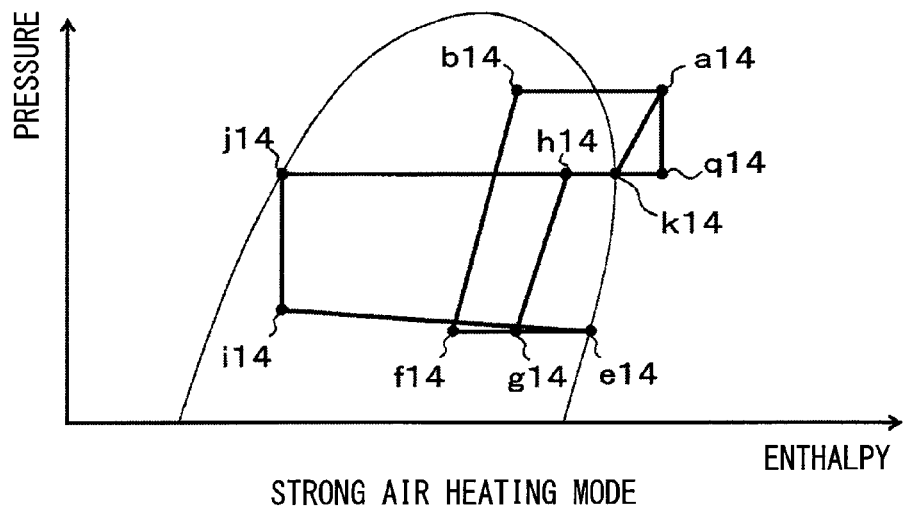
FIG. 14 is a Mollier chart showing the state of refrigerant in a strong air heating mode of the refrigeration cycle apparatus in the third embodiment.

Thus, the refrigeration cycle apparatus 10 in the strong air heating mode changes the state of the refrigerant as illustrated in a Mollier chart of FIG. 14. That is, the refrigerant flowing from the compressor 11 into the interior condenser 12 exchanges heat with the air at the interior condenser 12 to dissipate the heat therefrom (as indicated from a point a14 to a point b14 in FIG. 14), like the air heating mode of the first embodiment. In this way, the air is heated. The action of the refrigerant flowing out of the interior condenser 12 in the following steps is changed in the same manner as that in the air heating mode of the first embodiment.

On the other hand, the refrigerant flowing from the compressor 11 into the side of the auxiliary heating bypass passage 24 exchanges heat with air before the air passes through the interior condenser 12 to dissipate the heat therefrom at the interior evaporator 23 (as indicated from a point q14 to a point k14 in FIG. 14). As a result, since the air is heated before passing through the interior condenser 12, the temperature of the air flowing into the interior condenser 12 in the strong air heating mode is higher than that of air flowing into the interior condenser 12 in the air heating mode.

Thus, in the strong air heating mode, the refrigerant condensation temperature (refrigerant condensation pressure) in the interior condenser 12 can be increased without increasing the number of revolutions of the compressor 11 (refrigerant discharge capacity) as compared to in the air heating mode. As a result, in the strong air heating mode, the air is heated with a higher heating capacity than that in the air heating mode, thereby enabling air heating of the vehicle interior.

As described above, the vehicle air conditioner 1 can perform an operation in the strong air heating mode, in addition to the operation modes described in the first embodiment, thereby further achieving the appropriate air conditioning of the vehicle interior.

Note that as shown in the Mollier chart of FIG. 14, the strong air heating mode is desirably performed at the same time as the high heating-capacity operation in the air heating mode described in the first embodiment. The reason for this is that in the high heating-capacity operation, the pressure of the refrigerant drawn into the compressor 11 is increased as compared to the normal operation, which increases the temperature of the refrigerant discharged from the compressor 11 (or the temperature of the refrigerant dissipating heat at the interior evaporator 23), thereby more effectively heating the air with high heating capacity.

In the strong air heating mode, the high-temperature and high-pressure refrigerant discharged from the compressor 11 flows into the interior evaporator 23. When the strong air heating mode is performed with moisture attached to the interior evaporator 23, the moisture attached to the interior evaporator 23 might evaporate to increase the humidity of the air. Such an increase in humidity of the air causes fogging of a windshield of the vehicle.

Even when implementation conditions for the strong air heating mode are satisfied, for example, control is desirably performed to stop the implementation of the strong air heating mode, or to prohibit the operation of the blower 32, for example, until the saturated pressure of the refrigerant in the accumulator 16 is 0° C. or more.

(Fourth Embodiment)

Figure 15:
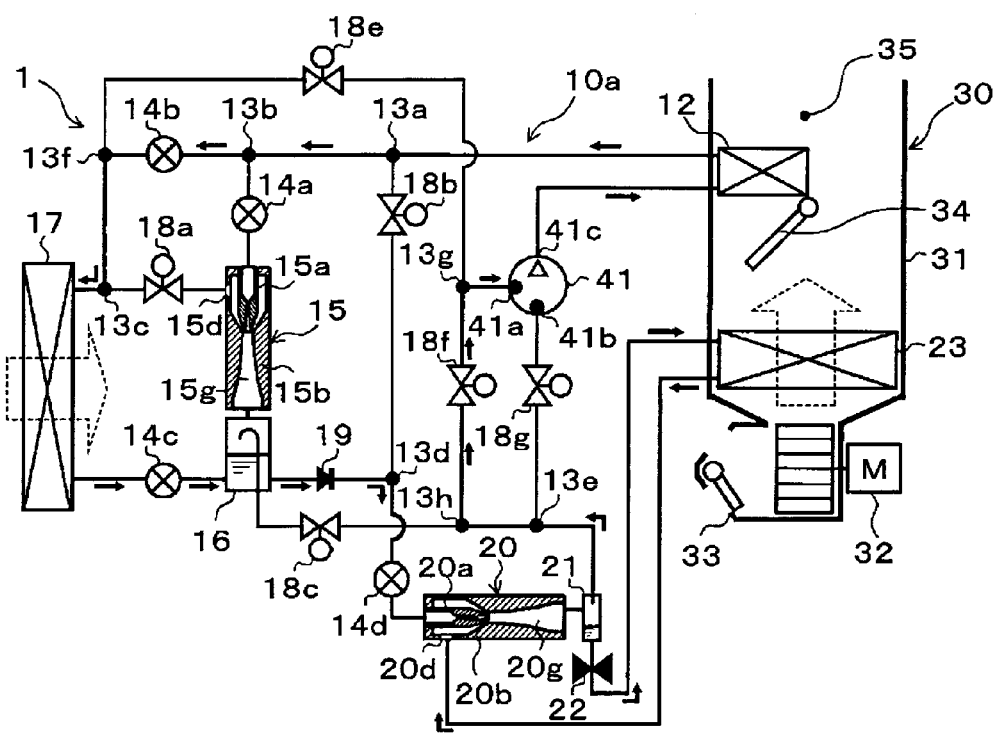
FIG. 15 is an entire configuration diagram showing a refrigerant circuit in an air cooling mode and a weak dehumidification-air heating mode of a refrigeration cycle apparatus according to a fourth embodiment.
Figure 16:
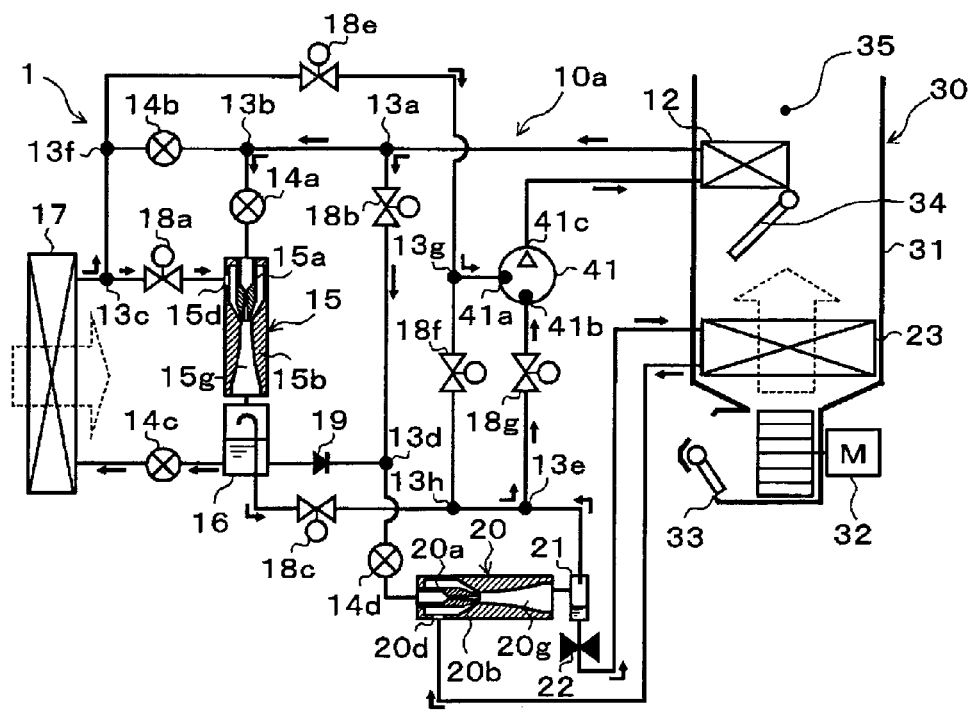
FIG. 16 is an entire configuration diagram showing a refrigerant circuit in a dehumidification-air heating mode of the refrigeration cycle apparatus in the fourth embodiment.
Figure 17:
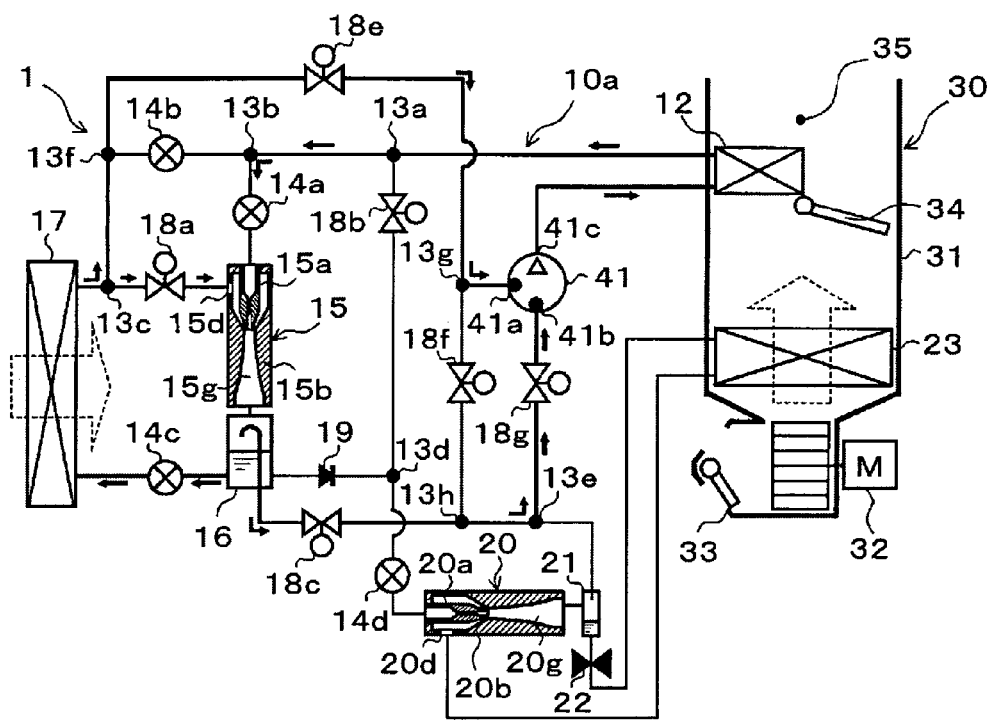
FIG. 17 is an entire configuration diagram showing a refrigerant circuit in an air heating mode of the refrigeration cycle apparatus in the fourth embodiment.

A fourth embodiment employs a two-stage pressurizing compressor 41 to constitute the refrigeration cycle apparatus 10a by way of example. The refrigeration cycle apparatus 10a is configured to be capable of switch among a refrigerant circuit in the air cooling mode and the weak dehumidification-air heating mode (see FIG. 15), a refrigerant circuit in the dehumidification-air heating mode (see FIG. 16), and a refrigerant circuit in the air heating mode (see FIG. 17). FIGS. 15 to 17 show the flows of the refrigerant in the respective operation modes by solid arrows.

More specifically, the compressor 41 is configured as the two-stage pressurizing electric compressor that accommodates in a housing forming an outer envelope, two compression mechanisms including a low-stage side compression mechanism and a high-stage side compression mechanism, each being formed of a fixed displacement compression mechanism, and an electric motor rotatably driving both the compression mechanisms.

The housing of the compressor 41 is provided with a suction port 41a, an intermediate pressure port 41b, and a discharge port 41c. The suction port 41a draws a low-pressure refrigerant from the outside of the housing into the low-stage side compression mechanism. The intermediate pressure port 41b allows the intermediate-pressure refrigerant within the cycle to flow into the housing, and to be merged with refrigerant being compressed from a low pressure to a high pressure. The discharge port 41c discharges the high-pressure refrigerant discharged from the high-stage side compression mechanism toward the outside of the housing.

Although the fourth embodiment employs the compressor 41 accommodating the two compression mechanisms in one housing, the form of the compressor is not limited thereto. That is, as long as the intermediate-pressure refrigerant can flow from the intermediate pressure port 41b to be merged with the refrigerant being compressed from the low pressure to the high pressure, the compressor may be an electric compressor that accommodates within a housing, one fixed capacity compression mechanism, and an electric motor for rotatably driving the compression mechanism.

Alternatively, the two compressors may be connected in series. A suction port of a low-stage side compressor placed on a low-stage side may be defined as the suction port 41a. A discharge port of a high-stage side compressor placed on a high-stage side may be defined as the discharge port 41c. An intermediate pressure port 41b may be provided in a connection portion for connecting a discharge port of the low-stage side compressor with a suction port of the high-stage side compressor. In this case, both the low-stage side compressor and the high-stage side compressor constitute one two-stage pressurizing compressor 41.

In the refrigeration cycle apparatus 10a, a sixth three-way joint 13f is connected to a refrigerant passage for connection between the second flow rate adjustment valve 14b and the third three-way joint 13c. The sixth three-way joint 13f is connected to the eighth three-way joint 13h via a fifth opening/closing valve 18e, the seventh three-way joint 13g, and the sixth opening/closing valve 18f. The eighth three-way joint 13h is disposed in a refrigerant passage leading from the third opening/closing valve 18c to the fifth three-way joint 13e.

The seventh three-way joint 13g is connected to a suction port 41a of the compressor 41. The fifth three-way joint 13e is connected to the intermediate pressure port 41b of the compressor 41 via a seventh opening/closing valve 18g. The fifth to seventh opening/closing valves 18e to 18g have the same basic structures as those of the first to third opening/closing valves 18a to 18c. The structures of other components of the refrigeration cycle apparatus 10a except for the above points are the same as those of the refrigeration cycle apparatus 10a in the first embodiment.

Next, the operation of the refrigeration cycle apparatus in the fourth embodiment will be described below. In the fourth embodiment, like the first embodiment, switching is performed among the respective operation modes.

(a) Air Cooling Mode

In the air cooling mode, the air conditioning controller completely closes the first flow rate adjustment valve 14a, fully opens the second flow rate adjustment valve 14b, fully opens the third flow rate adjustment valve 14c, and fully opens the fourth flow rate adjustment valve 14d. Further, the air conditioning controller closes the first opening/closing valve 18a, closes the second opening/closing valve 18b, closes the third opening/closing valve 18c, closes the fifth opening/closing valve 18e, opens the sixth opening/closing valve 18f, and closes the seventh opening/closing valve 18g.

Thus, in the air cooling mode, the ejector refrigeration cycle is configured to allow the refrigerant to circulate therethrough as indicated by solid arrows in FIG. 15. At this time, since the seventh opening/closing valve 18g is closed, the compressor 41 functions in the same manner as the normal single-stage compression type compressor without allowing the refrigerant to flow into the inside of the compressor 41 from the intermediate pressure port 41*b* of the compressor 41. That is, in the air cooling mode, the same refrigerant circuit as that in the air cooling mode of the first embodiment is configured. The operations of various other devices to be controlled are the same as those in the air cooling mode of the first embodiment.

Thus, in the air cooling mode, the air cooled by the interior evaporator 23 is blown into the vehicle interior, thereby enabling the air cooling of the vehicle interior, in the same manner as in the air cooling mode of the first embodiment.

(b) Weak Dehumidification-Air Heating Mode

In the weak dehumidification-air heating mode, the air conditioning controller completely closes the first flow rate adjustment valve 14*a*, puts the second flow rate adjustment valve 14*b* into the throttled state, fully opens the third flow rate adjustment valve 14*c*, and fully opens the fourth flow rate adjustment valve 14*d*. Further, the air conditioning controller closes the first opening/closing valve 18*a*, closes the second opening/closing valve 18*b*, closes the third opening/closing valve 18*c*, closes the fifth opening/closing valve 18*e*, opens the sixth opening/closing valve 18*f*, and closes the seventh opening/closing valve 18*g*.

Thus, in the weak dehumidification-air heating mode, the ejector refrigeration cycle is configured to allow the refrigerant to circulate therethrough as indicated by the solid arrows of FIG. 15, and to cause the compressor 41 to act in the same manner as the normal single-stage compression type compressor. That is, in the weak dehumidification-air heating mode, the same refrigerant circuit as that in the weak dehumidification-air heating mode of the first embodiment is configured. The operations of various other devices to be controlled are the same as those in the weak dehumidification-air heating mode of the first embodiment.

Thus, in the weak dehumidification-air heating mode, like the weak dehumidification-air heating mode of the first embodiment, the air cooled and dehumidified by the interior evaporator 23 can be reheated by the interior condenser 12 and blown into the vehicle interior to thereby perform the dehumidification and air-heating of the vehicle interior.

(c) Dehumidification-Air Heating Mode

In the dehumidification-air heating mode, the air conditioning controller puts the first flow rate adjustment valve 14*a* into the throttled state, completely closes the second flow rate adjustment valve 14*b*, puts the third flow rate adjustment valve 14*c* into the throttled state, and fully opens the fourth flow rate adjustment valve 14*d*. Further, the air conditioning controller opens the first opening/closing valve 18*a*, opens the second opening/closing valve 18*b*, opens the third opening/closing valve 18*c*, opens the fifth opening/closing valve 18*e*, closes the sixth opening/closing valve 18*f*, and opens the seventh opening/closing valve 18*g*.

Thus, in the dehumidification-air heating mode, the two-stage pressurizing type ejector refrigeration cycle is configured as indicated by solid arrows of FIG. 16 in the following way. Specifically, the refrigerant circulates through a discharge port 41*c* of the compressor 41, the interior condenser 12, the first flow rate adjustment valve 14*a*, the heating side ejector 15, the accumulator 16, (the third opening/closing valve 18*c*, and the seventh opening/closing valve 18*g*), and the intermediate pressure port 41*b* of the compressor 41 in this order. Further, the refrigerant circulates through the accumulator 16, the third flow rate adjustment valve 14*c*, the exterior heat exchanger 17 (the first opening/closing valve 18*a*), and the heating side refrigerant suction port 15*d* of the heating side ejector 15 in this order. Moreover, the refrigerant circulates through the accumulator 16, the third flow rate adjustment valve 14*c*, the exterior heat exchanger 17, (the fifth opening/closing valve 18*e*), and the suction port 41*a* of the compressor 41 in this order.

Simultaneously, the ejector refrigeration cycle is configured as follows. The refrigerant circulates through the discharge port 41*c* of the compressor 41, the interior condenser 12, (the second opening/closing valve 18*b*, the fourth flow rate adjustment valve 14*d*), the cooling side ejector 20, the cooling side gas-liquid separator 21, and the intermediate pressure port 41*b* of the compressor 41 in this order. Additionally, the refrigerant circulates through the cooling side gas-liquid separator 21, the fixed throttle 22, the interior evaporator 23, and the cooling side refrigerant suction port 20*d* of the cooling side ejector 20 in this order. The operations of various other devices to be controlled are the same as those in the dehumidification-air heating mode of the first embodiment.

Figure 18:
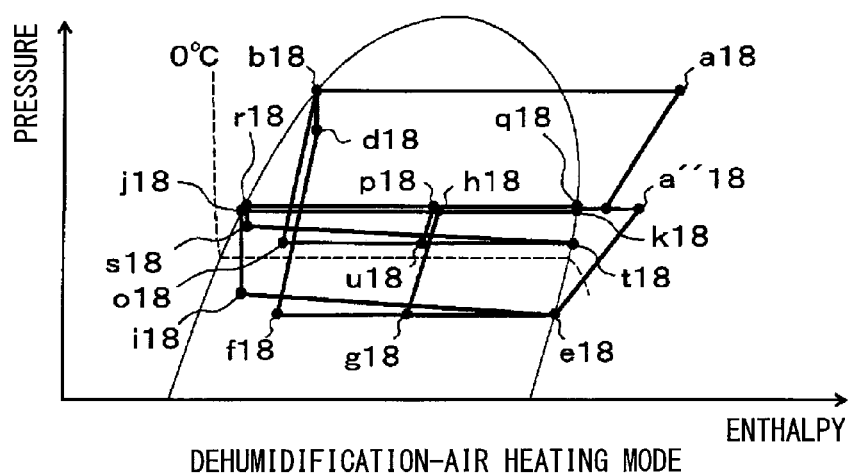
FIG. 18 is a Mollier chart showing the state of refrigerant in the dehumidification-air heating mode of the refrigeration cycle apparatus in the fourth embodiment.

That is, as shown in the Mollier chart of FIG. 18, the refrigeration cycle apparatus 10*a* in the dehumidification-air heating mode constitutes the refrigerant circuit in which the state of refrigerant changes substantially in the same manner as that in the dehumidification-air heating mode of the first embodiment. In other words, the refrigerant circuit is configured such that the heat absorbed in the refrigerant at both the exterior heat exchanger 17 and the interior evaporator 23 is dissipated into the air by the interior condenser 12.

Thus, in the dehumidification-air heating mode, like the dehumidification-air heating mode of the first embodiment, the air cooled and dehumidified by the interior evaporator 23 can be reheated by the interior condenser 12 and blown into the vehicle interior to thereby perform the dehumidification-air heating of the vehicle interior.

Further, in the refrigerant circuit in the dehumidification-air heating mode, a part of the refrigerant flowing out of the exterior heat exchanger 17 (at a point e18 of FIG. 18) is drawn from the suction port 41*a* of the compressor 41 to be pressurized up to the intermediate-pressure refrigerant (as indicated from the point e18 to a point a"18 in FIG. 18). Thus, the pressurized amount of the refrigerant can be increased in the heating side diffuser 15*g* of the heating side ejector 15.

Figure 19:
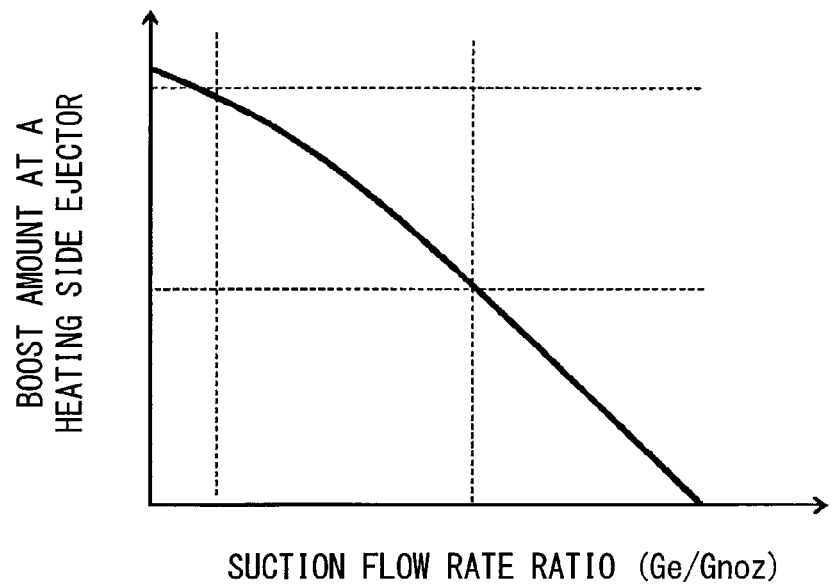
FIG. 19 is a graph showing a change in amount of pressurized (boost) by the ejector with respect to a change in a suction flow rate ratio.

In the general ejector, as shown in FIG. 19, suppose a suction flow rate ratio (Ge/Gnoz) of a refrigerant flow rate Ge (flow rate of the drawn flow) of the refrigerant drawn from the refrigerant suction port to a refrigerant flow rate Gnoz (flow rate of a driven flow) of the refrigerant flowing into the nozzle portion. As the suction flow rate ratio is decreased, the ratio of conversion into the pressure energy of the recovered energy becomes larger. Thus, the pressurized amount in the diffuser can increase with decreasing the suction flow rate ratio (Ge/Gonoz).

In the fourth embodiment, the refrigerant flowing out of the exterior heat exchanger 17, that is, a part of the refrigerant drawn from the heating side refrigerant suction port 15*d* of the heating side ejector 15 is drawn from the suction port 41*a* of the compressor 41. In this way, the refrigerant flow rate Ge of the refrigerant drawn from the heating side refrigerant suction port 15*d* is reduced to thereby increase the pressurized amount in the heating side diffuser 15*g*.

In the refrigerant circuit in the dehumidification-air heating mode, the gas-phase refrigerant flowing from the cooling side gas-liquid separator 21 (at a point q18 in FIG. 18) and the gas-phase refrigerant flowing from the accumulator 16 (at a point k18 in FIG. 18) flow into the intermediate pressure port 41*b* of the compressor 41 to be merged with the intermediate-pressure refrigerant pressurized by the low-stage side compression mechanism (as indicated from the points q18 and k18 to a point a'18, and from a point a"18 to the point a'18 in FIG. 18). Then, the merged refrigerant is pressurized up to a high-pressure refrigerant by the high-stage side compression mechanism (as indicated from the point a'18 to a point a18 in FIG. 18).

That is, the refrigerant circuit of the dehumidification-air heating mode boosts or raises the pressure of the refrigerant in multiple stages, and merges the intermediate-pressure gas-phase refrigerant of the cycle with the refrigerant discharged from the low-stage side compression mechanism to be drawn into the high-stage side compression mechanism, which is the so-called gas injection cycle (economizer refrigeration cycle).

(d) Air Heating Mode

In the air heating mode, the air conditioning controller puts the first flow rate adjustment valve 14a into the throttled state, completely closes the second flow rate adjustment valve 14b, puts the third flow rate adjustment valve 14c into the throttled state, and completely closes the fourth flow rate adjustment valve 14d. Further, the air conditioning controller opens the first opening/closing valve 18a, closes the second opening/closing valve 18b, opens the third opening/closing valve 18c, opens the fifth opening/closing valve 18e, closes the sixth opening/closing valve 18f, and opens the seventh opening/closing valve 18g.

Thus, in the air heating mode, the two-stage pressurizing type ejector refrigeration cycle is configured as indicated by solid arrows of FIG. 17 in the following way. Specifically, the refrigerant circulates through the discharge port 41c of the compressor 41, the interior condenser 12, the first flow rate adjustment valve 14a, the heating side ejector 15, the accumulator 16, (the third opening/closing valve 18c, and the seventh opening/closing valve 18g), and the intermediate pressure port 41b of the compressor 41 in this order. Further, the refrigerant circulates through the accumulator 16, the third flow rate adjustment valve 14c, the exterior heat exchanger 17, (the first opening/closing valve 18a), and the heating side refrigerant suction port 15d of the heating side ejector 15 in this order. Moreover, the refrigerant circulates through the accumulator 16, the third flow rate adjustment valve 14c, the exterior heat exchanger 17, (the fifth opening/closing valve 18e), and the suction port 41a of the compressor 41 in this order. The operations of various other devices to be controlled are the same as those in the air heating mode of the first embodiment.

Figure 20:
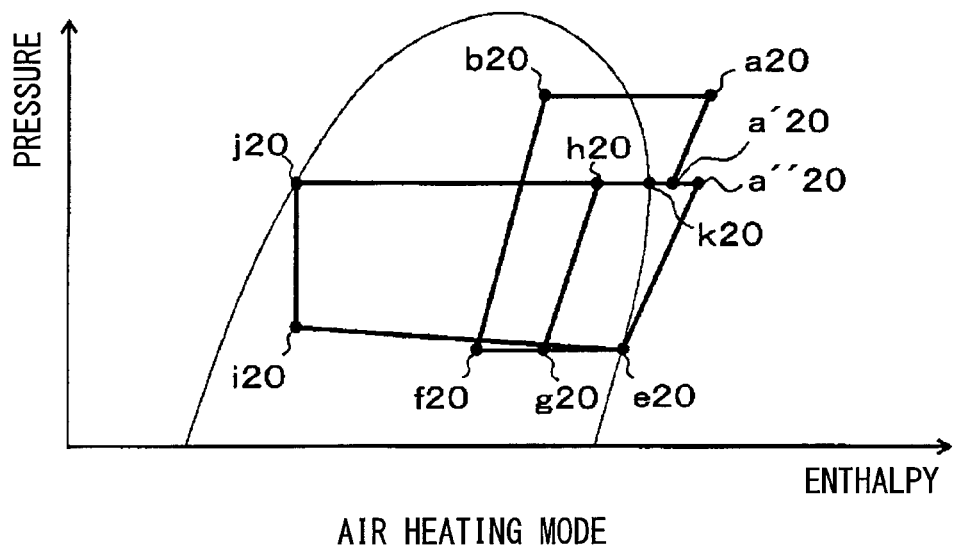
FIG. 20 is a Mollier chart showing the state of refrigerant in the air heating mode of the refrigeration cycle apparatus in the fourth embodiment.

That is, as shown in the Mollier chart of FIG. 20, the refrigeration cycle apparatus 10a in the air heating mode constitutes the refrigerant circuit in which the state of refrigerant changes in the substantially same manner as that in the air heating mode of the first embodiment. In other words, the refrigerant circuit can be configured such that the heat absorbed in the refrigerant at the exterior heat exchanger 17 is dissipated into the air by the interior condenser 12. FIG. 20 shows the change in state of the refrigerant during the high heating-capacity operation described in the first embodiment.

Therefore, in the air heating mode of the fourth embodiment, like the air heating mode of the first embodiment, the air heated by the interior condenser 12 is blown into the vehicle interior, thereby enabling the air heating of the vehicle interior.

In the refrigerant circuit in the air heating mode, a part of the refrigerant flowing out of the exterior heat exchanger 17 (at a point e20 of FIG. 20) is drawn from the suction port 41a of the compressor 41 to be pressurized up to the intermediate-pressure refrigerant (as indicated from the point e20 to a point a"20 in FIG. 20). Thus, like the dehumidification-air heating operation mode, the pressurized amount of the refrigerant can be increased in the heating side diffuser 15g of the heating side ejector 15.

In the refrigerant circuit in the air heating mode, the gas-phase refrigerant flowing from the accumulator 16 (at a point k20 in FIG. 20) flows into the intermediate pressure port 41b of the compressor 41 to be merged with the intermediate-pressure refrigerant pressurized by the low-stage side compression mechanism (as indicated from the point k20 to a point a'20, and from a point a"20 to the point a'20 in FIG. 20). Then, the merged refrigerant is compressed to a high-pressure refrigerant by the high-stage side compression mechanism (as indicated from the point a'20 to a point a20 in FIG. 20).

That is, the refrigerant circuit in the air heating mode constitutes a gas injection cycle, like the dehumidification-air heating operation mode.

As mentioned above, the vehicle air conditioner 1 of the fourth embodiment can achieve the appropriate air conditioning of the vehicle interior in the same way as in the first embodiment. The refrigeration cycle apparatus 10a can obtain the excellent effects described in the paragraphs (A) to (C) of the first embodiment. Further, the COP of the refrigeration cycle apparatus 10a can be improved in any operation mode by the pressurizing effect of the heating side ejector 15 and the cooling side ejector 20.

In the dehumidification-air heating mode and the air heating mode, the low-pressure refrigerant is drawn into the suction port 41a of the two-stage pressurizing compressor 41, thereby drastically improving the pressurized amount by the heating side diffuser 15g of the heating side ejector 15.

Therefore, the refrigerant evaporation temperature in the exterior heat exchanger 17 can be reduced as compared to the use of a single-stage pressurizing type compressor 11 like the first embodiment, so that the amount of heat absorbed by the refrigerant from the outside air at the exterior heat exchanger 17 can be increased in the dehumidification-air heating mode and the air heating mode.

Further, a part (gas-phase refrigerant) of the refrigerant flowing out of the exterior heat exchanger 17 is drawn into the suction port 41a of the compressor 41, which can also increase the flow rate of the liquid-phase refrigerant that can be supplied from the accumulator 16 to the exterior heat exchanger 17 via the third flow rate adjustment valve 14c. As a result, the amount of heat dissipation from the refrigerant at the interior condenser 12 can be increased to improve the heating capacity of the air.

In addition, the pressure of the intermediate-pressure refrigerant flowing from the heating side diffuser 15g of the heating side ejector 15 into the intermediate pressure port 41b of the compressor 41 can be increased to thereby increase the density of the intermediate-pressure refrigerant entering the intermediate pressure port 41b. As a result, the flow rate Or of the refrigerant flowing into the interior condenser 12 can be increased to improve the heating capacity.

The gas injection cycle is configured in the dehumidification-air heating mode and the air heating mode, thereby enabling the improvement of the mechanical efficiency (compression efficiency) of the compressor 41, and further improvement of the COP.

(Fifth Embodiment)

Figure 21:
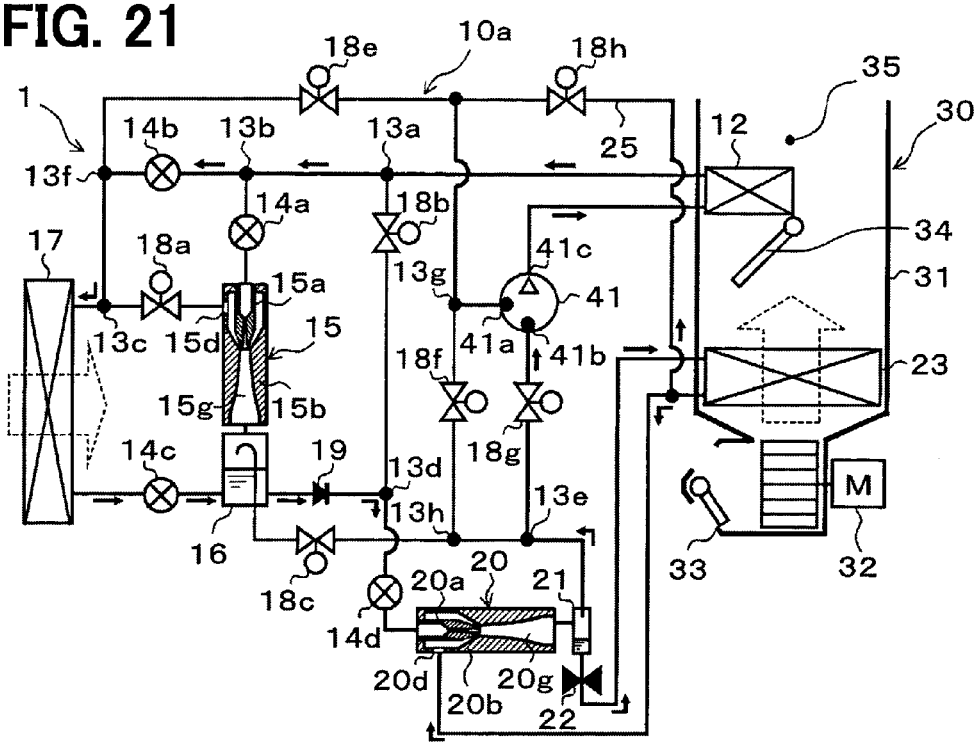
FIG. 21 is an entire configuration diagram showing a refrigerant circuit in an air cooling mode and a weak dehumidification-air heating mode of a refrigeration cycle apparatus according to a fifth embodiment.

In a fifth embodiment, as shown in the entire configuration diagram of FIG. 21, an intermediate-pressure bypass passage 25 for connection between the intermediate pressure port 41b of the compressor 41 and the refrigerant outlet side of the interior evaporator 23, as well as an eighth opening/closing valve 18h for opening and closing the intermediate-pressure bypass passage 25, by way of example, are added to the refrigeration cycle apparatus 10a of the fourth embodiment. The eighth opening/closing valve 18h has the basic same structure as that of the first opening/closing valve 18a or the like.

Next, the operation of the refrigeration cycle apparatus in the fifth embodiment will be described below. In the fifth embodiment, like the first embodiment, switching is performed among the respective operation modes.

(a) Air Cooling Mode

In the air cooling mode, the air conditioning controller completely closes the first flow rate adjustment valve 14a, fully opens the second flow rate adjustment valve 14b, fully opens the third flow rate adjustment valve 14c, and fully opens the fourth flow rate adjustment valve 14d. Further, the air conditioning controller closes the first opening/closing valve 18a, closes the second opening/closing valve 18b, closes the third opening/closing valve 18c, closes the fifth opening/closing valve 18e, closes the sixth opening/closing valve 18f, opens the seventh opening/closing valve 18g, and further opens the eighth opening/closing valve 18h.

Thus, in the air cooling mode, the two-stage pressurizing type ejector refrigeration cycle is configured in the following manner as indicated by solid arrows of FIG. 21. Specifically, the refrigerant circulates through the discharge port 41c of the compressor 41, the interior condenser 12, (the second flow rate adjustment valve 14b), the exterior heat exchanger 17, (the third flow rate adjustment valve 14c), the accumulator 16, (the check valve 19, the fourth flow rate adjustment valve 14d), the cooling side ejector 20, the cooling side gas-liquid separator 21, and the intermediate pressure port 41b of the compressor 41 in this order. Further, the refrigerant circulates through the cooling side gas-liquid separator 21, the fixed throttle 22, the interior evaporator 23, and the cooling side refrigerant suction port 20d of the cooling side ejector 20 in this order. Moreover, the refrigerant circulates through the cooling side gas-liquid separator 21, the fixed throttle 22, the interior evaporator 23, and the suction port 41a of the compressor 41 in this order. The operations of various other devices to be controlled are the same as those in the air cooling mode of the first embodiment.

Figure 22:
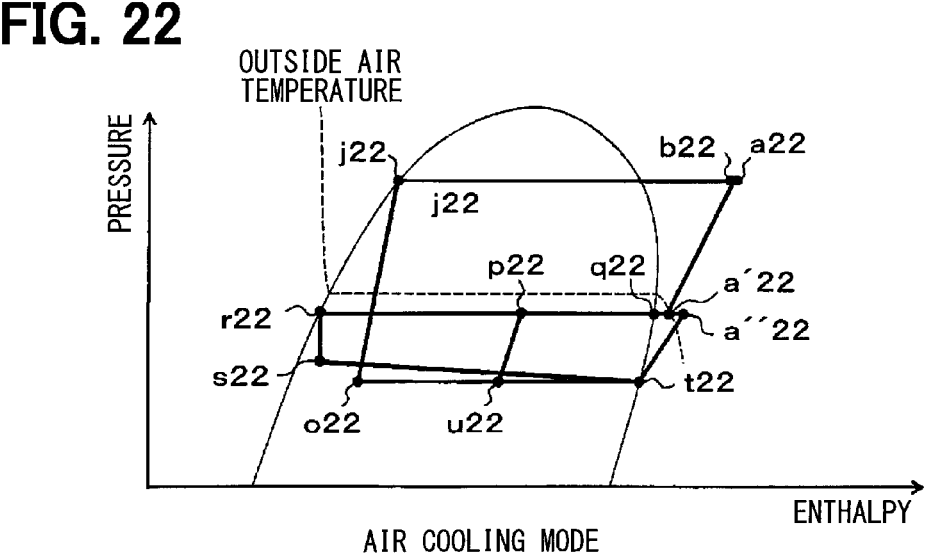
FIG. 22 is a Mollier chart showing the state of refrigerant in the air cooling mode of the refrigeration cycle apparatus in the fifth embodiment.

That is, as shown in the Mollier chart of FIG. 22, the refrigeration cycle apparatus 10a in the air cooling mode constitutes the refrigerant circuit in which the state of refrigerant changes in the substantially same manner as that in the air cooling mode of the first embodiment. In other words, the refrigerant circuit can be configured such that the heat absorbed in the refrigerant at the interior evaporator 23 is dissipated into the outside air by the exterior heat exchanger 17.

Thus, in the air cooling mode, the air cooled by the interior evaporator 23 is blown into the vehicle interior, thereby enabling the air cooling of the vehicle interior, in the same manner as in the air cooling mode of the first embodiment.

In the refrigerant circuit in the air cooling mode, a part of the refrigerant flowing out of the interior evaporator 23 (at a point t22 of FIG. 22) is drawn from the suction port 41a of the compressor 41 and pressurized up to the intermediate-pressure refrigerant (as indicated from the point t22 to a point a"22 in FIG. 20). Thus, like the dehumidification-air heating operation mode and the air heating mode in the fourth embodiment, the pressurized amount of the refrigerant can be increased in the heating side diffuser 15g of the heating side ejector 15.

In the refrigerant circuit in the air cooling mode, the gas-phase refrigerant flowing from the cooling side gas-liquid separator 21 (at a point q22 in FIG. 22) flows into the intermediate pressure port 41b of the compressor 41 to be merged with the intermediate-pressure refrigerant pressurized by the low-stage side compression mechanism (as indicated from the point q22 to a point a'22, and from a point a"22 to the point a'22 in FIG. 22). Then, the merged refrigerant is compressed to a high-pressure refrigerant by the high-stage side compression mechanism (as indicated from the point a'22 to a point a22 in FIG. 22).

That is, the refrigerant circuit in the air cooling mode constitutes a gas injection cycle, like the dehumidification-air heating operation mode and the air heating mode in the fourth embodiment.

(b) Weak Dehumidification-Air Heating Mode

In the weak dehumidification-air heating mode, the air conditioning controller completely closes the first flow rate adjustment valve 14a, puts the second flow rate adjustment valve 14b into the throttled state, fully opens the third flow rate adjustment valve 14c, and fully opens the fourth flow rate adjustment valve 14d. Further, the air conditioning controller closes the first opening/closing valve 18a, closes the second opening/closing valve 18b, closes the third opening/closing valve 18c, closes the fifth opening/closing valve 18e, closes the sixth opening/closing valve 18f, opens the seventh opening/closing valve 18g, and further opens the eighth opening/closing valve 18h.

Thus, in the weak dehumidification-air heating mode, as indicated by the solid arrows of FIG. 21, the two-stage pressurizing type ejector refrigeration cycle is configured to allow the refrigerant to circulate therethrough in the same manner as in the air cooling mode. The operations of various other devices to be controlled are the same as those in the weak dehumidification-air heating mode of the first embodiment.

Figure 23:
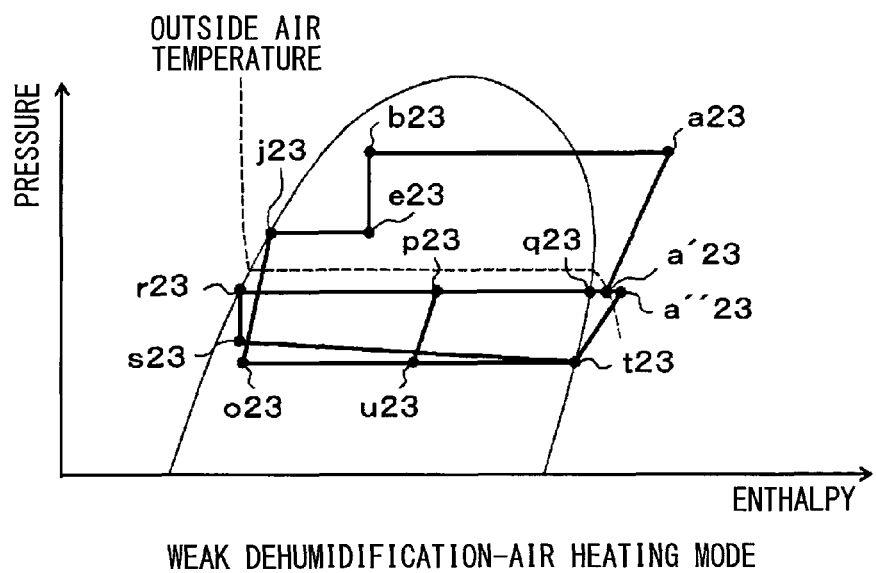
FIG. 23 is a Mollier chart showing the state of refrigerant in the weak dehumidification-air heating mode of the refrigeration cycle apparatus in the fifth embodiment.

That is, as shown in the Mollier chart of FIG. 23, the refrigeration cycle apparatus 10a in the dehumidification-air heating mode constitutes the refrigerant circuit in which the state of refrigerant changes in the substantially same manner as that in the dehumidification-air heating mode of the first embodiment. In other words, the refrigerant circuit can be configured such that the heat absorbed in the refrigerant at the interior evaporator 23 is dissipated into the outside air at the exterior heat exchanger 17, while being dissipated into air at the interior condenser 12.

Thus, in the weak dehumidification-air heating mode, like the weak dehumidification-air heating mode of the first embodiment, the air cooled and dehumidified by the interior evaporator 23 can be reheated by the interior condenser 12 and blown into the vehicle interior to thereby perform the dehumidification and air-heating of the vehicle interior.

In the refrigerant circuit in the weak dehumidification-air heating mode, a part of the refrigerant flowing out of the interior evaporator 23 (at a point t23 of FIG. 23) is drawn from the suction port 41a of the compressor 41 and pressurized up to the intermediate-pressure refrigerant (as indicated from the point t23 to a point a"23 in FIG. 23). Thus, like the air cooling mode, the pressurized amount of the refrigerant can be increased in the heating side diffuser 15g of the heating side ejector 15.

In the refrigerant circuit in the dehumidification-air heating mode, the gas-phase refrigerant flowing from the cooling side gas-liquid separator 21 (at a point q23 in FIG. 23) flows into the intermediate pressure port 41b of the compressor 41 to be merged with the intermediate-pressure refrigerant pressurized by the low-stage side compression mechanism (as indicated from the point q23 to a point a'23, and from a point a"23 to the point a'23 in FIG. 23). Then, the merged refrigerant is compressed to a high-pressure refrigerant by the high-stage side compression mechanism (as indicated from the point a'23 to a point a23 in FIG. 23).

That is, the refrigerant circuit in the weak dehumidification-air heating mode constitutes a gas injection cycle, like the air cooling mode.

(c) Dehumidification-Air Heating Mode

In the dehumidification-air heating mode, the air conditioning controller puts the first flow rate adjustment valve 14a into the throttled state, completely closes the second flow rate adjustment valve 14b, puts the third flow rate adjustment valve 14c into the throttled state, and fully opens the fourth flow rate adjustment valve 14d. Further, the air conditioning controller opens the first opening/closing valve 18a, opens the second opening/closing valve 18b, opens the third opening/closing valve 18c, opens the fifth opening/closing valve 18e, closes the sixth opening/closing valve 18f, opens the seventh opening/closing valve 18g, and closes the eighth opening/closing valve 18h.

Thus, in the dehumidification-air heating mode, the same refrigerant circuit as that in the dehumidification-air heating mode of the fourth embodiment is configured. The operations of various other devices to be controlled are the same as those in the dehumidification-air heating mode of the fourth embodiment. Thus, in the dehumidification-air heating mode, like the dehumidification-air heating mode of the fourth embodiment, the air cooled and dehumidified by the interior evaporator 23 can be reheated by the interior condenser 12 and blown into the vehicle interior to thereby perform the dehumidification-air heating of the vehicle interior.

(d) Air Heating Mode

In the air heating mode, the air conditioning controller puts the first flow rate adjustment valve 14a into the throttled state, completely closes the second flow rate adjustment valve 14b, puts the third flow rate adjustment valve 14c into the throttled state, and completely closes the fourth flow rate adjustment valve 14d. Further, the air conditioning controller opens the first opening/closing valve 18a, closes the second opening/closing valve 18b, opens the third opening/closing valve 18c, opens the fifth opening/closing valve 18e, closes the sixth opening/closing valve 18f, opens the seventh opening/closing valve 18g, and closes the eighth opening/closing valve 18h.

Thus, in the air heating mode, the completely same refrigerant circuit as that in the air heating mode of the fourth embodiment is configured. The operations of various other devices to be controlled are the same as those in the air heating mode of the fourth embodiment. Therefore, in the dehumidification-air heating mode, like the air heating mode of the fourth embodiment, the air heated by the interior condenser 12 is blown into the vehicle interior, thereby enabling the air heating of the vehicle interior.

As mentioned above, the fifth embodiment can obtain the same effects as those of the fourth embodiment. Further, the fifth embodiment can constitute the gas injection cycle in any operation mode to improve the mechanical efficiency (compression efficiency) of the compressor 41 in any operation mode, thereby improving the COP.

(Sixth Embodiment)

Figure 24:
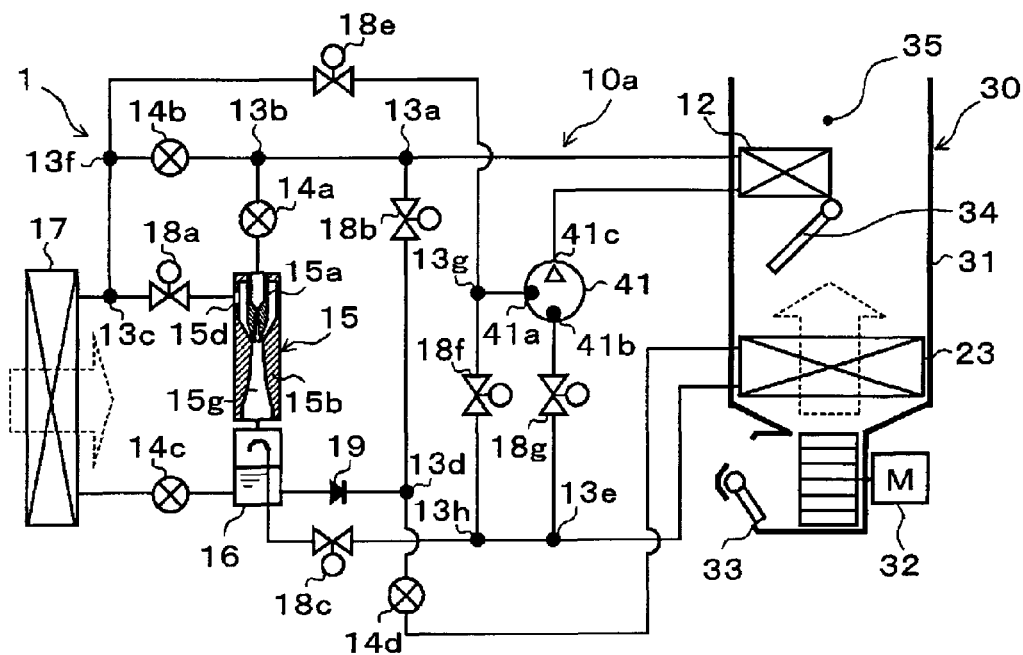
FIG. 24 is an entire configuration diagram of a refrigeration cycle apparatus according to a sixth embodiment.

In a sixth embodiment, as shown in the entire configuration diagram of FIG. 24, the cooling side ejector 20, cooling side gas-liquid separator 21, and fixed throttle 22 of the refrigeration cycle apparatus 10 are removed from the structure of the fourth embodiment. Further, the outlet side of the fourth flow rate adjustment valve 14d is connected to the refrigerant inlet side of the interior evaporator 23, and the refrigerant outlet side of the interior evaporator 23 is connected to the fifth three-way joint 13e.

That is, in the refrigeration cycle apparatus 10a, the fourth flow rate adjustment valve 14d configures the cooling side decompressor. The structures of other components of the refrigeration cycle apparatus 10a except for the above points are the same as those of the fourth embodiment. Next, the operation of the above-mentioned structure will be described. In the sixth embodiment, like the first embodiment, switching is performed among the respective operation modes.

(a) Air Cooling Mode

In the air cooling mode, the air conditioning controller completely closes the first flow rate adjustment valve 14a, fully opens the second flow rate adjustment valve 14b, fully opens the third flow rate adjustment valve 14c, and puts the fourth flow rate adjustment valve 14d into the throttled state. Further, the air conditioning controller closes the first opening/closing valve 18a, closes the second opening/closing valve 18b, closes the third opening/closing valve 18c, closes the fifth opening/closing valve 18e, opens the sixth opening/closing valve 18f, and closes the seventh opening/closing valve 18g.

Thus, in the air cooling mode, the normal refrigeration cycle is configured such that the refrigerant circulates through the discharge port 41c of the compressor 41, the interior condenser 12, (the second flow rate adjustment valve 14b), the exterior heat exchanger 17, (the third flow rate adjustment valve 14c), the accumulator 16, (the check valve 19), the fourth flow rate adjustment valve 14d, the interior evaporator 23, and the suction port of the compressor 41 in this order.

The valve opening of the fourth flow rate adjustment valve 14d is determined in the air cooling mode such that the superheat degree of the refrigerant flowing out of the interior evaporator 23 is within a predetermined range. Other operations except for those described above are the same as those in the air cooling mode of the fourth embodiment. Thus, in the air cooling mode, the air cooled by the interior evaporator 23 is blown into the vehicle interior, thereby enabling the air cooling of the vehicle interior.

(b) Weak Dehumidification-Air Heating Mode

In the weak dehumidification-air heating mode, the air conditioning controller completely closes the first flow rate adjustment valve 14a, puts the second flow rate adjustment valve 14b into the throttled state, fully opens the third flow rate adjustment valve 14c, and puts the fourth flow rate adjustment valve 14d into the throttled state. Further, the air conditioning controller closes the first opening/closing valve 18a, closes the second opening/closing valve 18b, closes the third opening/closing valve 18c, closes the fifth opening/closing valve 18e, opens the sixth opening/closing valve 18f, and closes the seventh opening/closing valve 18g. Thus, in the weak dehumidification-air heating mode, the normal refrigeration cycle is configured to allow the refrigerant to circulate therethrough in the same order as in the air cooling mode.

The valve opening degree of the fourth flow rate adjustment valve 14d in the weak dehumidification-air heating mode is determined in the same manner as in the air cooling mode. Other operations except for those described above are the same as those in the weak dehumidification-air heating mode of the fourth embodiment. Thus, also in the weak dehumidification-air heating mode, the air cooled by the interior evaporator 23 is heated again in the interior condenser 12 and blown into the vehicle interior, thereby enabling the dehumidification-air heating of the vehicle interior, like the fourth embodiment.

(c) Dehumidification-Air Heating Mode

In the dehumidification-air heating mode, the air conditioning controller puts the first flow rate adjustment valve 14a into the throttled state, completely closes the second flow rate adjustment valve 14b, puts the third flow rate adjustment valve 14c into the throttled state, and puts the fourth flow rate adjustment valve 14d into the throttled state. Further, the air conditioning controller opens the first opening/closing valve 18a, opens the second opening/closing valve 18b, opens the third opening/closing valve 18c, opens the fifth opening/closing valve 18e, closes the sixth opening/closing valve 18f, and opens the seventh opening/closing valve 18g.

Thus, in the dehumidification-air heating mode, the two-stage pressurizing type ejector refrigeration cycle is configured in the following way. Specifically, the refrigerant circulates through the discharge port 41c of the compressor 41, the interior condenser 12, the first flow rate adjustment valve 14a, the heating side ejector 15, the accumulator 16, (the third opening/closing valve 18c, and the seventh opening/closing valve 18g), and the intermediate pressure port 41b of the compressor 41 in this order. Further, the refrigerant circulates through the accumulator 16, the third flow rate adjustment valve 14c, the exterior heat exchanger 17, (the first opening/closing valve 18a), and the heating side refrigerant suction port 15d of the heating-side ejector 15 in this order. Moreover, the refrigerant circulates through the accumulator 16, the third flow rate adjustment valve 14c, the exterior heat exchanger 17, (the fifth opening/closing valve 18e), and the suction port 41a of the compressor 41 in this order.

Simultaneously, the normal refrigeration cycle is configured such that the refrigerant circulates through the discharge port 41c of the compressor 41, the interior condenser 12, (the second opening/closing valve 18b), the fourth flow rate adjustment valve 14d, and the intermediate pressure port 41b of the compressor 41 in this order.

The valve opening degree of the fourth flow rate adjustment valve 14d in the dehumidification-air heating mode is determined in the same manner as in the air cooling mode. Other operations except for those described above are the same as those in the dehumidification-air heating mode of the fourth embodiment. Thus, in the dehumidification-air heating mode, the air cooled by the interior evaporator 23 is reheated in the interior condenser 12 and blown into the vehicle interior to achieve the dehumidification-air heating of the vehicle interior.

(d) Air Heating Mode

In the air heating mode of the sixth embodiment, the air conditioning controller puts the first flow rate adjustment valve 14a into the throttled state, completely closes the second flow rate adjustment valve 14b, puts the third flow rate adjustment valve 14c into the throttled state, and completely closes the fourth flow rate adjustment valve 14d. Further, the air conditioning controller opens the first opening/closing valve 18a, closes the second opening/closing valve 18b, opens the third opening/closing valve 18c, opens the fifth opening/closing valve 18e, closes the sixth opening/closing valve 18f, and opens the seventh opening/closing valve 18g. Thus, in the air heating mode, the same two-stage pressurizing type ejector refrigeration cycle as that in the fourth embodiment is configured to enable the air heating of the vehicle interior in the same way as in the fourth embodiment.

As mentioned above, the vehicle air conditioner 1 of the sixth embodiment can achieve the appropriate air conditioning of the vehicle interior in the same way as in the first embodiment. The refrigeration cycle apparatus 10a cannot obtain the effect of improving the COP by the pressurizing effect of the ejector in the air cooling mode as well as the weak dehumidification-air heating mode, but can obtain the same effects as those in the fourth embodiment, while simplifying the structure of the cooling-side decompressor.

(Seventh Embodiment)

Figure 25:
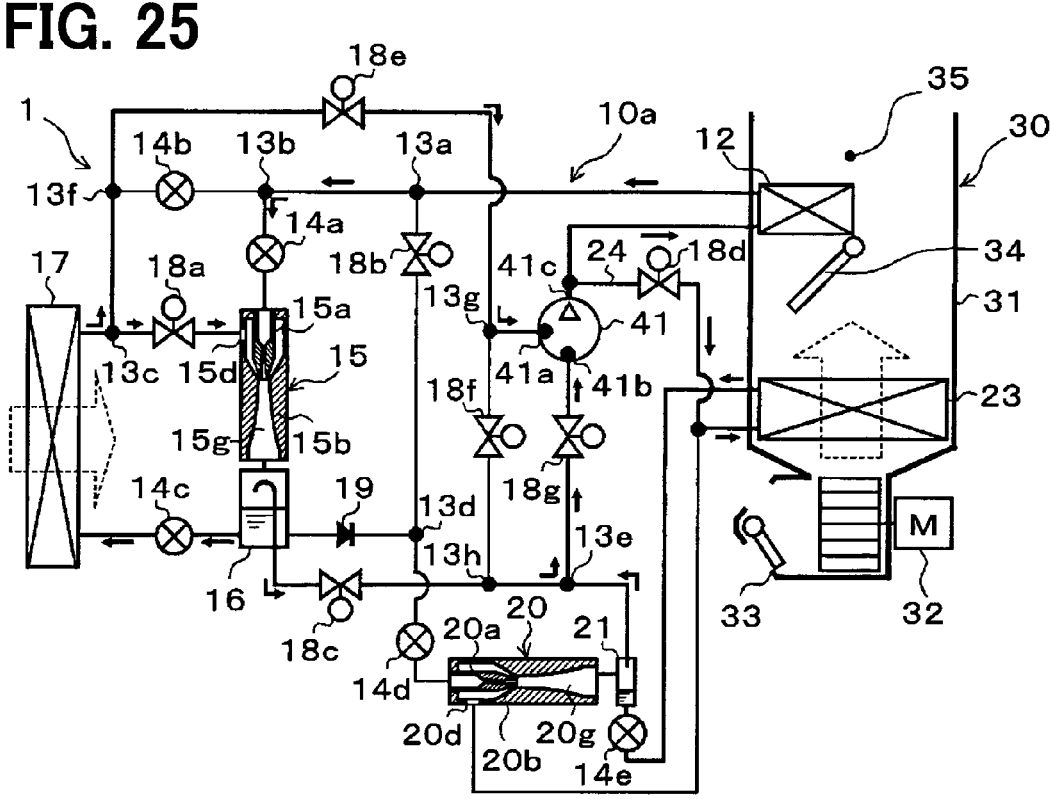
FIG. 25 is an entire configuration diagram of a refrigeration cycle apparatus according to a seventh embodiment.

In a seventh embodiment, as shown in the entire configuration diagram of FIG. 25, the auxiliary heating bypass passage 24 and the fourth opening/closing valve 18d which are the same as those in the third embodiment are added to the structure of the fourth embodiment, and a fifth flow rate adjustment valve 14e is employed instead of the fixed throttle 22 by way of example. Also, in the refrigeration cycle apparatus 10a, switching can be performed to a refrigerant circuit for the strong air heating mode, like the third embodiment. FIG. 25 shows the flow of the refrigerant in the strong air heating mode by solid arrows.

Next, the operation of the refrigeration cycle apparatus in the seventh embodiment will be described below. In the air cooling mode, the weak dehumidification-air heating mode, the dehumidification-air heating mode, and the air heating mode, the air conditioning controller closes the fourth opening/closing valve 18d while setting the valve opening degree of the fifth flow rate adjustment valve 14e to a predetermined valve opening degree that can exhibit the substantially same decompression effect as that of the fixed throttle 22 of the fourth embodiment. The operations of various other devices to be controlled are the same as those in the fourth embodiment.

Thus, in the air cooling mode, the weak dehumidification-air heating mode, the dehumidification-air heating mode, and the air heating mode, the same cycle as that in the fourth embodiment is configured to operate in the same way as in the fourth embodiment. As a result, the same effects as those of the fourth embodiment can be obtained.

In the strong air heating mode, the air conditioning controller fully opens or puts the first flow rate adjustment valve 14a into the throttled state, completely closes the second flow rate adjustment valve 14b, puts the third flow rate adjustment valve 14c into the throttled state, completely closes the fourth flow rate adjustment valve 14d, and fully opens the fifth flow rate adjustment valve 14e. Further, the air conditioning controller opens the first opening/closing valve 18a, closes the second opening/closing valve 18b, opens the third opening/closing valve 18c, opens the fourth opening/closing valve 18d, opens the fifth opening/closing valve 18e, closes the sixth opening/closing valve 18f, and opens the seventh opening/closing valve 18g.

Thus, in the strong air heating mode, the two-stage pressurizing type ejector refrigeration cycle is configured as indicated by solid arrows of FIG. 25 in the following way. Specifically, the refrigerant circulates through the discharge port 41c of the compressor 41, the interior condenser 12, the first flow rate adjustment valve 14a, the heating side ejector 15, the accumulator 16, (the third opening/closing valve 18c, and the seventh opening/closing valve 18g), and the intermediate pressure port 41b of the compressor 41 in this order. Further, the refrigerant circulates through the accumulator 16, the third flow rate adjustment valve 14c, the exterior heat exchanger 17, (the first opening/closing valve 18a), and the heating side refrigerant suction port 15d of the heating side ejector 15 in this order. Moreover, the refrigerant circulates through the accumulator 16, the third flow rate adjustment valve 14c, the exterior heat exchanger 17, (the fifth opening/closing valve 18e), and the suction port 41a of the compressor 41 in this order.

Simultaneously, a hot gas cycle is configured such that the refrigerant circulates through the discharge port 41c of the compressor 41, the interior evaporator 23, (the fifth flow rate adjustment valve 14e), the cooling side gas-liquid separator 21, (the seventh opening/closing valve 18g), and the intermediate pressure port 41b of the compressor 41 in this order.

Figure 26:
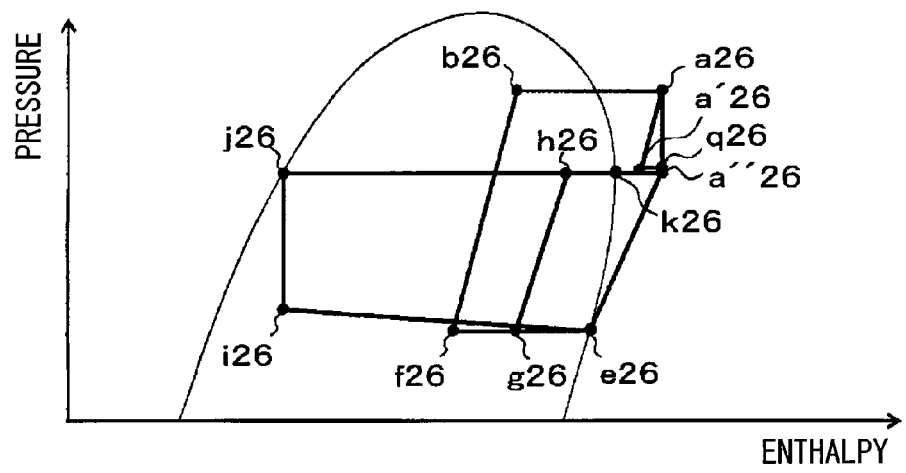
FIG. 26 is a Mollier chart showing the state of refrigerant in a strong air heating mode of the refrigeration cycle apparatus in the seventh embodiment.

Therefore, the refrigeration cycle apparatus 10a in the strong air heating mode changes the state of the refrigerant as illustrated in a Mollier chart of FIG. 26. That is, the refrigerant flowing from the compressor 41 into the interior condenser 12 exchanges heat with the air at the interior condenser 12 to dissipate the heat therefrom in the same way as in the air heating mode of the fourth embodiment (as indicated from a point a26 to a point b26 in FIG. 26). In this way, the air is heated. The action of the refrigerant flowing out of the interior condenser 12 in the following steps is changed in the same manner as that in the air heating mode of the fourth embodiment.

On the other hand, the refrigerant flowing from the compressor 11 into the side of the auxiliary heating bypass passage 24 exchanges heat with air before the air passes through the interior condenser 12 to dissipate the heat therefrom at the interior evaporator 23, and then flows into the intermediate pressure port 41b (as indicated from a point q26 to a point a'26 in FIG. 26).

Thus, since the air is heated before passing through the interior condenser 12, the temperature of the air flowing into the interior condenser 12 in the strong air heating mode is higher than that of air flowing into the interior condenser 12 in the air heating mode. Therefore, in the strong air heating mode, the air is heated with a higher heating capacity than that in the air heating mode, thereby enabling air heating of the vehicle interior, like the third embodiment.

(Eighth Embodiment)

In the above-mentioned embodiments, the refrigeration cycle apparatus is configured to be capable of switching between the weak dehumidification-air heating mode and the dehumidification-air heating mode. On the other hand, a refrigeration cycle apparatus 10 in an eighth embodiment is further configured to be capable of perform switching to a refrigerant circuit for a serial dehumidification-air heating mode, in addition to those for the weak dehumidification-air heating mode and the dehumidification-air heating mode.

The weak dehumidification-air heating mode described in the above embodiment is performed when the total amount of heat required to sufficiently heat the air is smaller than the sum of an amount of compression work performed by the compressor 11 and an amount of heat absorption at the interior evaporator 23. In the weak dehumidification-air heating mode, the refrigeration cycle is configured such that the exterior heat exchanger 17 and the interior evaporator 23 are connected in series with respect to the refrigerant flow, while the exterior heat exchanger 17 serves as the radiator.

On the other hand, the dehumidification-air heating mode is performed when the total amount of heat required to sufficiently heat the air is larger than the sum of an amount of compression work performed by the compressor 11 and an amount of heat absorption at the interior evaporator 23. In the dehumidification-air heating mode, the refrigeration cycle is configured such that the exterior heat exchanger 17 and the interior evaporator 23 are connected in parallel with respect to the refrigerant flow, whereby both the exterior heat exchanger 17 and the interior evaporator 23 serves as the evaporator. That is, the refrigerant evaporation temperature in the exterior heat exchanger 17 can be set lower than that in the interior evaporator 23.

However, in the dehumidification-air heating mode, the exterior heat exchanger 17 and the interior evaporator 23 are connected to each other in parallel to the refrigerant flow. For this reason, in order to appropriately exhibit the required heating capacity, a ratio of the refrigerant flow rate of the refrigerant flowing into the exterior heat exchanger 17 to that flowing into the interior evaporator 23 has to be appropriately adjusted.

Thus, for example, when the total amount of heat required to sufficiently heat the air is slightly larger than the sum of the amount of compression work performed by the compressor 11 and the amount of heat absorption at the interior evaporator 23, the amount of heat absorption at the exterior heat exchanger 17 might be unnecessarily increased if the above-mentioned flow rate ratio cannot be appropriately adjusted, thereby undesirably increasing the heating capacity of the air.

In the eighth embodiment, suppose the target air temperature TAO is equal to or more than an air-cooling reference temperature $\alpha$, and an outside air temperature Tam is equal to or less than a dehumidification-air heating reference temperature $\beta$ with the air cooler switch on the operation panel turned on.

Even in this case, when the outside air temperature Tam is higher than a serial dehumidification-air heating reference temperature $\beta 1$ (note $\beta 1 < \beta$), the operation in the serial dehumidification-air heating mode is performed to reheat the air with a heating capacity lower than that in the dehumidification-air heating mode.

Figure 27:
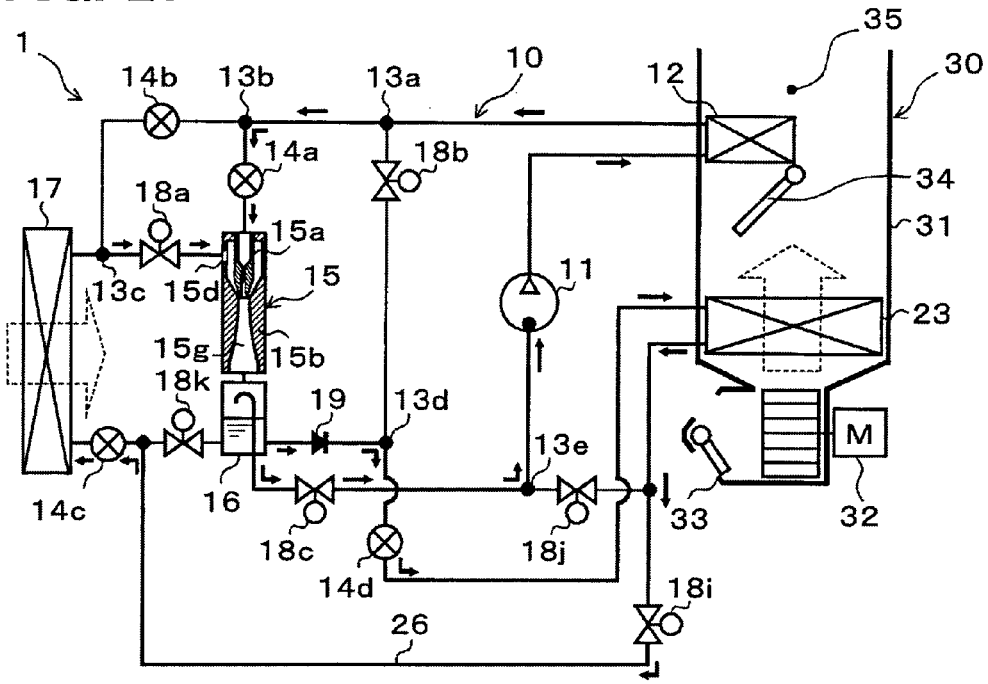
FIG. 27 is an entire configuration diagram showing a refrigerant circuit in a serial dehumidification-air heating mode of the refrigeration cycle apparatus according to an eighth embodiment.

Specifically, in the refrigeration cycle apparatus 10 of the eighth embodiment, as shown in FIG. 27, a dehumidification bypass passage 26 or the like for guiding the refrigerant flowing out of the interior evaporator 23 to an upstream side of the third flow rate adjustment valve 14c is added to the structure of the refrigeration cycle apparatus 10 of the second embodiment. Therefore, the third flow rate adjustment valve 14c serves as an auxiliary decompressor that decompress the refrigerant flowing into the exterior heat exchanger 17 via the dehumidification bypass passage 26.

In the refrigeration cycle apparatus 10 of the eighth embodiment, a ninth opening/closing valve 18i, a tenth opening/closing valve 18j, and an eleventh opening/closing valve 18k are added. The ninth opening/closing valve 18i serves to open and close the dehumidification bypass passage 26. The tenth opening/closing valve 18j serves to open and close the refrigerant passage between the inlet side of the dehumidification bypass passage 26 and the fifth three-way joint 13e. The eleventh opening/closing valve 18k serves to open and close the refrigerant passage between one of the liquid-phase refrigerant outflow ports of the accumulator 16 and the outlet side of the dehumidification bypass passage 26.

These ninth to eleventh opening/closing valves 18i to 18k have the basic same structure as that of the first opening/closing valve 18a or the like. The air conditioning controller controls the opening/closing operation of each of these ninth to eleventh opening/closing valves 18i to 18k, so that the refrigeration cycle apparatus 10 performs switching to the refrigerant circuit for the serial dehumidification-air heating mode, in addition to the refrigerant circuits for the above-mentioned respective operation modes.

Therefore, the ninth to eleventh opening/closing valves 18*i* to 18*k* constitute a refrigerant circuit switch, together with the first and second flow rate adjustment valves 14*a* and 14*b*, the first to third opening/closing valves 18*a* to 18*c*, and the like. The structures of other components in the eighth embodiment are the same as those in the second embodiment.

Now, the operation of the above-mentioned structure will be described. First, in the air cooling mode, the weak dehumidification-air heating mode, the dehumidification-air heating mode, and the air heating mode, the air conditioning controller closes the ninth opening/closing valve 18*i*, and opens the tenth and eleventh opening/closing valves 18*j* and 18*k*. Other operations in the eighth embodiment are the same as those in the second embodiment.

Therefore, in the air cooling mode, the weak dehumidification-air heating mode, the dehumidification-air heating mode, and the air heating mode, the same refrigeration cycle as that of the second embodiment can be configured to operate the refrigeration cycle apparatus 10 in the same manner as in the second embodiment.

Next, in the serial dehumidification-air heating mode, the air conditioning controller fully opens the first flow rate adjustment valve 14*a*, completely closes the second flow rate adjustment valve 14*b*, puts the third flow rate adjustment valve 14*c* into the throttled state, and puts the fourth flow rate adjustment valve 14*d* into the throttled state. Further, the air conditioning controller opens the first opening/closing valve 18*a*, closes the second opening/closing valve 18*b*, opens the third opening/closing valve 18*c*, opens the ninth opening/closing valve 18*i*, and closes the tenth and eleventh opening/closing valves 18*j* and 18*k*.

Thus, in the serial dehumidification-air heating mode, the ejector refrigeration cycle is configured as indicated by solid arrows in FIG. 27. Specifically, the refrigerant circulates through the compressor 11, the interior condenser 12, the first flow rate adjustment valve 14*a*, the heating side ejector 15, the accumulator 16, (the third opening/closing valve 18*c*), and the compressor 11 in this order, while the refrigerant circulates through the accumulator 16, (the check valve 19), the fourth flow rate adjustment valve 14*d*, the interior evaporator 23, (the ninth opening/closing valve 18*i*), the third flow rate adjustment valve 14*c*, the exterior heat exchanger 17, (the first opening/closing valve 18*a*), and the heating side refrigerant suction port 15*d* of the heating side ejector 15 in this order.

With the refrigerant circuit structure, the air conditioning controller determines the operation states of the respective various devices to be controlled based on the target air temperature TAO, the detection signals from the sensor group, and the like. Specifically, the refrigerant discharge capacity of the compressor 11, and the control signal to be output to the electric actuator that drives the air mix door 34 are determined in the same manner as that in the weak dehumidification-air heating mode.

The valve opening degree of the fourth flow rate adjustment valve 14*d* is determined to be a predetermined opening degree. The valve opening degree of the third flow rate adjustment valve 14*c* is determined such that the refrigerant evaporation temperature in the exterior heat exchanger 17 is the outside air temperature Tam or less (further, 0° C. or less in the eighth embodiment).

Figure 28:
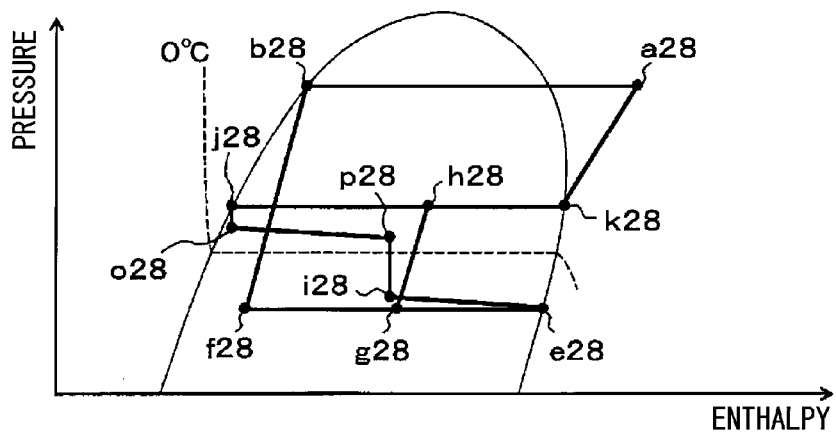
FIG. 28 is a Mollier chart showing the state of refrigerant in a serial dehumidification-air heating mode of the refrigeration cycle apparatus in the eighth embodiment.

Therefore, in the refrigeration cycle apparatus 10 in the serial dehumidification-air heating mode, as shown in the Mollier chart of FIG. 28, the high-pressure refrigerant (as indicated by a point a28 in FIG. 28) discharged from the compressor 11 flows into the interior condenser 12, and dissipates heat into air cooled and dehumidified by the interior evaporator 23 (as indicated from the point a28 to a point b28 in FIG. 28). In this way, the air is heated.

Since the second opening/closing valve 18*b* is closed and the second flow rate adjustment valve 14*b* is completely closed, the refrigerant flowing out of the interior condenser 12 flows into the heating side nozzle portion 15*a* of the heating side ejector 15 via the first flow rate adjustment valve 14*a* fully opened. The refrigerant flowing into the heating side nozzle portion 15*a* is isentropically decompressed and injected (as indicated from a point b28 to a point f28 in FIG. 28).

By the suction effect of the injection refrigerant, the refrigerant flowing out of the exterior heat exchanger 17 is drawn from the heating side refrigerant suction port 15*d* of the heating side ejector 15 via the third three-way joint 13*c* and the first opening/closing valve 18*a*.

The suction refrigerant drawn from the heating side refrigerant suction port 15*d* and the injection refrigerant injected from the heating side nozzle portion 15*a* flow into the heating side diffuser 15*g* to be mixed together, so that the pressure of the mixed refrigerant is raised (as indicated from a point e28 to a point g28 and a point h28 in this order, and from a point f28 to the point g28 and the point h28 in this order as shown in FIG. 28). The refrigerant flowing out of the heating side diffuser 15*g* flows into the accumulator 16 to be separated into gas and liquid phases (as indicated from the point h28 to a point k28, and from the point h28 to a point j28 in FIG. 28).

The liquid-phase refrigerant separated by the accumulator 16 (as indicated by the point j28 in FIG. 28) flows into the fourth flow rate adjustment valve 14*d* via the check valve 19 and the fourth three-way joint 13*d* because the eleventh opening/closing valve 18*k* is closed. The liquid-phase refrigerant flowing into the fourth flow rate adjustment valve 14*d* is isentropically decompressed by the fourth flow rate adjustment valve 14*d* to flow into the interior evaporator 23 (as indicated by the point j28 to a point o28 in FIG. 28).

The refrigerant flowing into the interior evaporator 23 exchanges heat with air blown from the blower 32 to evaporate itself (from the point o28 to a point p28 in FIG. 28). In this way, the air is cooled, thereby achieving the air cooling of the vehicle interior. The refrigerant flowing out of the interior evaporator 23 is guided to the upstream side of the third flow rate adjustment valve 14*c* via the dehumidification bypass passage 26 because the ninth opening/closing valve 18*i* is opened and the tenth opening/closing valve 18*j* is closed.

The refrigerant guided to the upstream side of the third flow rate adjustment valve 14*c* flows into the third flow rate adjustment valve 14*c* as the auxiliary decompressor to be isentropically decompressed by the third flow rate adjustment valve 14*c* because the eleventh opening/closing valve 18*k* is closed (as indicated from the point p28 to a point i28 in FIG. 28). At this time, the third flow rate adjustment valve 14*c* decompresses the refrigerant until the refrigerant evaporation temperature in the exterior heat exchanger 17 is equal to or less than the outside air temperature Tam (0° C. or less in the eighth embodiment).

The refrigerant decompressed by the third flow rate adjustment valve 14*c* flows into the exterior heat exchanger 17 to absorb heat from the outside air blown from the blower fan to evaporate itself (as indicated from the point i28 to a point e28 in FIG. 28). Since the second flow rate adjustment valve 14*b* is completely closed, the refrigerant flowing out of the exterior heat exchanger 17 is drawn from the heating side refrigerant suction port 15d of the heating side ejector 15 via the third three-way joint 13c and the first opening/closing valve 18a.

The gas-phase refrigerant separated by the accumulator 16 (as indicated by a point k28 in FIG. 28) is drawn into the compressor 11 via the third opening/closing valve 18c. Thus, in the serial dehumidification-air heating mode, the air cooled by the interior evaporator 23 is reheated in the interior condenser 12 and blown into the vehicle interior to enable the dehumidification-air heating of the vehicle interior.

As can be seen from the description above, the gas-phase refrigerant separated by the accumulator 16 is a part of the refrigerant on the downstream side of the heating side ejector 15, while the liquid-phase refrigerant separated by the accumulator 16 is another part of the refrigerant on the downstream side of the heating side ejector 15.

As mentioned above, the vehicle air conditioner 1 of the eighth embodiment can achieve the appropriate air conditioning of the vehicle interior in the same way as in the second embodiment. The refrigeration cycle apparatus 10 performs the operation in the serial dehumidification-air heating mode, and thus can achieve the appropriate dehumidification-air heating of the vehicle interior even when the total amount of heat required to sufficiently heat the air is slightly larger than the sum of the amount of the compression work performed by the compressor 11 and the amount of heat absorption at the interior evaporator 23.

That is, in the serial dehumidification-air heating mode, the interior evaporator 23 and the exterior heat exchanger 17 are connected to each other in series, whereby the flow rate of the refrigerant flowing through the interior evaporator 23 is identical to that of the refrigerant flowing through the exterior heat exchanger 17. Thus, the heating capacity can be easily adjusted without needing adjustment of the ratio of the flow rate of the refrigerant flowing into the exterior heat exchanger 17 to that of the refrigerant flowing into the interior evaporator 23, like the dehumidification-air heating mode in which the interior evaporator 23 and the exterior heat exchanger 17 are connected to each other in parallel.

The ninth to eleventh opening/closing valves 18i to 18k, by way of example, serve as the refrigerant circuit switch that performs switching to the refrigerant circuit for allowing the refrigerant to flow from the interior evaporator 23 into the dehumidification bypass passage 26 in the serial dehumidification-air heating mode. However, the refrigerant circuit switch is not limited thereto. For example, instead of the ninth to eleventh opening/closing valves 18i to 18k, an electric three-way valve may be disposed at each of the inlet and outlet of the dehumidification bypass passage 26.

In the eighth embodiment, the dehumidification bypass passage 26 or the like, by way of example, is added to the refrigeration cycle apparatus 10 described in the second embodiment. It is obvious that the dehumidification bypass passage 26 or the like may be added to the refrigeration cycle apparatus 10 described in the first embodiment.

Figure 29:
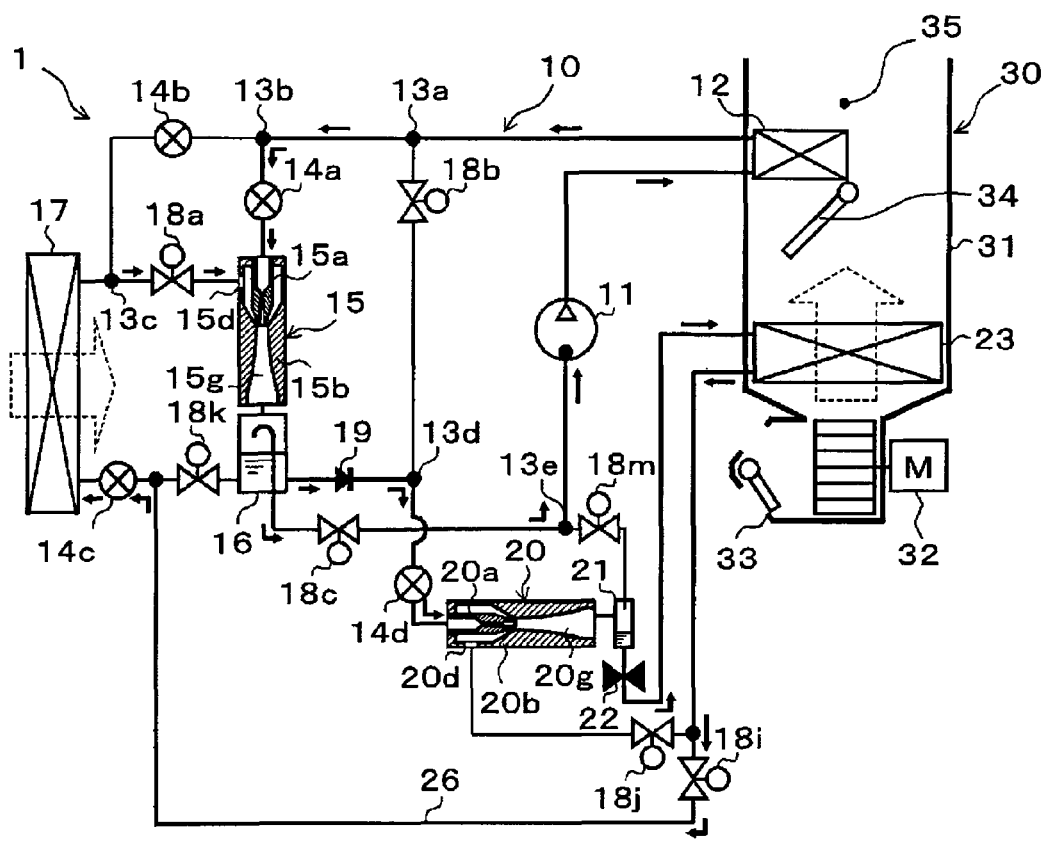
FIG. 29 is an entire configuration diagram showing a refrigerant circuit in a serial dehumidification-air heating mode of a refrigeration cycle apparatus according to a modified example of the eighth embodiment.

In this case, as shown in FIG. 29, a twelfth opening/closing valve 18m is preferably further provided to open and close a refrigerant passage between the fifth three-way joint 13e and a gas-phase refrigerant outflow port of the cooling side gas-liquid separator 21, in addition to the ninth to eleventh opening/closing valves 18i to 18k as the refrigerant circuit switch. Then, in the air cooling mode, the weak dehumidification-air heating mode, the dehumidification-air heating mode, and the air heating mode, the air conditioning controller preferably closes the ninth opening/closing valve 18i, and opens the tenth to twelfth opening/closing valves 18j to 18m.

In the serial dehumidification-air heating mode, the air conditioning controller may fully open the first flow rate adjustment valve 14a, completely close the second flow rate adjustment valve 14b, put the third flow rate adjustment valve 14c into the throttled state, and put the fourth flow rate adjustment valve 14d into the throttled state. In this case, the air conditioning controller opens the first opening/closing valve 18a, closes the second opening/closing valve 18b, opens the third opening/closing valve 18c, opens the ninth opening/closing valve 18i, and closes the tenth to twelfth opening/closing valves 18j to 18m.

(Ninth Embodiment)

Figure 30:
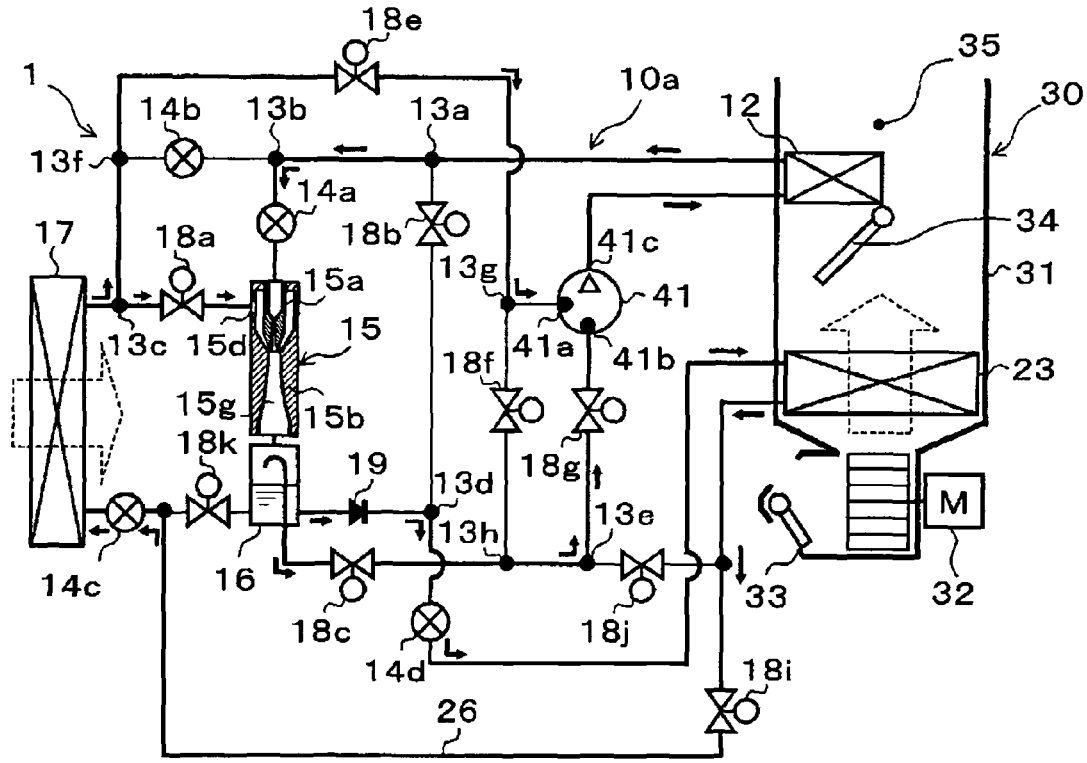
FIG. 30 is an entire configuration diagram showing a refrigerant circuit in a serial dehumidification-air heating mode of the refrigeration cycle apparatus according to a ninth embodiment.

In a ninth embodiment, as shown in the entire configuration diagram of FIG. 30, the dehumidification bypass passage 26 and the ninth to eleventh opening/closing valves 18i to 18k, which are the same as those of the eighth embodiment, are added to the structure of the refrigeration cycle apparatus 10a described in the sixth embodiment. Thus, the operation in the serial dehumidification-air heating mode can be performed, in addition to those in the weak dehumidification-air heating mode and the dehumidification-air heating mode. The structures of other components in the ninth embodiment are the same as those in the sixth embodiment.

Further, the air conditioning controller closes the ninth opening/closing valve 18i, and opens the tenth and eleventh opening/closing valves 18j and 18k in the air cooling mode, the weak dehumidification-air heating mode, the dehumidification-air heating mode, and the air heating mode of the refrigeration cycle apparatus 10a in the ninth embodiment. Other operations in the ninth embodiment are the same as those in the sixth embodiment.

Therefore, the same refrigeration cycle as that of the sixth embodiment can be configured to operate in the same manner as in the sixth embodiment in the air cooling mode, the weak dehumidification-air heating mode, the dehumidification-air heating mode, and the air heating mode.

Next, in the serial dehumidification-air heating mode, the air conditioning controller fully opens the first flow rate adjustment valve 14a, completely closes the second flow rate adjustment valve 14b, puts the third flow rate adjustment valve 14c into the throttled state, and puts the fourth flow rate adjustment valve 14d into the throttled state. Further, the air conditioning controller opens the first opening/closing valve 18a, closes the second opening/closing valve 18b, opens the third opening/closing valve 18c, opens the ninth opening/closing valve 18i, and closes the tenth and eleventh opening/closing valves 18j and 18k.

Thus, in the serial dehumidification-air heating mode, the two-stage pressurizing type ejector refrigeration cycle is configured as indicated by solid arrows of FIG. 30 in the following way. Specifically, the refrigerant circulates through a discharge port 41c of the compressor 41, the interior condenser 12, the first flow rate adjustment valve 14a, the heating side ejector 15, the accumulator 16, (the third opening/closing valve 18c, and the seventh opening/closing valve 18g), and the intermediate pressure port 41b of the compressor 41 in this order. Further, the refrigerant circulates through the accumulator 16, (the check valve 19), the fourth flow rate adjustment valve 14d, the interior evaporator 23, (the ninth opening/closing valve 18i), the third flow rate adjustment valve 14c, the exterior heat exchanger 17, (the first opening/closing valve 18a), and the heating side refrigerant suction port 15d of the heating side ejector 15 in this order. Moreover, the refrigerant circulates through the accumulator 16, the third flow rate adjustment valve 14c, the exterior heat exchanger 17, (the fifth opening/closing valve 18e), and the suction port 41a of the compressor 41 in this order.

With the refrigerant circuit structure, the air conditioning controller determines the operation states of the respective various devices to be controlled based on the target air temperature TAO, the detection signals from the sensor group, and the like. Specifically, the refrigerant discharge capacity of the compressor 11, and the control signal to be output to the electric actuator for driving the air mix door 34 are determined in the same manner as that in the weak dehumidification-air heating mode.

The valve opening degree of the fourth flow rate adjustment valve 14d is determined to be a predetermined opening degree. The valve opening degree of the third flow rate adjustment valve 14c is determined such that the refrigerant evaporation temperature in the exterior heat exchanger 17 is the outside air temperature Tam or less (further, 0° C. or less in the ninth embodiment).

Figure 31:
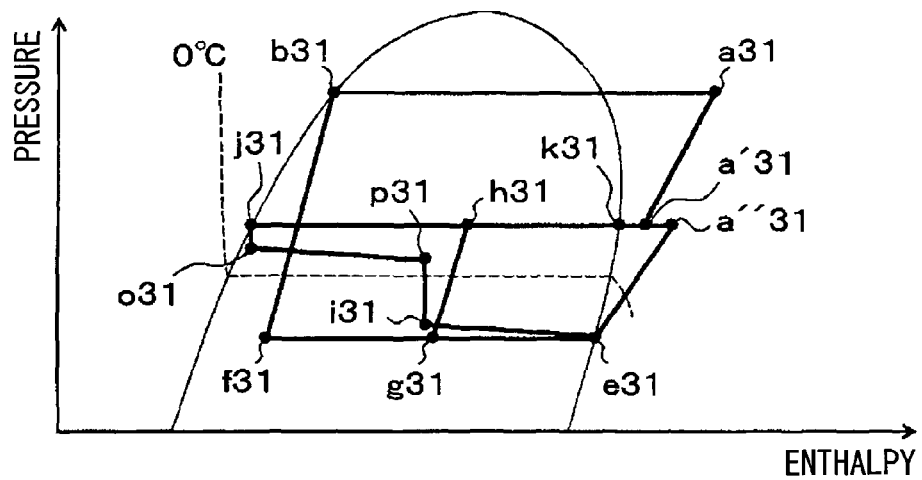
FIG. 31 is a Mollier chart showing the state of refrigerant in a serial dehumidification-air heating mode of the refrigeration cycle apparatus in the ninth embodiment.

Therefore, in the refrigeration cycle apparatus 10a, at least a part of the refrigerant flowing out of the exterior heat exchanger 17 (at a point e31 of FIG. 31) flows into the suction port 41a of the compressor 41 to be pressurized up to the intermediate-pressure refrigerant by the low-stage side compression mechanism (as indicated from the point e31 to a point a″31 in FIG. 31).

The gas-phase refrigerant flowing from the accumulator 16 (at a point k31 in FIG. 31) flows into the intermediate pressure port 41b of the compressor 41 to be merged with the intermediate-pressure refrigerant pressurized by the low-stage side compression mechanism (as indicated from the point k31 to a point a'31, and from a point a″31 to the point a'31 in FIG. 31). Then, the merged refrigerant is compressed to a high-pressure refrigerant by the high-stage side compression mechanism (as indicated from the point a'31 to a point a31 in FIG. 31). Other changes in state of the refrigerant in the ninth embodiment are the same as those in the eighth embodiment.

As mentioned above, the vehicle air conditioner 1 of the ninth embodiment can achieve the appropriate air conditioning of the vehicle interior in the same way as in the sixth embodiment. The refrigeration cycle apparatus 10a of the ninth embodiment can perform the operation in the serial dehumidification-air heating mode, and thus can achieve the appropriate dehumidification-air heating of the vehicle interior in the same way as in the eighth embodiment.

In the ninth embodiment, the dehumidification bypass passage 26 or the like, by way of example, is added to the refrigeration cycle apparatus 10 described in the sixth embodiment. Alternatively, the dehumidification bypass passage 26 or the like may be added to the refrigeration cycle apparatus 10 described in the fourth embodiment.

Figure 32:
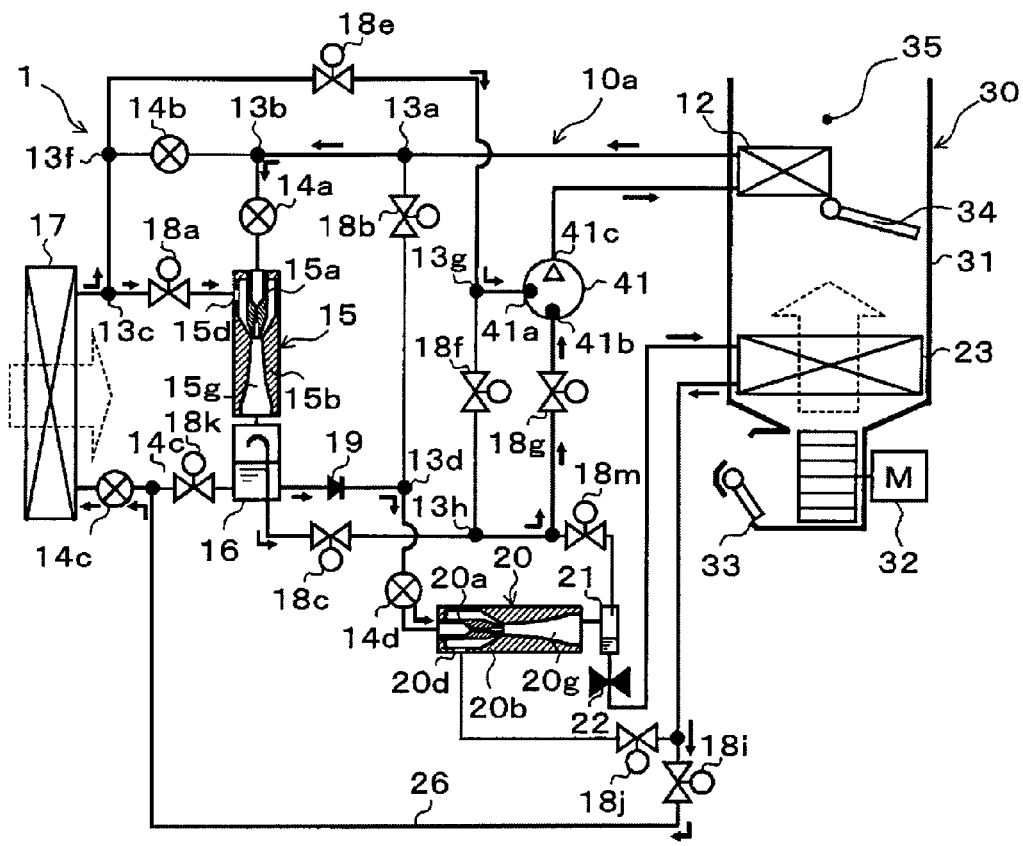
FIG. 32 is an entire configuration diagram showing a refrigerant circuit in a serial dehumidification-air heating mode of a refrigeration cycle apparatus according to a modified example of the ninth embodiment.

In this case, as shown in FIG. 32, a twelfth opening/closing valve 18m is preferably further provided to open and close a refrigerant passage between the fifth three-way joint 13e and a gas-phase refrigerant outflow port of the cooling side gas-liquid separator 21, in addition to the ninth to eleventh opening/closing valves 18i to 18k as the refrigerant circuit switch. Then, the air conditioning controller preferably closes the ninth opening/closing valve 18i, and opens the tenth to twelfth opening/closing valves 18j to 18m in the air cooling mode, the weak dehumidification-air heating mode, the dehumidification-air heating mode, and the air heating mode.

In the serial dehumidification-air heating mode, the air conditioning controller may fully open the first flow rate adjustment valve 14a, completely close the second flow rate adjustment valve 14b, put the third flow rate adjustment valve 14c into the throttled state, and put the fourth flow rate adjustment valve 14d into the throttled state. In this case, the air conditioning controller opens the first opening/closing valve 18a, closes the second opening/closing valve 18b, opens the third opening/closing valve 18c, opens the ninth opening/closing valve 18i, and closes the tenth to twelfth opening/closing valves 18j to 18m.

(Tenth Embodiment)

Figure 33:
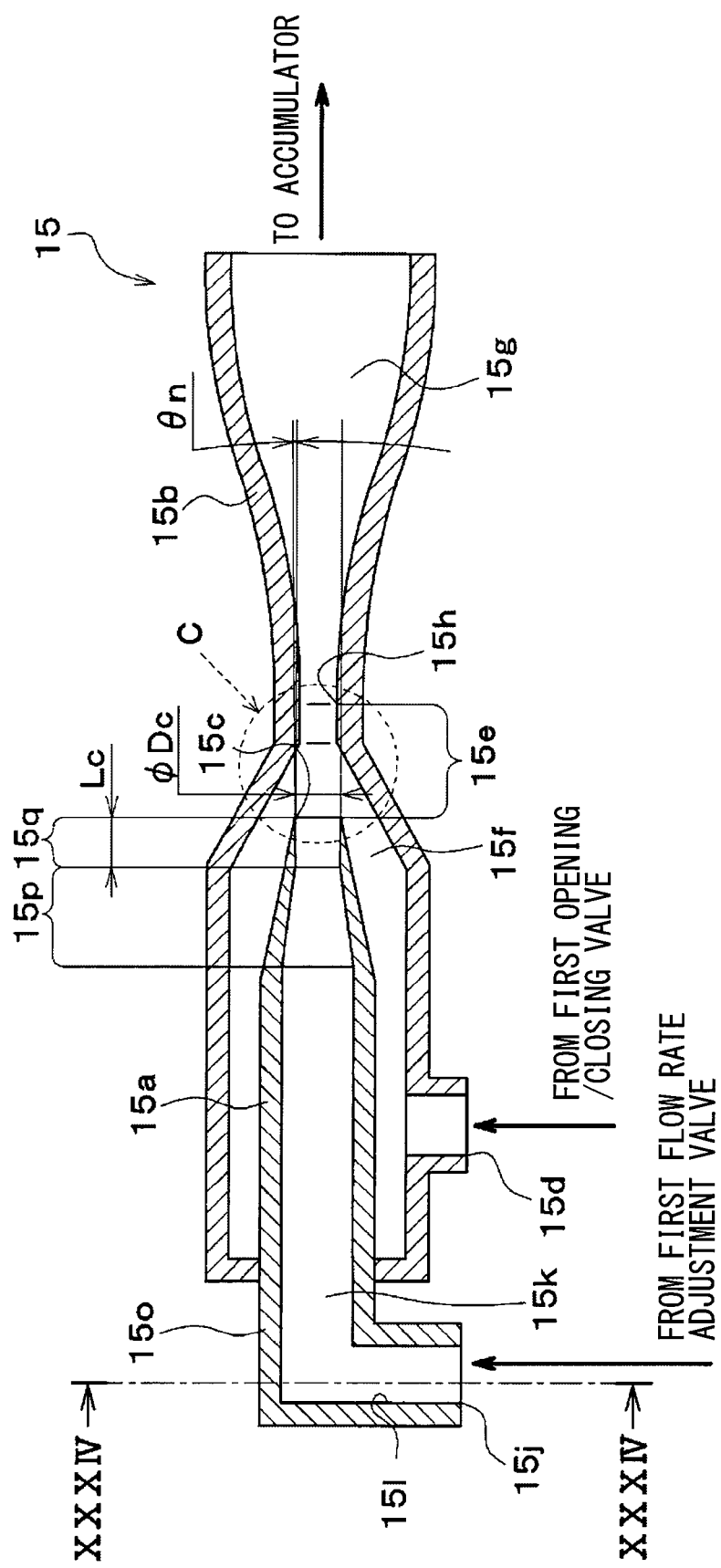
FIG. 33 is a cross-sectional view in an axial direction of the heating side ejector according to a tenth embodiment.
Figure 34:
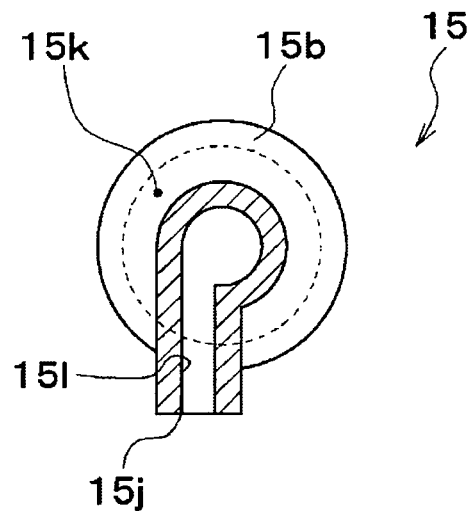
FIG. 34 is a cross-sectional view taken along the line XXXIV-XXXIV in FIG. 33.
Figure 35:
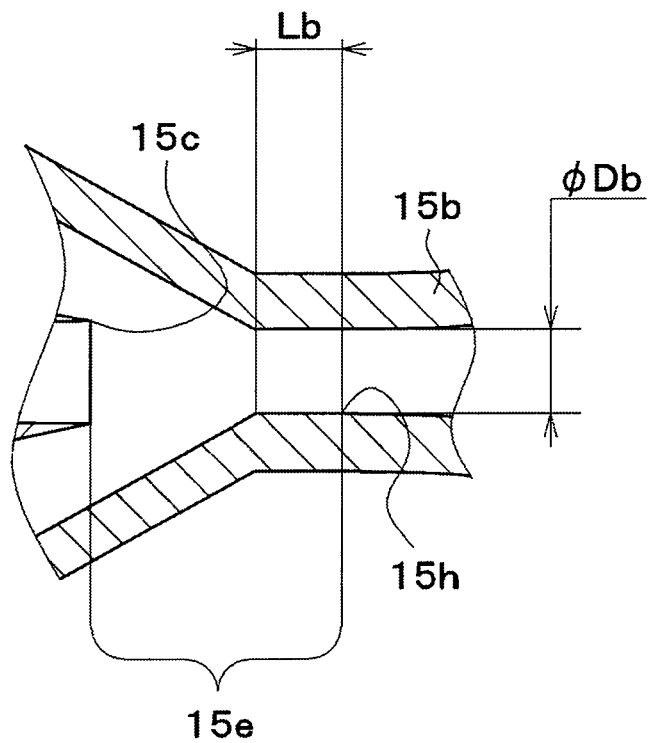
FIG. 35 is an enlarged view of a C part shown in FIG. 33.

In a tenth embodiment, as shown in FIGS. 33 to 35, the structure of the heating side ejector 15 is changed by way of example, as compared to the first embodiment. Specifically, the heating side ejector 15 is provided with a swirling space 15k on the upstream side of the refrigerant flow of the heating side nozzle portion 15a. The swirling space 15k allows the refrigerant flowing into the refrigerant inflow port 15j to turn around an axis of the heating side nozzle portion 15a.

More specifically, the swirling space 15k is formed inside a cylindrical portion 15o provided on the upstream side of the refrigerant flow in the heating side nozzle portion 15a. Therefore, the cylindrical portion 15o constitutes a swirling space formation member, which is described in the accompanied claims, whereby the swirling space formation member and the nozzle portion are integrally configured.

The swirling space 15k is formed in the shape of a rotor with its central axis extending coaxially with respect to the heating side nozzle portion 15a. The shape of the rotor is a three-dimensional shape formed by rotating a plane figure about one straight line (central shaft) on the same plane. More specifically, the swirling space 15k is formed in the substantially cylindrical shape.

Referring to FIG. 34, as seen from the direction of the central axis of the swirling space 15k, a refrigerant inflow passage 151 for connecting the refrigerant inflow port 15j with the swirling space 15k extends in the direction of a tangential line to the inner wall surface of the swirling space 15k. Thus, the refrigerant flowing from the refrigerant inflow port 15j into the swirling space 15k flows along the inner wall surface of the swirling space 15k, and turns around within the swirling space 15k.

Here, a centrifugal force acts on the refrigerant swirling in the swirling space 15k, whereby the refrigerant pressure on the central axis side within the swirling space 15k becomes lower than that on the outer peripheral side thereof. In the tenth embodiment, during the normal operation in the dehumidification-air heating mode and the air heating mode, the refrigerant pressure on the central shaft side within the swirling space 15k is decreased to a pressure that generates a saturated liquid-phase refrigerant, or a pressure that causes the refrigerant to be decompressed and boiled (causing cavitation).

The adjustment of the refrigerant pressure on the central axis side within the swirling space 15k can be achieved by adjusting the swirling flow velocity of the refrigerant swirling within the swirling space 15k. Further, the adjustment of the swirling flow velocity can be performed by adjusting a ratio of a passage sectional area of the refrigerant inflow passage 151 to a flow path sectional area as a sectional area vertical to the axial direction of the swirling space 15k, or by adjusting a valve opening degree of the first flow rate adjustment valve 14a disposed on the upstream side of the heating side nozzle portion 15a.

The heating side nozzle portion 15a includes a tapered portion 15p having its refrigerant passage area gradually decreased toward the refrigerant injection port 15c, and an injection portion 15q for guiding the refrigerant from the tapered portion 15p to the refrigerant injection port 15c, as a refrigerant passage formed therein. That is, the heating side nozzle portion 15a is configured as a so-called tapered nozzle.

The injection portion 15q is a space for guiding the refrigerant from the most downstream part of the tapered portion 15p toward the refrigerant injection port 15c. Thus, the injection shape or spreading direction of the injection refrigerant injected from the refrigerant injection port 15c can be changed depending on a spreading angle θn on the section of the heating side nozzle portion 15a of the injection portion 15q in the axial direction. That is, the injection portion 15q can be expressed as a space that defines the injection direction of the refrigerant injected from the refrigerant injection port 15c.

Further, the spreading angle θn of the injection portion 15q with respect to the section of the heating side nozzle portion 15a in the axial direction is set to 0°. That is, the injection portion 15q extends in the axial direction of the heating side nozzle portion 15a, and is formed by a cylindrical space with a certain refrigerant passage area. FIG. 33 illustrates a spreading angle θn of about 1° for clarifying the spreading angle θn.

As shown in FIG. 33, when Lc is a length in the axial direction of a part with the injection portion 15q formed thereat in the refrigerant passage formed within the heating side nozzle portion 15a, and φDc is an equivalent diameter of an opening area of the refrigerant injection port 15c, the length Lc in the axial direction is determined to satisfy the following formula F5.

$$Lc/\phi Dc \leq 1 \tag{F5}$$

Here, specifically, Lc/φDc=1.

The heating side nozzle portion 15a has the refrigerant passage formed therein as mentioned above, whereby the refrigerant injected from the refrigerant injection port 15c into the mixing portion 15e is flexibly expanded.

The mixing portion 15e is formed in the shape obtained by a combination of a truncated conical shape that gradually reduces a refrigerant passage area toward the downstream side of the refrigerant flow, and a cylindrical shape that has a certain refrigerant passage area.

More specifically, as shown in an enlarged diagram of FIG. 35, when Lb is a length of a cylindrical part of the mixing portion 15e in the axial direction of the heating side nozzle portion 15a, and φDb is a diameter of the cylindrical shaped part (corresponding to the diameter of the inlet 15h of the heating side diffuser 15g), the length Lb is determined to satisfy the following formula F6.

$$Lb/\phi Db \leq 1 \tag{F6}$$

In the tenth embodiment, specifically, Lb/φDb=1.

The structures and operations of other components of the heating side ejector 15 and the refrigeration cycle apparatus 10 in the tenth embodiment are the same as those in the first embodiment. Thus, the refrigeration cycle apparatus 10 and the heating side ejector 15 can also obtain the same effects as those of the first embodiment.

The injection portion 15q is provided in the heating side nozzle portion 15a, so that the heating side ejector 15 of the tenth embodiment flexibly expands the refrigerant to be injected from the refrigerant injection port 15c into the mixing portion 15e. Thus, the pressurizing performance of the heating side diffuser 15g can be effectively prevented from being reduced.

More specifically, during the high heating-capacity operation in the air heating mode, the dryness x of the refrigerant flowing into the heating side nozzle portion 15a of the heating side ejector 15 is controlled to have a high value, as compared to that obtained during the normal operation in the dehumidification-air heating mode and the air heating mode. Thus, in the high heating-capacity operation, the enthalpy of the refrigerant flowing into the heating side nozzle portion 15a is increased to thereby increase the amount of recovered energy as described above with reference to FIG. 8, as compared to the normal operation (as indicated from Δiej to Δi'ej of FIG. 8).

In a general ejector, the maximum value of the flow velocity V of the injection refrigerant directly after being injected from the refrigerant injection port of the nozzle portion can be represented by the following formula F7.

$$V = V0 + (2 \times \Delta iej)^{0.5} \tag{F7}$$

where V0 is an initial velocity of the refrigerant flowing into the nozzle portion.

That is, generally, as the enthalpy of the refrigerant flowing into the nozzle portion becomes higher, the flow velocity V of the injection refrigerant tends to be higher, and the wall-surface friction between the refrigerant and the refrigerant passage formed in the nozzle portion also tends to be increased.

When a gas-liquid two-phase refrigerant with a high gas-liquid density ratio (for example, a gas-liquid two-phase refrigerant with a gas-liquid density ratio of 200 or more) flows through the refrigerant passage formed in the nozzle portion at high velocity, the wall-surface friction between the refrigerant and the refrigerant passage might be significantly increased, leading to a loss of the kinetic energy contained in the refrigerant. Such a loss of the kinetic energy might reduce the flow velocity of the injection refrigerant, thereby degrading the pressurizing performance of the diffuser.

On the other hand, the heating side ejector 15 of the tenth embodiment includes the injection portion 15q disposed in the heating side nozzle portion 15a as the tapered nozzle, and thus flexibly expands the mixed refrigerant to be injected from the refrigerant injection port 15c to the mixing portion 15e. Accordingly, the heating side ejector of the tenth embodiment can accelerate the injection refrigerant by the mixing portion 15e without providing the divergent portion, unlike the Laval nozzle.

That is, the heating side ejector can accelerate the refrigerant without causing the wall-surface friction between the refrigerant passage and the refrigerant that would be otherwise caused by the divergent portion of the Laval nozzle when the refrigerant is accelerated at the supersonic velocity. Thus, the wall-surface friction between the refrigerant and the refrigerant passage can be reduced to suppress the loss of the kinetic energy contained in the refrigerant flowing through the refrigerant passage.

Further, during the high heating-capacity operation in the air heating mode, not only the dryness x of the refrigerant flowing into the heating side nozzle portion 15a, but also the flow rate of the refrigerant flowing into the heating side nozzle portion 15a is increased as compared to the normal operation in the dehumidification-air heating mode and the air heating mode. Thus, the density of the refrigerant injected from the refrigerant injection port 15c of the heating side nozzle portion 15a tends to be lower during the high heating-capacity operation, as compared to the dehumidification-air heating mode and the like.

Thus, when the shape of the refrigerant passage of the heating side nozzle portion 15a is determined according to the change in density of the refrigerant in the high heating-capacity operation, the refrigerant passage area on the most downstream side of the heating side nozzle portion 15a might be unnecessarily expanded during the normal operation in the dehumidification-air heating mode or the air heating mode, which tends to cause the overexpansion of the refrigerant.

Such overexpansion generates the so-called oblique shock wave to decrease the flow velocity of the injection refrigerant injected from the refrigerant injection port 15c of the heating side nozzle portion 15a. The reason for this is that the occurrence of the oblique shock wave due to the overexpansion takes the refrigerant away from the wall surface of the refrigerant passage in the heating side nozzle portion 15a, which leads to a substantial decrease in refrigerant passage area of the divergent portion of the heating side nozzle portion 15a formed as the Laval nozzle.

On the other hand, the heating side ejector 15 of the tenth embodiment includes the injection portion 15q disposed in the heating side nozzle portion 15a as the tapered nozzle, and thus flexibly expands the mixed refrigerant to be injected from the refrigerant injection port 15c to the mixing portion 15e. Thus, the overexpansion of the refrigerant can be suppressed to prevent the occurrence of the oblique shock wave during the normal operation in the dehumidification-air heating mode and the air heating mode.

As a result, the heating side ejector 15 can suppress the decrease in flow velocity of the injection refrigerant even in any operation mode, thereby preventing the reduction in pressurizing performance of the heating side diffuser 15g.

Although the spreading angle θn of the injection portion 15q on the section of the heating side nozzle portion 15a in the axial direction is set to 0° by way of example, the spreading angle θn may be set to more than 0° as long as the refrigerant injected from the refrigerant injection port 15c can be flexibly expanded. That is, the injection portion 15q may be formed by the space with the truncated conical shape that gradually increases its refrigerant passage sectional area toward the refrigerant flow direction.

The heating side ejector 15 of the tenth embodiment includes the swirling space formation member 15o that forms the swirling space 15k, so that the refrigerant can swirl around the axis of the heating side nozzle portion 15a within the swirling space 15k.

In this way, during the normal operation in the dehumidification-air heating mode and the air heating mode, the refrigerant pressure on the central axial side within the swirling space 15k can be decreased to a pressure that generates a saturated liquid-phase refrigerant, or a pressure that decompresses and boils the refrigerant (causing cavitation). Thus, the boiling of the liquid-phase refrigerant can be promoted to improve the nozzle efficiency. The term "nozzle efficiency" as used herein means an energy conversion efficiency obtained when the pressure energy of the refrigerant is converted into the kinetic energy at the nozzle portion.

On the other hand, during the high heating-capacity operation in the air heating mode, the centrifugal force acts on the refrigerant swirling within the swirling space 15k, so that the liquid-phase refrigerant with a high density can be eccentrically located on the side of an inner peripheral wall surface of the refrigerant passage formed in the heating side nozzle portion 15a. Thus, the friction between the liquid-phase refrigerant and the inner peripheral wall surface of the refrigerant passage can promote the boiling of the liquid-phase refrigerant, thereby improving the nozzle efficiency.

The studies of the inventors of the present disclosure have shown that the shape of the mixing portion 15e is formed by combining the truncated conical shape whose refrigerant passage area gradually decreases toward the downstream side of the refrigerant flow, and the cylindrical shape whose refrigerant passage area is constant, and the distance Lb is determined to satisfy the above-mentioned formula F6, whereby the flow velocity of the mixed refrigerant can be effectively decelerated.

Thus, the shock wave due to the change of the flow velocity of the two-phase refrigerant from the supersonic state to the subsonic state can be surely generated within the mixing portion 15e without being caused within the heating side diffuser 15g. As a result, the pressurizing capacity of the heating side diffuser 15g can be effectively preventing from becoming unstable.

In the tenth embodiment, the shape of the mixing portion 15e is formed by combining the truncated conical shape and the cylindrical shape. This is because the shape of the heating side diffuser 15g is defined as one that gradually increases the refrigerant passage area toward the refrigerant flow direction. That is, the above-mentioned pressurizing performance stabilizing effect can be obtained, even though a cylindrical space whose refrigerant passage area does not change is provided on the inlet side of the heating side diffuser 15g.

(Eleventh Embodiment)

Figure 36:
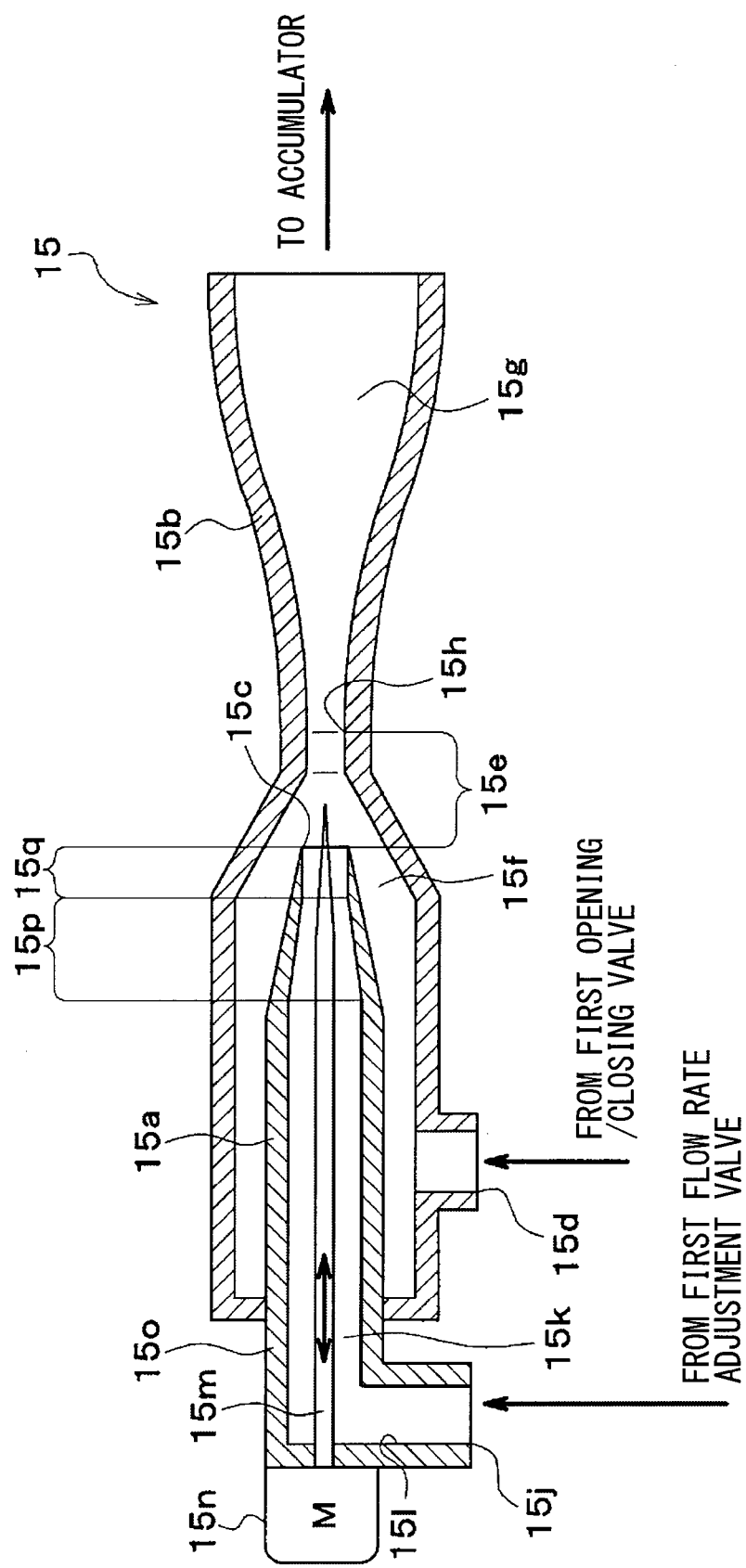
FIG. 36 is a cross-sectional view in an axial direction of the heating side ejector according to an eleventh embodiment.

The tenth embodiment has described the example in which the heating side nozzle portion 15a of the heating side ejector 15 is a fixed nozzle having a fixed refrigerant passage area of the minimum passage area portion formed at the inlet of the injection portion 15q. On the other hand, as shown in FIG. 36, an eleventh embodiment will employ a variable nozzle that can change the refrigerant passage area of a minimum passage area portion by way of example.

Specifically, the heating side nozzle portion 15a includes a needle valve 15m serving as a valve body that changes the refrigerant passage area of the heating side nozzle portion 15a, and a stepping motor 15n serving as a driving portion that displaces the needle valve 15m.

The needle valve 15m is formed in a needle shape to have its central axis disposed coaxially to the central axis of the heating side nozzle portion 15a. More specifically, the needle valve 15m is formed to have a tapered shape toward the downstream side of the refrigerant flow, and disposed to have the tapered tip end on the most downstream side protruding toward the downstream side of the refrigerant flow with respect to the refrigerant injection port 15c of the heating side nozzle portion 15a. That is, the heating side nozzle portion 15a is the so-called plug nozzle.

The stepping motor 15n is disposed on the side of the refrigerant inflow port 15j of the heating side nozzle portion 15a so as to displace the needle valve 15m in the axial direction of the heating side nozzle portion 15a. In this way, the displacement changes the area of the refrigerant passage with an annular section formed in between the inner peripheral wall surface of the heating side nozzle portion 15a and the outer peripheral wall surface of the needle valve 15m. The stepping motor 15n has its operation controlled by a control signal output from the controller.

The structures and operations of other components of the heating side ejector 15 and the refrigeration cycle apparatus 10 in the eleventh embodiment are the same as those in the tenth embodiment.

Thus, the refrigeration cycle apparatus 10 and the heating side ejector 15 in the eleventh embodiment can also obtain the same effects as those of the tenth embodiment. Further, the heating side ejector 15 uses the heating side nozzle portion 15a composed of a variable nozzle, so that the refrigerant can be supplied to the heating side nozzle portion 15a of the heating side ejector 15 at an appropriate flow rate according to the load on the refrigeration cycle apparatus 10.

The heating side ejector 15 of the eleventh embodiment includes the heating side nozzle portion 15a as the variable nozzle, so that the refrigerant can flow into the heating side nozzle portion 15a of the heating side ejector 15 at an appropriate flow rate according to a load on the refrigeration cycle apparatus 10.

The heating side nozzle portion 15a serves as a plug nozzle portion, and thereby can inject the injection refrigerant from the refrigerant injection port 15c into the mixing portion 15e along the outer surface of the needle valve 15m. Thus, even though the flow rate of the refrigerant flowing into the heating side nozzle portion 15a is changed, the injection refrigerant can be easily expanded flexibly.

The heating side nozzle portion 15a shown in FIG. 36 employs the valve that is tapered toward the downstream side of the refrigerant flow, as the needle valve 15m. Alternatively, like the modified example shown in FIG. 37, the heating side nozzle portion may employ one having its shape tapered from the heating side diffuser 15g side toward the upstream side of the refrigerant flow. In this case, the tapered tip end on the most upstream side of the needle valve may be disposed to protrude toward the tapered portion 15p rather than the injection portion 15q.

Figure 37:
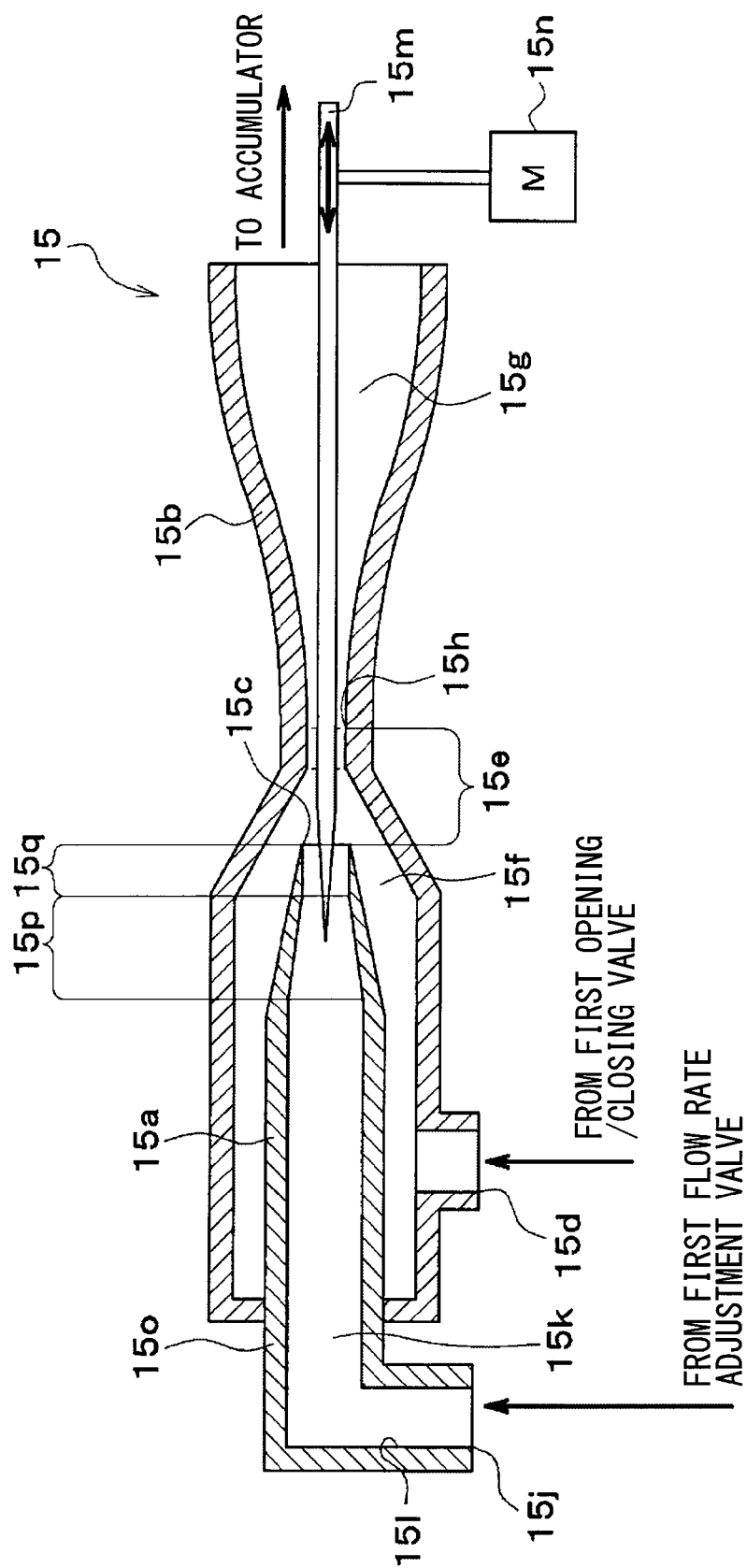
FIG. 37 is a cross-sectional view in an axial direction of the heating side ejector in a modified example of the eleventh embodiment.

In the modified example shown in FIG. 37, since the needle valve 15m does not penetrate the swirling space, the refrigerant is not prevented from swirling within the swirling space 15k. A conical one that extends from the refrigerant passage formed in the heating side nozzle portion 15a to the inside of the heating side diffuser 15g may be used as the valve body to change the refrigerant passage area of the heating side diffuser 15g as well as that of the minimum passage area portion of the heating side nozzle portion 15a.

Other Embodiments

The present disclosure is not limited to the above embodiments, and various modifications and changes can be made to those embodiments in the following way without departing from the scope of the present disclosure.

(1) Although in the above-mentioned embodiments, the refrigeration cycle apparatuses 10 and 10a according to the present disclosure are applied to an air conditioner for an electric vehicle, the application of the refrigeration cycle apparatuses 10 and 10a is not limited thereto.

For example, the refrigeration cycle apparatus of the present disclosure may also be applied to air conditioners for a normal vehicle that obtains a driving force for traveling from an internal combustion engine (engine), and a hybrid vehicle that obtains a driving force for traveling from both an internal combustion engine and an electric motor for traveling. In applying the refrigeration cycle apparatus of the present disclosure to a vehicle with an internal combustion engine, a heater core may be provided in the vehicle air conditioner 1, as an air auxiliary heater to heat air using a coolant of the internal combustion engine as a heat source.

The refrigeration cycle apparatuses 10 and 10a including the ejector (heating side ejector 15) according to the present disclosure is not limited to those dedicated for vehicles, and may be applied to a stationary air conditioner, a cooling storage, liquid heating-cooling equipment, and the like.

(2) The above-mentioned embodiments have explained the examples in which the air is heated by exchanging heat between the high-pressure refrigerant and the air at the interior condenser 12. However, instead of the interior condenser 12, for example, a heat medium circulation circuit may be provided for circulating the heat medium. The heat medium circulation circuit may include a water-refrigerant heat exchanger for exchanging heat between the heat medium and the high-pressure refrigerant, as well as a heating heat exchanger for heating air by exchanging heat between air and the heat medium heated by the water-refrigerant heat exchanger.

That is, air may be indirectly heated via the heat medium using the high-pressure refrigerant as a heat source. In applying the refrigeration cycle apparatus of the invention to the vehicle with the internal combustion engine, the coolant of the internal combustion engine may circulate as the heat medium through the heat medium circulation circuit. In the electric vehicle, a coolant for cooling a battery or an electric device may circulate as the heat medium through the heat medium circulation circuit.

(3) The above-mentioned embodiments have explained the refrigeration cycle apparatuses 10 and 10a that can be configured to switch among the refrigerant circuits in various operation modes by using the three-way joints, flow rate adjustment valves, and opening/closing valves. Alternatively, the refrigeration cycle apparatuses 10 and 10a are not limited to those that can be configured to switch among the refrigerant circuits as long as at least the operation in the dehumidification-air heating mode described above can be performed.

The structures of the refrigeration cycle apparatuses 10 and 10a are not limited to those described in the above-mentioned embodiments. Various modifications and changes can be made to the embodiments as long as a cycle with the same effects can be configured.

For example, the first three-way joint 13a and the second three-way joint 13b may be integrated together to form a four-way joint structure. Similarly, in the fourth embodiment and the like, the third three-way joint 13c and the sixth three-way joint 13f may be integrated together. Alternatively, the fifth three-way joint 13e and the eighth three-way joint 13h may be integrated together.

Further, the first flow rate adjustment valve 14a, the second flow rate adjustment valve 14b, and the second three-way joint 13b may be integrated together to form an electric three-way-type flow rate adjustment valve. Instead of the check valve 19, the electric opening/closing valve may be used. The electric opening/closing valve may be opened in the air cooling mode and the weak humidification-air heating mode, and may be closed in the dehumidification-air heating mode and the air heating mode.

In the above-mentioned embodiments, for example, a variable throttle mechanism with a fully opening function is used as the first flow rate adjustment valve 14a. On the other hand, the first flow rate adjustment valve 14a may employ a throttle mechanism (including a fixed throttle) without having the fully opening function, a bypass passage for bypassing the throttle mechanism, and an opening/closing valve for opening/closing the bypass passage. The same goes for other flow rate adjustment valves with the fully opening function.

For example, the first flow rate adjustment valve 14a employs a variable throttle mechanism with the completely closing function. Alternatively, the first flow rate adjustment valve may be constituted of a throttle mechanism (including a fixed throttle) without the completely closing function, and an opening/closing valve for opening and closing a refrigerant passage connected in series to the throttle mechanism. The same goes for other flow rate adjustment valves with the completely closing function.

Although the above-mentioned tenth and eleventh embodiments have explained the example of the variable nozzle that can be configured to change a throttle passage area as the heating side nozzle portion 15a of the heating side ejector 15, a variable nozzle may be employed as the cooling side nozzle portion 20a of the cooling side ejector 20.

When the heating side nozzle portion 15a of the heating side ejector 15 is constituted as the variable nozzle with the completely closing function that can close a nozzle portion by use of the needle valve, the first flow rate adjustment valve 14a may be abolished, and the heating side ejector 15 may serve as the refrigerant circuit switch. The variable nozzle may serve as the dryness adjuster.

Similarly, when the cooling side nozzle portion 20a of the cooling side ejector 20 is constituted as the variable nozzle with the completely closing function, the fourth flow rate adjustment valve 14d may be abolished, and the cooling side ejector 20 may serve as the refrigerant circuit switch.

Further, the accumulator 16 may be integrated with the outlet side of the heating side diffuser 15g of the heating side ejector 15. Alternatively, the cooling side gas-liquid separator 21 may be integrated with the outlet side of the cooling side diffuser 20g of the cooling side ejector 20.

In the above-mentioned embodiments, the components of the heating side ejector 15 and the cooling side ejector 20 are formed of metal by way of example. As long as the respective components can exhibit their own functions, materials for the components are not limited. That is, these components may be formed of resin.

Although in the above-mentioned embodiments, the electric compressor is employed as the compressor 11 by way of example, the form of the compressor is not limited thereto. For example, a fixed displacement compression mechanism or a variable displacement compression mechanism may employ an engine-driven compressor that is rotatably driven by an engine.

(4) The interior evaporator 23 of each of the refrigeration cycle apparatuses 10 and 10a in the above-mentioned respective embodiments may have on its refrigerant outlet side, an evaporation pressure adjustment valve for setting a refrigerant pressure of the interior evaporator 23 to a predetermined value or more.

Specifically, this kind of evaporation pressure adjustment valve may include a valve body for adjusting the opening degree of the refrigerant passage formed therein, and an elastic member for applying a load to the valve body so as to urge the valve body to close the refrigerant passage. In this case, the valve opening degree is increased together with an increase in pressure difference that is obtained by subtracting an outside air pressure applied to the elastic member side from the refrigerant pressure on the inlet side of the refrigerant passage.

(5) In the dehumidification-air heating mode of the above-mentioned embodiments, the valve opening degree of the first flow rate adjustment valve 14a is adjusted to thereby change a ratio between the flow rate of the refrigerant flowing from the first three-way joint 13a into the heating side nozzle portion 15a, and the flow rate of the refrigerant flowing from the first three-way joint 13a into the cooling side nozzle portion 20a. In this way, the refrigerant evaporation pressure in the interior evaporator 23 is adjusted.

However, the adjustment of the refrigerant evaporation pressure of the interior evaporator 23 is not limited thereto.

For example, the valve opening degree of the fourth flow rate adjustment valve 14d disposed on the upstream side of the cooling side nozzle portion 20a may be adjusted to change the flow rate ratio, thereby adjusting the refrigerant evaporation pressure of the interior evaporator 23. The valve opening degrees of both the first and fourth flow rate adjustment valves 14a and 14d may be adjusted to change the flow rate ratio, thereby adjusting the refrigerant evaporation pressure of the interior evaporator 23.

(6) During the high heating-capacity operation in the air heating mode in the above-mentioned embodiments, the valve opening degree of the first flow rate adjustment valve 14a is adjusted based on the refrigerant discharge capacity of the compressor 11 by way of example. However, the adjustment of the valve opening degree of the first flow rate adjustment valve 14a is not limited thereto. For example, a dryness sensor is provided for detecting the dryness of the refrigerant on the outlet side of the interior condenser 12. The valve opening degree of the first flow rate adjustment valve 14a may be adjusted such that a detected value from the dryness sensor is not less than 0.5 nor more than 0.8.

(7) In the above-mentioned fourth to seventh embodiments, the fifth opening/closing valve 18e is opened to draw a part of the refrigerant aspirated from the heating side refrigerant suction port 15d of the heating side ejector 15, into the suction port 41a of the compressor 41 by way of example. In addition, the fifth opening/closing valve 18e may be configured of a flow rate adjustment valve that has the same structure as that of the first flow rate adjustment valve 14a. The valve opening degree of the flow rate adjustment valve may be adjusted to thereby adjust the flow rate of the refrigerant drawn from the suction port 41a of the compressor 41, thereby controlling the pressurized amount in the heating side ejector 15.

(8) In the above-mentioned third and seventh embodiments, the auxiliary heating bypass passage 24 and the fourth opening/closing valve 18d are added to the structure of each of the refrigeration cycle apparatuses 10 and 10a of the first and fourth embodiments, thereby enabling the operation in a strong air heating mode. On the other hand, for example, the same structure as described above may be added to the refrigeration cycle apparatuses 10 and 10a of the second, fifth, and sixth embodiments, thereby performing an operation in the strong air heating mode.

(9) In the above-mentioned respective embodiments, an air conditioning control program is executed to switch among respective operating modes by way of example. However, the switching among the respective operation modes is not limited thereto. Specifically, an operation-mode setting switch is provided on the operation panel to set each operation mode. According to an operation signal from the operation-mode setting switch, switching may be performed among the air cooling mode, the weak dehumidification-air heating mode, the dehumidification-air heating mode, and the air heating mode.

(10) The methods disclosed in the above respective embodiments may be appropriately combined within the feasible range. For example, the auxiliary heating bypass passage 24 and the fourth opening/closing valve 18d, which are employed in the third embodiment, may be applied to the refrigeration cycle apparatus 10 of the second embodiment.

For example, the swirling space formation member 15o described in the tenth and eleventh embodiments may also be applied to the heating side ejector 15 described in the first embodiment with reference to FIG. 4. Similarly, the needle valve 15m and the stepping motor 15n, which are described in the tenth and eleventh embodiments, may be applied to the heating side ejector 15 described in the first embodiment.

(11) Although in the above-mentioned embodiments, R134a or R1234yf can be employed as the refrigerant by way of example, the refrigerant is not limited thereto. For example, the refrigerants, such as R600a, R410A, R404A, R32, R1234yfxf, or R407C can be used. Alternatively, a mixed refrigerant including a mixture of a plurality of refrigerants among these refrigerants may be employed.

What is claimed is:

1. A refrigeration cycle apparatus to be applied to an air conditioner, the refrigeration cycle apparatus comprising:
    a compressor compressing and discharging a low-pressure refrigerant;
    a heating heat exchanger that heats air to be blown into a space to be air-conditioned, using a high-pressure refrigerant discharged from the compressor as a heat source;
    a branch portion that branches a flow of the refrigerant flowing out of the heating heat exchanger;
    a heating side ejector that draws a refrigerant from a heating side refrigerant suction port by a suction effect of an injection refrigerant injected from a heating side nozzle portion that decompresses one of the refrigerants branched by the branch portion, the heating side ejector including a heating side pressure-increasing portion that raises a pressure of a mixed refrigerant including the injection refrigerant and a suction refrigerant drawn from the heating side refrigerant suction port;
    an exterior heat exchanger that exchanges heat between a refrigerant on a downstream side of the heating side pressure-increasing portion and outside air to evaporate the refrigerant, and allows the refrigerant to flow out toward a side of the heating side refrigerant suction port;
    a cooling side decompressor decompressing the refrigerant; and
    a cooling heat exchanger that evaporates the refrigerant decompressed by the cooling side decompressor to cool the air before passing through the heating heat exchanger, wherein
    in a dehumidification-air heating mode in which the heating heat exchanger reheats the air cooled by the cooling heat exchanger, the other refrigerant branched by the branch portion flows into the cooling side decompressor, and the refrigerant on a downstream side of the heating side ejector and the refrigerant on a downstream side of the cooling side decompressor are drawn into the compressor.

2. The refrigeration cycle apparatus according to claim 1, further comprising:
    a dehumidification bypass passage that guides the refrigerant flowing out of the cooling heat exchanger to a side of the exterior heat exchanger;
    an auxiliary decompressor that decompresses the refrigerant which flows into the exterior heat exchanger via the dehumidification bypass passage; and
    a refrigerant circuit switch that switches a refrigerant circuit in which the refrigerant circulates, wherein
    the refrigerant circuit switch switches one refrigerant circuit in a serial dehumidification-air heating mode of reheating the air cooled by the cooling heat exchanger with a lower heating capacity than that in the dehumidification-air heating mode, the one refrigerant circuit being adapted to:
        allow a part of the refrigerant on the downstream side of the heating side ejector to flow into the cooling heat exchanger via the cooling side decompressor while another part of the refrigerant on the downstream side of the heating side ejector is drawn into the compressor;
        decompress the refrigerant flowing out of the cooling heat exchanger by the auxiliary decompressor to allow the decompressed refrigerant to flow into the exterior heat exchanger; and
        further interrupt a refrigerant passage leading from the branch portion to the cooling side decompressor.

3. The refrigeration cycle apparatus according to claim 1, wherein
    the cooling side decompressor is a cooling side ejector that includes a cooling side nozzle portion decompressing the other of the refrigerants branched by the branch portion, a cooling side refrigerant suction port that draws a refrigerant by a suction effect of an injection refrigerant injected from the cooling side nozzle portion, and a cooling side pressure-increasing portion raising a pressure of a mixed refrigerant of the injection refrigerant injected from the cooling side nozzle portion and the suction refrigerant drawn from the cooling side refrigerant suction port, and
    in the dehumidification-air heating mode, the refrigerant flowing out of the cooling side pressure-increasing portion flows into the cooling heat exchanger, and the refrigerant flowing out of the cooling heat exchanger flows into the cooling side refrigerant suction port.

4. The refrigeration cycle apparatus according to claim 1, further comprising:
    a gas-liquid separator that separates the refrigerant flowing out of the heating side ejector into gas and liquid phase refrigerants in the dehumidification-air heating mode, wherein
    the liquid-phase refrigerant separated by the gas-liquid separator flows into the exterior heat exchanger.

5. The refrigeration cycle apparatus according to claim 1, further comprising:
    an auxiliary heating bypass passage that guides the high-pressure refrigerant to the cooling heat exchanger; and
    a refrigerant circuit switch that switches a refrigerant circuit in which the refrigerant circulates, wherein
    the refrigerant circuit switch switches a refrigerant circuit in a strong air heating mode of heating the air both at the heating heat exchanger and the cooling heat exchanger, the refrigerant circuit being adapted to allow the high-pressure refrigerant to flow into both the heating heat exchanger and the cooling heat exchanger, and to interrupt a refrigerant passage leading from the branch portion to the cooling side decompressor.

6. The refrigeration cycle apparatus according to claim 1, wherein
    the heating side ejector includes a heating side body forming the heating side refrigerant suction port and the heating side pressure-increasing portion,
    a mixing portion that mixes the injection refrigerant and the suction refrigerant, the mixing portion being provided in a range of an internal space of the heating side body from a refrigerant injection port of the heating side nozzle portion to an inlet of the heating side pressure-increasing portion,
    a refrigerant passage defined in the heating side nozzle portion includes a tapered portion in which a refrigerant passage area gradually decreases, and an injection portion that guides the refrigerant from the tapered portion to the refrigerant injection port, and the heating side nozzle portion is configured to flexibly expand the injection refrigerant to be injected into the mixing portion by adjusting a spreading angle on a section of the injection portion in an axial direction to 0° or more.

7. The refrigeration cycle apparatus according to claim 6, wherein
the mixing portion is formed in a shape that reduces a refrigerant passage area toward a downstream side of a refrigerant flow.

8. The refrigeration cycle apparatus according to claim 6, wherein a refrigerant passage area of the inlet of the heating side pressure-increasing portion is set smaller than that of the refrigerant injection port.

9. The refrigeration cycle apparatus according to claim 6, wherein
the heating side ejector includes a swirling space formation member that forms a swirling space in which the refrigerant flowing into the heating side nozzle portion swirls about an axis of the heating side nozzle portion.

10. The refrigeration cycle apparatus according to claim 6, wherein
the heating side ejector includes a valve body that changes a refrigerant passage area of the heating side nozzle portion.

11. A refrigeration cycle apparatus to be applied to an air conditioner, comprising:
a compressor that compresses a low-pressure refrigerant drawn from a suction port and discharges a high-pressure refrigerant from a discharge port the compressor including an intermediate pressure port that allows an intermediate-pressure refrigerant in a refrigerant cycle to be introduced and to be merged with the refrigerant being compressed;
a heating heat exchanger that heats air to be blown into a space to be air-conditioned, using the high-pressure refrigerant discharged from the discharge port of the compressor as a heat source;
a branch portion that branches a flow of the refrigerant flowing out of the heating heat exchanger;
a heating side ejector that draws a refrigerant from a heating side refrigerant suction port by a suction effect of an injection refrigerant injected from a heating side nozzle portion that decompresses one of the refrigerants branched by the branch portion, the heating side ejector including a heating side pressure-increasing portion that raises a pressure of a mixed refrigerant including the injection refrigerant and a suction refrigerant drawn from the heating side refrigerant suction port;
an exterior heat exchanger that exchanges heat between the refrigerant on a downstream side of the heating side pressure-increasing portion and outside air to evaporate the refrigerant, and allows the refrigerant to flow out toward a side of the heating side refrigerant suction port;
a cooling side decompressor decompressing the refrigerant; and
a cooling heat exchanger that evaporates the refrigerant decompressed by the cooling side decompressor to cool the air before the air passes through the heating heat exchanger, wherein
in a dehumidification-air heating mode in which the heating heat exchanger reheats the air cooled by the cooling heat exchanger, the other refrigerant branched by the branch portion flows into the cooling side decompressor, while at least a part of the refrigerant flowing out of the exterior heat exchanger is drawn into the suction port, and further the refrigerant on a downstream side of the heating side ejector and the refrigerant on a downstream side of the cooling side decompressor flow into the intermediate-pressure port.

12. The refrigeration cycle apparatus according to claim 11, further comprising:
a dehumidification bypass passage that guides the refrigerant flowing out of the cooling heat exchanger to a side of the exterior heat exchanger;
an auxiliary decompressor that decompresses the refrigerant flowing into the exterior heat exchanger via the dehumidification bypass passage; and
a refrigerant circuit switch that switches a refrigerant circuit in which the refrigerant circulates, wherein
the refrigerant circuit switch switches one refrigerant circuit in a serial dehumidification-air heating mode which involves reheating the air cooled by the cooling heat exchanger with a lower heating capacity than that in the dehumidification-air heating mode, the one refrigerant circuit being adapted to:
allow a part of the refrigerant on the downstream side of the heating side ejector to flow into the cooling heat exchanger via the cooling side decompressor, while allowing another part of the refrigerant on the downstream side of the heating side ejector to flow into the intermediate pressure port;
decompress the refrigerant flowing out of the cooling heat exchanger by the auxiliary decompressor to allow the decompressed refrigerant to flow into the exterior heat exchanger;
draw at least a part of the refrigerant flowing out of the exterior heat exchanger into the suction port of the compressor; and
further interrupt a refrigerant passage leading from the branch portion to the cooling side decompressor.

13. The refrigeration cycle apparatus according to claim 11, wherein
the cooling side decompressor is a cooling side ejector that includes a cooling side nozzle portion decompressing the other of the refrigerants branched by the branch portion, a cooling side refrigerant suction port that draws a refrigerant by a suction effect of an injection refrigerant injected from the cooling side nozzle portion, and a cooling side pressure-increasing portion raising a pressure of a mixed refrigerant of the injection refrigerant injected from the cooling side nozzle portion and the suction refrigerant drawn from the cooling side refrigerant suction port, and
in the dehumidification-air heating mode, the refrigerant flowing out of the cooling side pressure-increasing portion flows into the cooling heat exchanger, and the refrigerant flowing out of the cooling heat exchanger flows into the cooling side refrigerant suction port.

14. The refrigeration cycle apparatus according to claim 11, further comprising:
a gas-liquid separator that separates the refrigerant flowing out of the heating side ejector into gas and liquid phase refrigerants in the dehumidification-air heating mode, wherein
the liquid-phase refrigerant separated by the gas-liquid separator flows into the exterior heat exchanger.

15. The refrigeration cycle apparatus according to claim 11, further comprising:
an auxiliary heating bypass passage that guides the high-pressure refrigerant to the cooling heat exchanger; and a refrigerant circuit switch that switches a refrigerant circuit in which the refrigerant circulates, wherein the refrigerant circuit switch switches a refrigerant circuit in a strong air heating mode of heating the air both at the heating heat exchanger and the cooling heat exchanger, the refrigerant circuit being adapted to allow the high-pressure refrigerant to flow into both the heating heat exchanger and the cooling heat exchanger, and to interrupt a refrigerant passage leading from the branch portion to the cooling side decompressor.

16. The refrigeration cycle apparatus according to claim 11, wherein the heating side ejector includes a heating side body forming the heating side refrigerant suction port and the heating side pressure-increasing portion, a mixing portion that mixes the injection refrigerant and the suction refrigerant, the mixing portion being provided in a range of an internal space of the heating side body from a refrigerant injection port of the heating side nozzle portion to an inlet of the heating side pressure-increasing portion, a refrigerant passage defined in the heating side nozzle portion includes a tapered portion in which a refrigerant passage area gradually decreases, and an injection portion that guides the refrigerant from the tapered portion to the refrigerant injection port, and the heating side nozzle portion is configured to flexibly expand the injection refrigerant to be injected into the mixing portion, by adjusting a spreading angle on a section of the injection portion in an axial direction to 0° or more.

* * * * *